(12) United States Patent
Moers et al.

(10) Patent No.: US 11,517,840 B2
(45) Date of Patent: Dec. 6, 2022

(54) AIR CLEANER ASSEMBLIES AND METHODS OF USE

(71) Applicant: Donaldson Company, Inc., Bloomington, MN (US)

(72) Inventors: Anthonius Jan-Baptist Maria Moers, Holsbeek (BE); Johnny Craessaerts, Huldenberg (BE); Bart Catoor, Kessel-lo (BE)

(73) Assignee: Donaldson Company, Inc., Bloomington, MN (US)

( * ) Notice: Subject to any disclaimer, the term of this patent is extended or adjusted under 35 U.S.C. 154(b) by 255 days.

(21) Appl. No.: 16/765,415

(22) PCT Filed: Nov. 27, 2018

(86) PCT No.: PCT/US2018/062628
§ 371 (c)(1),
(2) Date: May 19, 2020

(87) PCT Pub. No.: WO2019/104330
PCT Pub. Date: May 31, 2019

(65) Prior Publication Data
US 2020/0324237 A1    Oct. 15, 2020

Related U.S. Application Data

(60) Provisional application No. 62/591,169, filed on Nov. 27, 2017.

(51) Int. Cl.
*B01D 46/00* (2022.01)
*B01D 45/16* (2006.01)
(Continued)

(52) U.S. Cl.
CPC ......... *B01D 46/0005* (2013.01); *B01D 45/16* (2013.01); *B01D 46/0015* (2013.01);
(Continued)

(58) Field of Classification Search
CPC .......... B01D 46/0015; B01D 2271/022; B01D 2271/027; B01D 2265/028;
(Continued)

(56) References Cited

U.S. PATENT DOCUMENTS 4,925,561 A    5/1990 Ishii et al.
5,049,326 A    9/1991 Matsumoto et al.
(Continued)

FOREIGN PATENT DOCUMENTS

DE              38 06 208 A1    9/1989
DE     20 2008 017 059 U1    6/2010
(Continued)

OTHER PUBLICATIONS

International Search Report and Written Opinion for PCT/US2018/062628, dated Apr. 30, 2019.
(Continued)

*Primary Examiner* — Robert Clemente
(74) *Attorney, Agent, or Firm* — Merchant & Gould P.C.

(57) ABSTRACT

A filter cartridge for an air cleaner assembly is disclosed. The filter cartridge can include a media pack configured for installation into an air cleaner housing, the media pack extending along a longitudinal axis between opposite inlet and outlet flow ends, the media pack defining an outer perimeter. The filter cartridge can also include a circumferential shell surrounding at least a portion of the media pack outer perimeter. A radial flange extending from the circumferential shell proximate the media pack inlet end can also be provided. The flange can define a plurality of openings that are configured to receive protrusions on a housing body of the air cleaner assembly. The interaction between the protrusions and openings operates to ensure a secure seal between the housing body and the seal member.

7 Claims, 59 Drawing Sheets

(51) Int. Cl.
*B01D 46/62* (2022.01)
*B01D 50/20* (2022.01)

(52) U.S. Cl.
CPC ............ *B01D 46/62* (2022.01); *B01D 50/20* (2022.01); *B01D 2265/028* (2013.01); *B01D 2271/022* (2013.01); *B01D 2275/208* (2013.01); *B01D 2279/60* (2013.01)

(58) Field of Classification Search
CPC .......... B01D 2275/208; B01D 46/0005; B01D 46/525–527
See application file for complete search history.

(56) References Cited

U.S. PATENT DOCUMENTS

| | | |
|---|---|---|
| 5,472,463 A | 12/1995 | Herman et al. |
| 5,525,226 A | 6/1996 | Brown et al. |
| 5,562,825 A | 10/1996 | Yamada et al. |
| 5,613,992 A | 3/1997 | Engel |
| 5,738,785 A | 4/1998 | Brown et al. |
| 5,772,883 A | 6/1998 | Rothman et al. |
| D396,098 S | 7/1998 | Gillingham et al. |
| 5,792,247 A | 8/1998 | Gillingham et al. |
| D398,046 S | 9/1998 | Gillingham et al. |
| D399,944 S | 10/1998 | Gillingham et al. |
| 5,820,646 A | 10/1998 | Gillingham et al. |
| 5,895,574 A | 4/1999 | Friedmann et al. |
| 5,902,364 A | 5/1999 | Tokar et al. |
| 6,039,778 A | 3/2000 | Coulonvaux |
| D428,128 S | 7/2000 | Gillingham et al. |
| 6,179,890 B1 | 1/2001 | Ramos et al. |
| D437,401 S | 2/2001 | Ramos et al. |
| 6,190,432 B1 | 2/2001 | Gieseke et al. |
| 6,210,469 B1 | 4/2001 | Tokar |
| 6,235,195 B1 | 5/2001 | Tokar |
| 6,350,296 B1 | 2/2002 | Warner |
| 6,419,718 B1 | 7/2002 | Klug et al. |
| 6,482,247 B2 | 11/2002 | Jaroszczyk et al. |
| 6,673,136 B2 | 1/2004 | Gillingham et al. |
| 6,936,084 B2 | 8/2005 | Schlensker et al. |
| 6,949,189 B2 | 9/2005 | Bassett et al. |
| 7,311,748 B2 | 12/2007 | Holmes et al. |
| 7,351,270 B2 | 4/2008 | Engelland et al. |
| 7,494,017 B2 | 2/2009 | Miller |
| 7,625,419 B2 | 12/2009 | Nelson et al. |
| 7,708,953 B2 | 5/2010 | Cremeens et al. |
| 7,967,886 B2 | 6/2011 | Schrage et al. |
| 8,034,145 B2 | 10/2011 | Boehrs et al. |
| 8,061,530 B2 | 11/2011 | Kindkeppel et al. |
| 8,097,061 B2 | 1/2012 | Smith et al. |
| 8,152,876 B2 | 4/2012 | Gillenberg et al. |
| 8,202,419 B2 | 6/2012 | Wallerstorfer et al. |
| 8,246,702 B2 | 8/2012 | Ackermann et al. |
| 8,349,049 B2 | 1/2013 | Amesöder et al. |
| 8,361,181 B2 | 1/2013 | Osendorf et al. |
| RE44,424 E | 8/2013 | Barnwell |
| 8,778,044 B2 | 7/2014 | Amesoeder et al. |
| 8,864,866 B2 | 10/2014 | Osendorf et al. |
| 8,916,044 B2 | 12/2014 | Rapin |
| 9,114,346 B2 | 8/2015 | Schrage et al. |
| 9,120,047 B2 | 9/2015 | Boehrs et al. |
| 9,180,399 B2 | 11/2015 | Reichter et al. |
| 9,320,997 B2 | 4/2016 | Campbell et al. |
| 9,346,001 B2 | 5/2016 | Kato et al. |
| 9,346,002 B2 | 5/2016 | Kleynen |
| 10,029,198 B2 | 7/2018 | Adamek et al. |
| 10,357,732 B2 | 7/2019 | Rieger et al. |
| 10,835,852 B2 | 11/2020 | Decoster et al. |
| 2004/0187689 A1 | 9/2004 | Sporre et al. |
| 2005/0130508 A1 | 6/2005 | Yeh |
| 2006/0037296 A1 | 2/2006 | Duffy |
| 2008/0041026 A1 | 2/2008 | Engel et al. |
| 2008/0142426 A1 | 6/2008 | Greco et al. |
| 2008/0282890 A1 | 11/2008 | Rocklitz et al. |
| 2009/0127211 A1 | 5/2009 | Rocklitz et al. |
| 2009/0230051 A1 | 9/2009 | Holmes et al. |
| 2010/0032365 A1 | 2/2010 | Moe et al. |
| 2010/0064646 A1 | 3/2010 | Smith et al. |
| 2012/0067014 A1 | 3/2012 | Dhiman et al. |
| 2013/0000267 A1 | 1/2013 | Merritt |
| 2014/0102060 A1 | 4/2014 | Kato et al. |
| 2014/0165834 A1 | 6/2014 | Kaufmann et al. |
| 2014/0208705 A1 | 7/2014 | Krull |
| 2014/0251895 A1 | 9/2014 | Wagner |
| 2014/0260143 A1* | 9/2014 | Kaiser .................... B01D 46/10 55/501 |
| 2015/0096931 A1 | 4/2015 | Jensen |
| 2015/0101295 A1 | 4/2015 | Thompson et al. |
| 2015/0306530 A1 | 10/2015 | Reichter et al. |
| 2016/0045848 A1* | 2/2016 | Campbell ............ B01D 46/525 55/497 |
| 2016/0059172 A1 | 3/2016 | Allott et al. |
| 2016/0131094 A1 | 5/2016 | Pereira Madeira et al. |
| 2017/0001134 A1 | 1/2017 | Rieger et al. |
| 2017/0232374 A1 | 8/2017 | Osendorf et al. |
| 2017/0266601 A1 | 9/2017 | Carter et al. |
| 2018/0142650 A1* | 5/2018 | Finn .................. F02M 35/0205 |
| 2018/0318745 A1 | 11/2018 | Nichols et al. |
| 2018/0369735 A1 | 12/2018 | Decoster et al. |
| 2019/0070548 A1* | 3/2019 | Franz ................. B01D 46/0005 |
| 2019/0105593 A1* | 4/2019 | Krull .................... B01D 46/525 |
| 2019/0299143 A1 | 10/2019 | Decoster et al. |

FOREIGN PATENT DOCUMENTS

| | | |
|---|---|---|
| DE | 10 2016 002 954 A1 | 9/2016 |
| EP | 2774667 A1 | 9/2014 |
| EP | 2 665 535 B1 | 4/2016 |
| JP | 4141226 B2 | 8/2008 |
| WO | 97/40918 A1 | 11/1997 |
| WO | 02/098540 A1 | 12/2002 |
| WO | 03/047722 A2 | 6/2003 |
| WO | 2004/007054 A1 | 1/2004 |
| WO | 2004/082795 A2 | 9/2004 |
| WO | 2005/077487 A1 | 8/2005 |
| WO | 2006/014941 A2 | 2/2006 |
| WO | 2006/026241 A1 | 3/2006 |
| WO | 2006/076456 A1 | 7/2006 |
| WO | 2006/076479 A1 | 7/2006 |
| WO | 2007/133635 A2 | 11/2007 |
| WO | 2009/014988 A1 | 1/2009 |
| WO | 2009/039285 A1 | 3/2009 |
| WO | 2010/033291 A1 | 3/2010 |
| WO | 2010/117799 A2 | 10/2010 |
| WO | 2013/063497 A2 | 5/2013 |
| WO | 2013/104792 A1 | 7/2013 |
| WO | 2014/078796 A2 | 5/2014 |
| WO | 2014/210541 A1 | 12/2014 |
| WO | 2015/010085 A2 | 1/2015 |
| WO | 2015/054397 A1 | 4/2015 |
| WO | 2016/077377 A1 | 5/2016 |
| WO | 2016/105560 A2 | 6/2016 |
| WO | 2017/079191 A1 | 5/2017 |
| WO | 2017/106752 A1 | 6/2017 |

OTHER PUBLICATIONS

European Examination Report for Application No. 18821799.6 dated Jun. 23, 2021.
Indian Examination Report for Application No. 202017022142 dated Aug. 23, 2021.

* cited by examiner

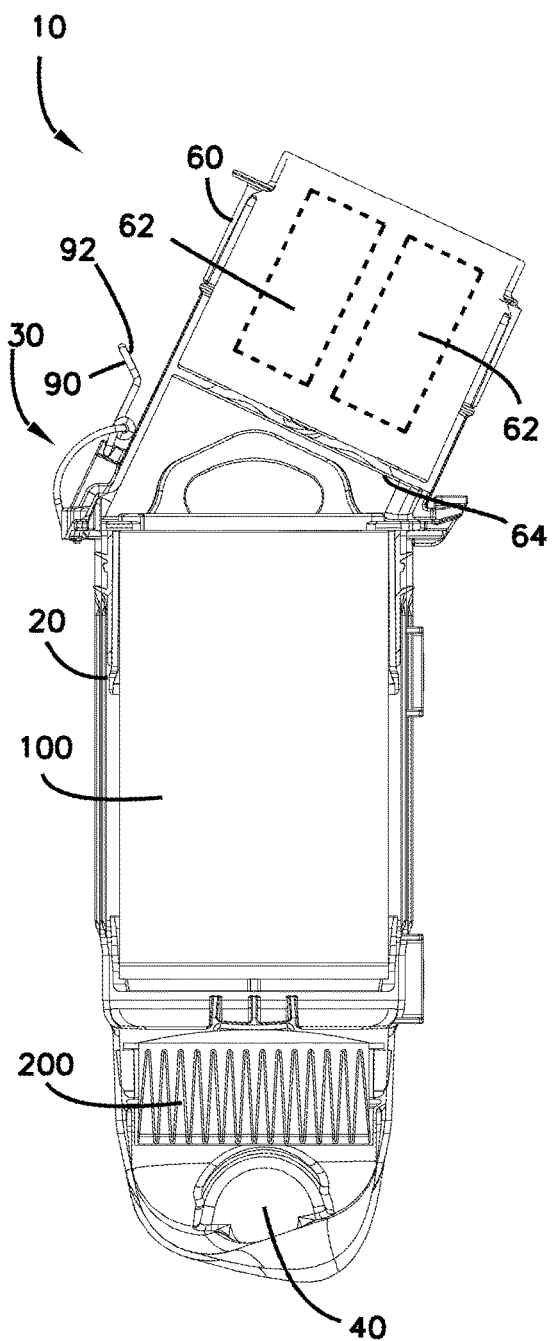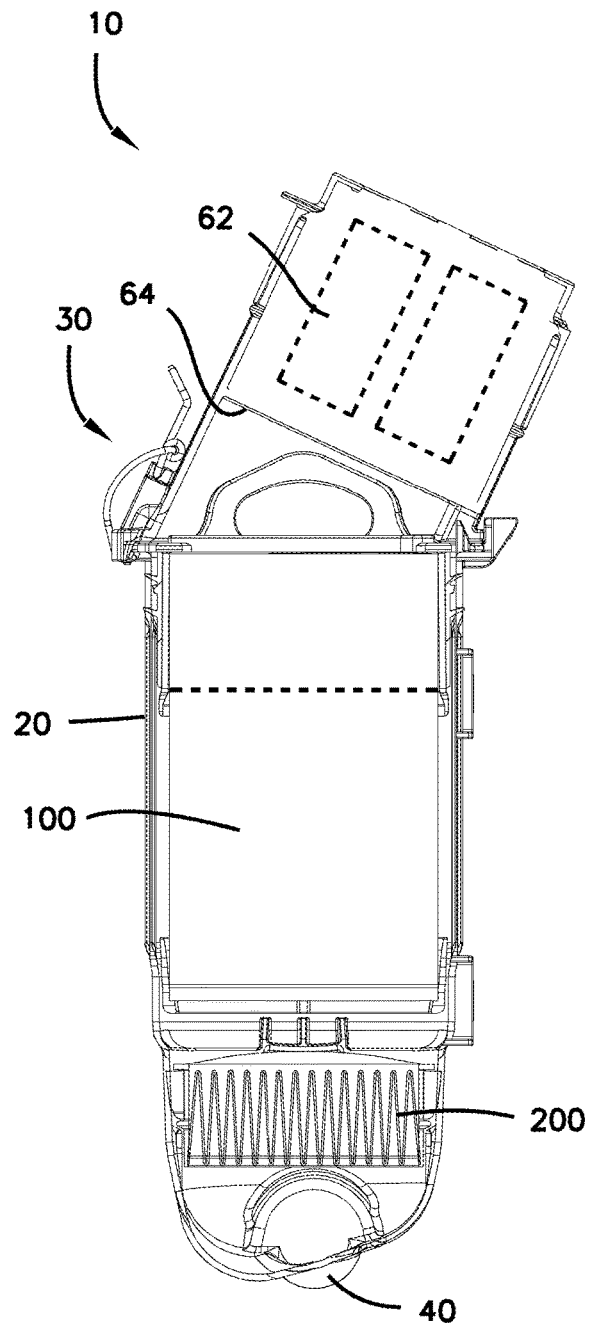

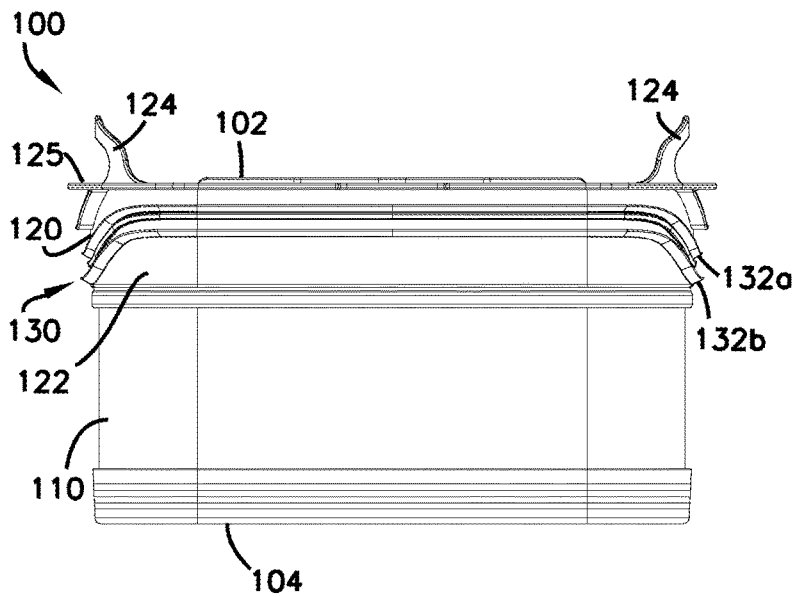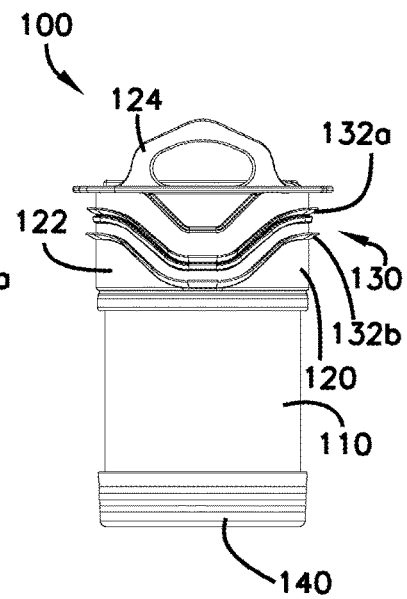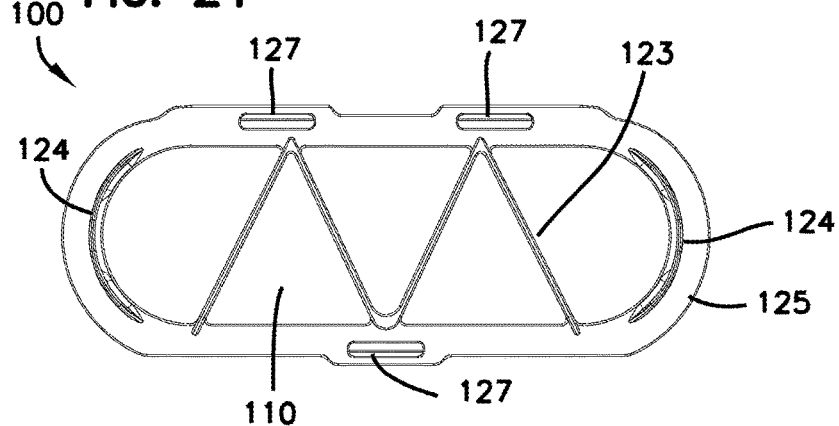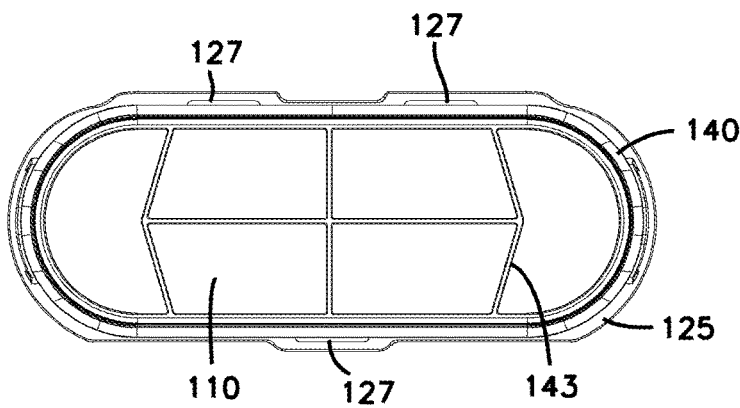

AIR CLEANER ASSEMBLIES AND METHODS OF USE

This application a National Stage Application of PCT International Application No. PCT/US2018/062628, filed on Nov. 27, 2018, which claims the benefit of priority to U.S. Provisional Patent Application Ser. No. 62/591,169, filed on Nov. 27, 2017, which applications are incorporated herein by reference. To the extent appropriate, a claim of priority is made to each of the above disclosed applications.

TECHNICAL FIELD

The present invention relates to filter arrangements, typically for use in filtering air, such as intake air for internal combustion engines, and more particularly relates to filter assemblies that include multiple components arranged in a housing to provide desired filtering capabilities.

BACKGROUND

Air or other gas filtering is desirable in a number of systems. A typical application is in the filtration of intake air to internal combustion engines. Another is in the filtration of crankcase ventilation filter assemblies. Typically, such systems comprise filter assemblies having a serviceable filter cartridge therein. After a period of use, filter media within a filter housing requires servicing, either through cleaning or complete replacement. Typically, for an air cleaner or crankcase ventilation filter assembly used with an internal combustion engine, for example, on a vehicle, the filter media is contained in a removable and replaceable, i.e. serviceable, component, typically referred as a filter element or cartridge. The filter cartridge is configured to be removably sealed within the air cleaner, in use. Improvements in filter arrangements relating to assembly, serviceability, and/or use are desirable. The filter cartridge can be provided as a first (e.g., primary) filter cartridge or a second (e.g., secondary or safety) filter cartridge. The air cleaner assembly can contain only a first filter cartridge or both a first filter cartridge and a second filter cartridge.

SUMMARY

Filter cartridges for an air cleaner assembly are disclosed.

In one example, the filter cartridge can include a media pack extending along a longitudinal axis between opposite inlet and outlet flow ends. The media pack can have a length and a width defining an outer perimeter, wherein the length is greater than the width. The media pack can also be referred to as having one or more long sides. The filter cartridge can include a radially directed seal member disposed about the media pack outer perimeter. The filter cartridge can further include a first member of a projection-receiver arrangement for engagement with a second member of the projection-receiver arrangement located on a housing of the air cleaner assembly, the first member being located along the length of the media pack outer perimeter.

In one example, the first member is provided on a flange extending radially from the media pack outer perimeter.

In one example, a circumferential shell surrounding at least a portion of the media pack outer perimeter.

In one example, the first member is provided on a flange extending radially from the circumferential shell.

In one example, the first member defines an opening for receiving a projection of the second member.

In one example, the first member includes a plurality of first members.

In one example, at least some of the plurality of first members define an opening.

In one example, the plurality of first members are spaced apart.

In one example, the radially directed seal member and the first member are located closer to the media pack inlet end than to the media pack outlet end.

In one example, the first member is located closer to the media pack inlet end in comparison to the radially directed seal member.

In one example, the first member includes at least one first member located along a first long side of the media pack and at least one first member located along a second long side of the media pack.

In one example, the first member includes two first members located on the first long side of the media pack.

In one example, the first members are projections.

In one example, the first members are axially extending projections.

In one example, the flange extends continuously around the media pack outer perimeter.

In one example, an air cleaner is disclosed including an openable cleaner housing defining an interior region and an interior sealing surface and any of the filter cartridges disclosed herein.

In one example, the air cleaner assembly includes a projection-receiver arrangement including a first member and a second member. The first member can be located along the length of the media pack outer perimeter. The second member can be located on the housing.

In one example, the first member includes a plurality of openings and the second member includes a plurality of projections.

In one example, a cover of the openable cleaner housing includes cavities for receiving at least a portion of the plurality of projections.

In one example, the second member is provided with a taper.

In one example, the radially directed seal member includes at least one lip seal extending from a base portion, the lip seal being for forming a seal against the interior sealing surface of the housing, the base portion abutting the housing to constrain deflection of the housing in a direction towards the media pack In one example, the filter cartridge can include a media pack configured for installation into an air cleaner housing, the media pack extending along a longitudinal axis between opposite inlet and outlet flow ends, the media pack defining an outer perimeter. The filter cartridge can also include a circumferential shell surrounding at least a portion of the media pack outer perimeter. A radial flange extending from the circumferential shell proximate the media pack inlet end can also be provided. The flange can define a plurality of openings that are configured to receive protrusions on a housing body of the air cleaner assembly. In some examples, the openings extend fully through the thickness of the radial flange. In some examples, the openings are pocket structures with an open end for receiving the protrusions.

In one example, the filter cartridge has a first length and a first width, wherein the first length is greater than the first width, and wherein the plurality of openings are located along the first length of the filter cartridge.

In one example, the plurality of openings are configured as slots extending through the radial flange.

In one example, the circumferential shell only partially surrounds the media pack.

In one example, the filter cartridge has an obround shape.

In one example, the media pack is fluted media.

In one example, the plurality of openings includes at least two openings. In one example, the plurality of openings includes at least three openings. In one example, the plurality of openings includes four or more openings.

In one example, the plurality of openings includes at least two openings. In one example, the plurality of openings includes at least three openings.

In one example, the plurality of openings includes at least one opening on a first flange segment and at least one opening on a second flange segment opposite the first flange segment. In one example, the number of openings in the first flange segment is unequal to the number of openings in the second flange segment. In one example, the number of openings in the first flange segment is equal to the number of openings in the second flange segment. In one example, the first flange segment includes one opening and the second flange segment includes two openings.

In one example, a filter cartridge for an air cleaner assembly includes a media pack extending along a longitudinal axis between opposite inlet and outlet flow ends, the media pack having a length and a width defining an outer perimeter, the length being greater than the width; and a radially directed seal member disposed about the media pack outer perimeter, the radially directed seal member including at least one lip seal extending from a base portion, the lip seal being for forming a seal against a housing of the air cleaner assembly, the base portion being configured to abut the housing to constrain deflection of the housing in a direction towards the media pack.

In one example, the filter cartridge includes a first member of a projection-receiver arrangement for engagement with a second member of the projection-receiver arrangement located on a housing of the air cleaner assembly, the first member being located along the length of the media pack outer perimeter.

In one example, the at least one lip seal includes a pair of lip seals.

In one example, the filter cartridge includes a projection member extending from the seal base portion. In one example, the projection member is located between the pair of lip seals.

In one example, a filter cartridge is disclosed including a media pack extending along a longitudinal axis between opposite inlet and outlet flow ends, the media pack having a length and a width defining an outer perimeter, the length being greater than the width, a seal member extending at least partially about the media pack outer perimeter, and a first member of a projection-receiver arrangement for engagement with a second member of the projection-receiver arrangement located on a housing of the air cleaner assembly, the first member being located along the length of the media pack outer perimeter.

In one example, the first member is located between the seal member and the media pack inlet flow end.

In one example, the first member is located between the seal member and the media pack outlet flow end.

In one example, the filter cartridge includes a support structure extending about the media pack outer perimeter, wherein the first member is supported by the support structure.

In one example, the support structure is a circumferential shell.

In one example, the first member includes a plurality of first members.

In one example, the plurality of first members are separate components individually supported on the filter cartridge.

In one example, the plurality of first members are commonly supported by the support structure.

In one example, the plurality of first members are commonly supported by a flange member.

In one example, the filter cartridge further includes a radially outward facing contact surface for constraining deflection of the housing in a radially inward direction.

In one example, the radially outward facing contact surface and the seal member are formed from the same material.

In one example, the seal member is formed as an injection molded TPE material.

In one example, the first member has a radially inward facing contact surface for engaging with the second member on the housing for constraining deflection of the housing in a radially outward direction.

In one example, the seal member includes at least one lip seal.

In one example, the seal member includes a pair of lip seals.

In one example, the seal member includes a projection member extending from the seal base portion.

In one example, the projection member is located between the pair of lip seals.

In one example, the seal member is axially located between the first member and the radially outward facing contact surface.

In one example, the first member is closer to the inlet end of the media pack than to the outlet end.

In on example, a filter cartridge is disclosed including a media pack extending along a longitudinal axis between opposite inlet and outlet flow ends, the media pack having a length and a width defining an outer perimeter, the length being greater than the width, a seal member extending at least partially about the media pack outer perimeter, and a first member of an attachment arrangement for engagement with a second member of an attachment arrangement located on a housing of the air cleaner assembly, the first member cooperating with the second member to secure the filter cartridge to the housing.

In one example, the first member is movable between a latched position and an unlatched position.

In one example, the first member is rotatable between the latched and unlatched positions.

In one example, the first member is rotatable about a living hinge.

In one example, the filter cartridge includes two first members.

In one example, the first members are located on opposite first sides of the filter cartridge.

In one example, the opposite first sides of the filter cartridge have a greater dimension than opposite second sides of the filter cartridge.

In one example, the filter cartridge includes stand-off members extending past the outlet flow end of the filter cartridge media in a direction parallel to the filter cartridge longitudinal axis.

In one example, the stand-off members includes four stand-off members.

In one example, the stand-off members are integrally formed with a frame circumscribing the media pack.

In one example, an filter cartridge for an air cleaner assembly includes a media pack extending along a longitudinal axis between opposite inlet and outlet flow ends, the media pack having a length and a width defining an outer perimeter, the length being greater than the width, a radially directed seal member, the seal member including a first segment and a second segment, wherein the first and second segments are parallel to each other and wherein the first segment is axially located between the inlet and outlet flow ends and wherein the second segment is axially located beyond the inlet or outlet end.

In one example, the radially directed seal member is injected molded onto a frame circumscribing the media pack outer perimeter.

In one example, the filter cartridge includes a circumferential flange structure proximate the media pack inlet end.

In one example, the circumferential flange is integrally formed with an outer frame circumscribing the media pack.

In one example, the circumferential flange forms a handle structure for installing and removing the filter cartridge.

In one example, the first and second segments of the seal member are joined by third and fourth segments to form a closed loop, wherein the third and fourth segments extend at an oblique angle to the first and second segments.

In one example, a precleaner assembly for an air cleaner includes a first housing component defining at least one separator tube, a second housing component defining at least one outlet tube received by the at least one separator tube, wherein the first and second housing components are secured together by a snap-fit connection.

In one example, the snap-fit connection includes at least one aperture in one of the first and second housing components and at least one deflectable latch arm received by the at least one aperture in the other of the first and second housing components.

In one example, the at least one aperture includes two apertures and the at least one deflectable latch arm includes two deflectable latch arms.

In one example, a filter cartridge for an air cleaner assembly includes a media pack configured for installation into an air cleaner housing, the media pack extending along a longitudinal axis between opposite inlet and outlet flow ends, the media pack defining an outer perimeter, a circumferential shell surrounding at least a portion of the media pack outer perimeter, a flange structure extending from the circumferential shell proximate the media pack inlet end, a plurality of open pocket areas defined by the radial flange, the plurality of open pocket areas being configured to receive protrusions on a housing body of the air cleaner assembly, and a seal arrangement supported on the flange structure.

In one example, the seal arrangement is an outwardly directed radial seal.

In one example, the at least one of the plurality of open pocket areas is located radially between the circumferential shell and the seal arrangement.

In one example, the seal arrangement includes at least one outwardly radially directed lip seal for forming a seal against an interior surface of the air cleaner housing.

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 13 is a first cross-sectional view of the air cleaner assembly shown in FIG. 1.

FIG. 14 is a second view of the air cleaner assembly shown in FIG. 1.

FIG. 22 is a first side view of the filter cartridge shown in FIG. 20.

FIG. 23 is a second side view of the filter cartridge shown in FIG. 20.

FIG. 24 is a first end view of the filter cartridge shown in FIG. 20.

FIG. 25 is a second end view of the filter cartridge shown in FIG. 20.

DETAILED DESCRIPTION

Figure 1:
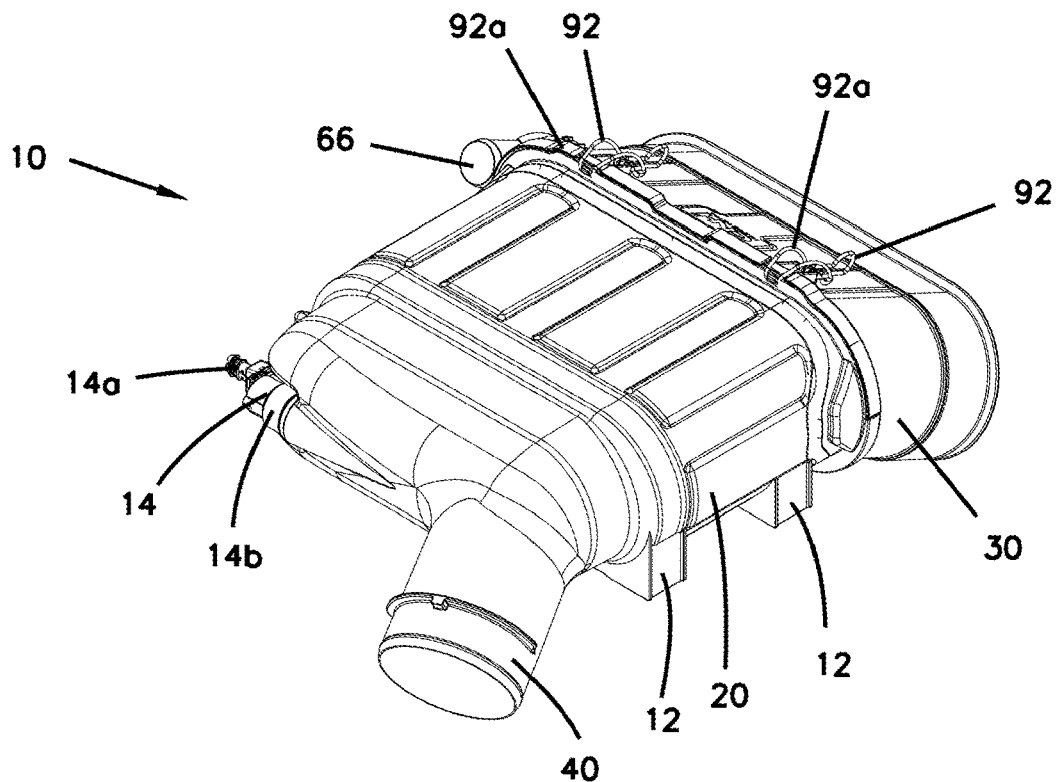
FIG. 1 is a first perspective view that is a schematic representation of an air cleaner assembly having features in accordance with the present disclosure.
Figure 2:
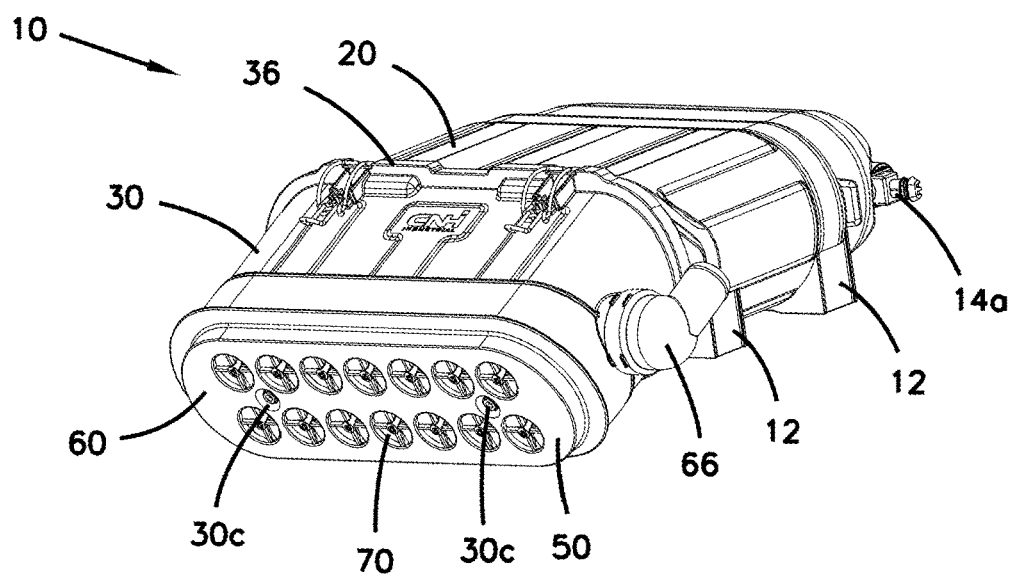
FIG. 2 is a second perspective view of the air cleaner assembly shown in FIG. 1.
Figure 3:
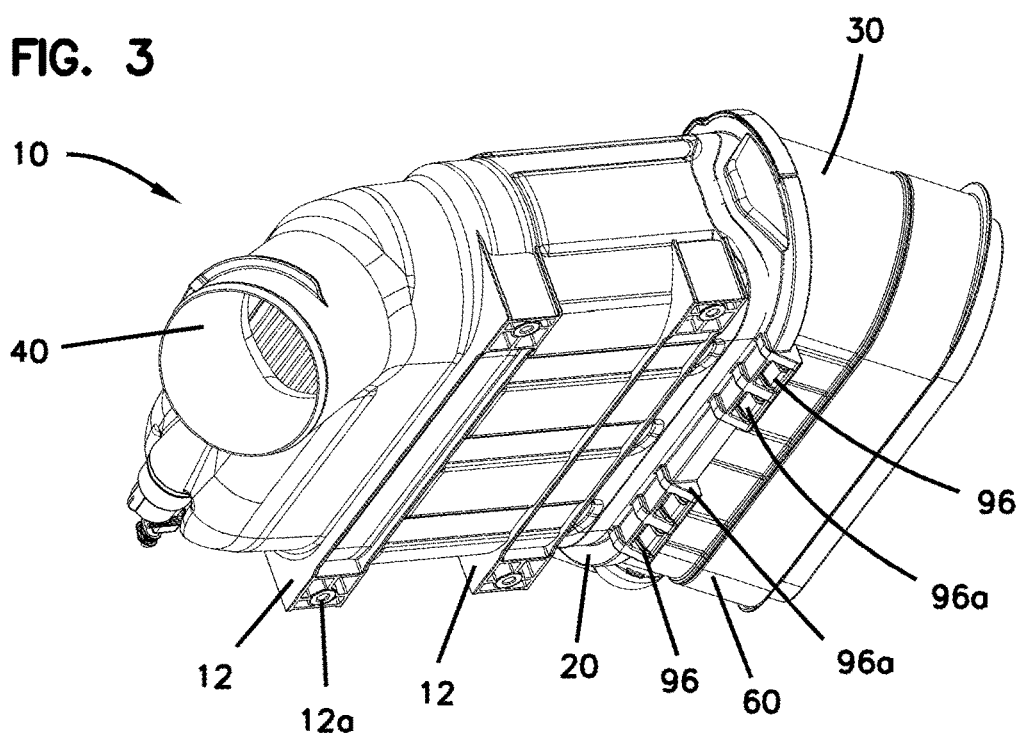
FIG. 3 is a third perspective view of the air cleaner assembly shown in FIG. 1.
Figure 4:
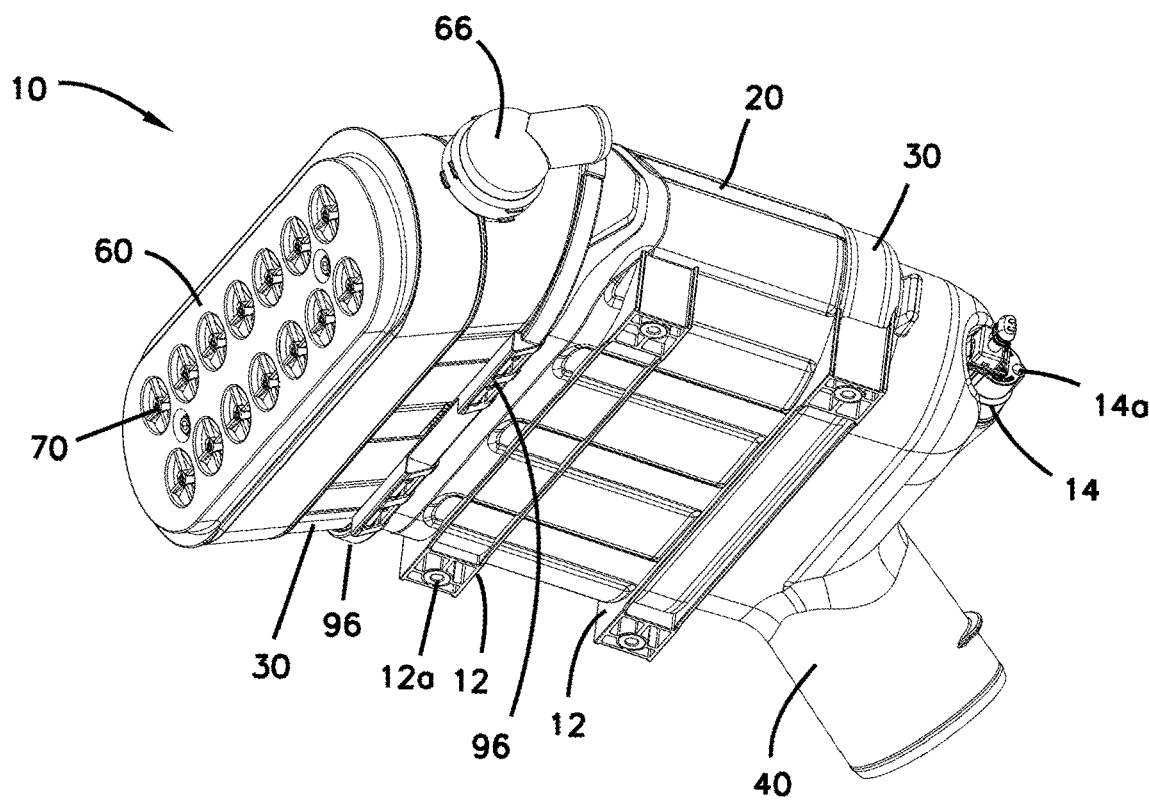
FIG. 4 is a fourth perspective view of the air cleaner assembly shown in FIG. 1.
Figure 5:
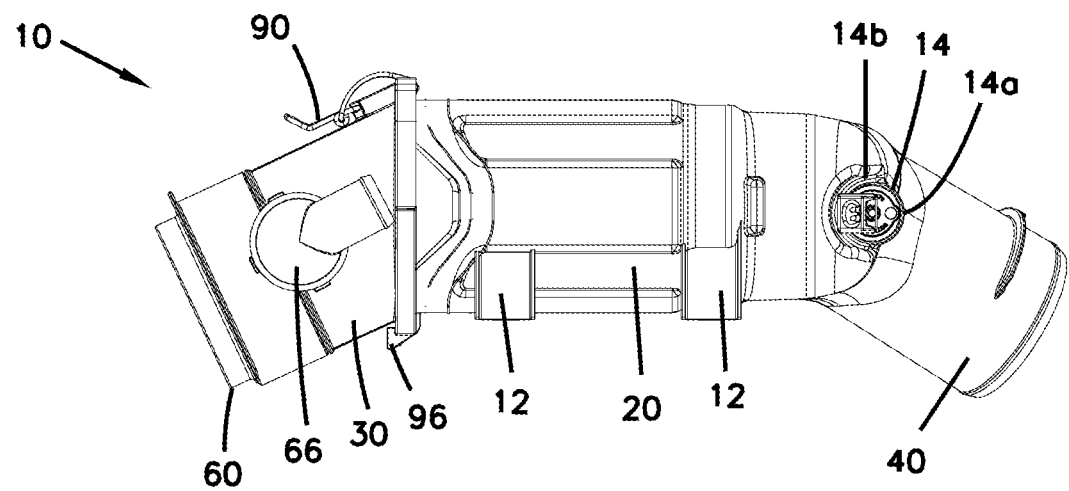
FIG. 5 is a first side view of the air cleaner assembly shown in FIG. 1.
Figure 6:
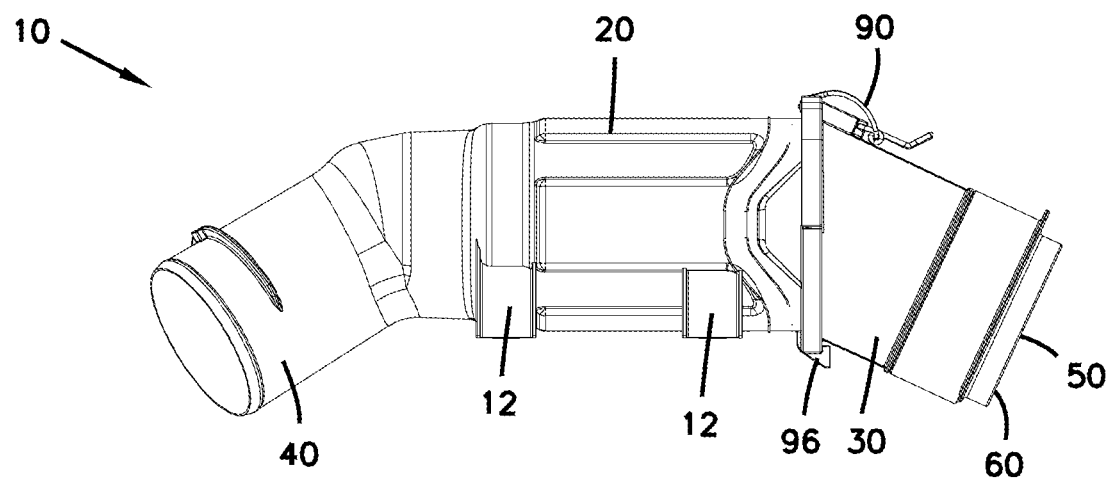
FIG. 6 is a second side view of the air cleaner assembly shown in FIG. 1.
Figure 7:
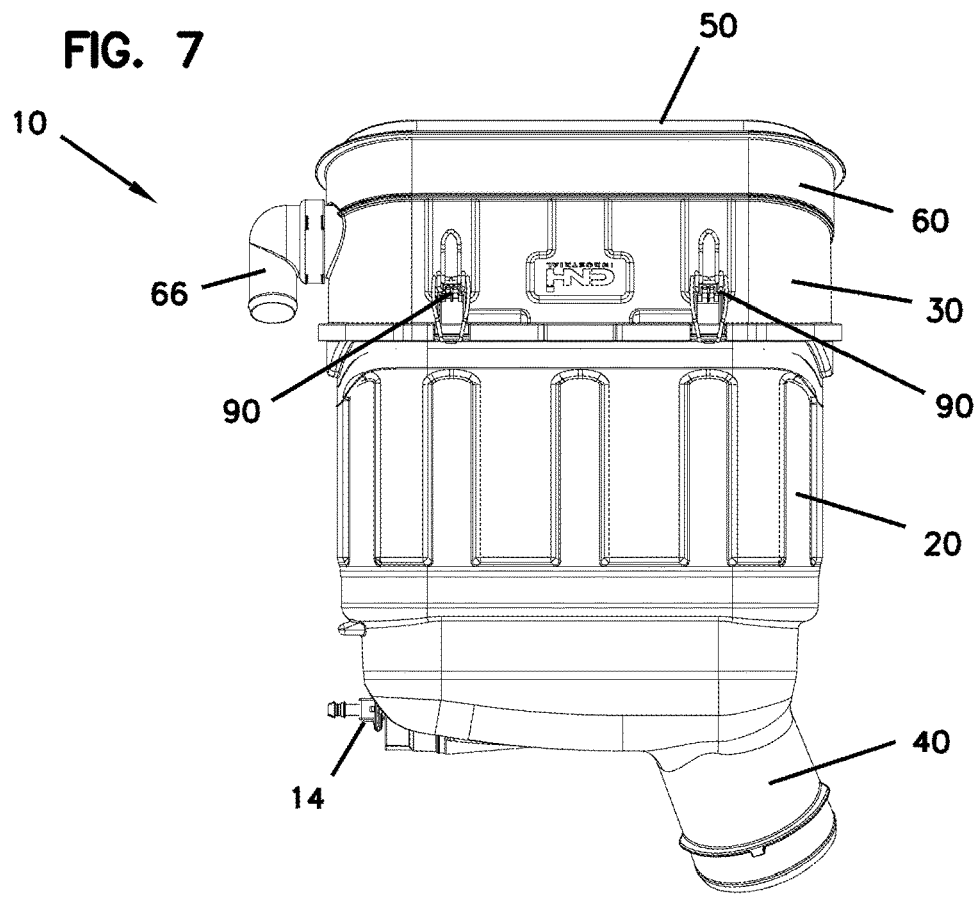
FIG. 7 is a third side view of the air cleaner assembly shown in FIG. 1.
Figure 8:
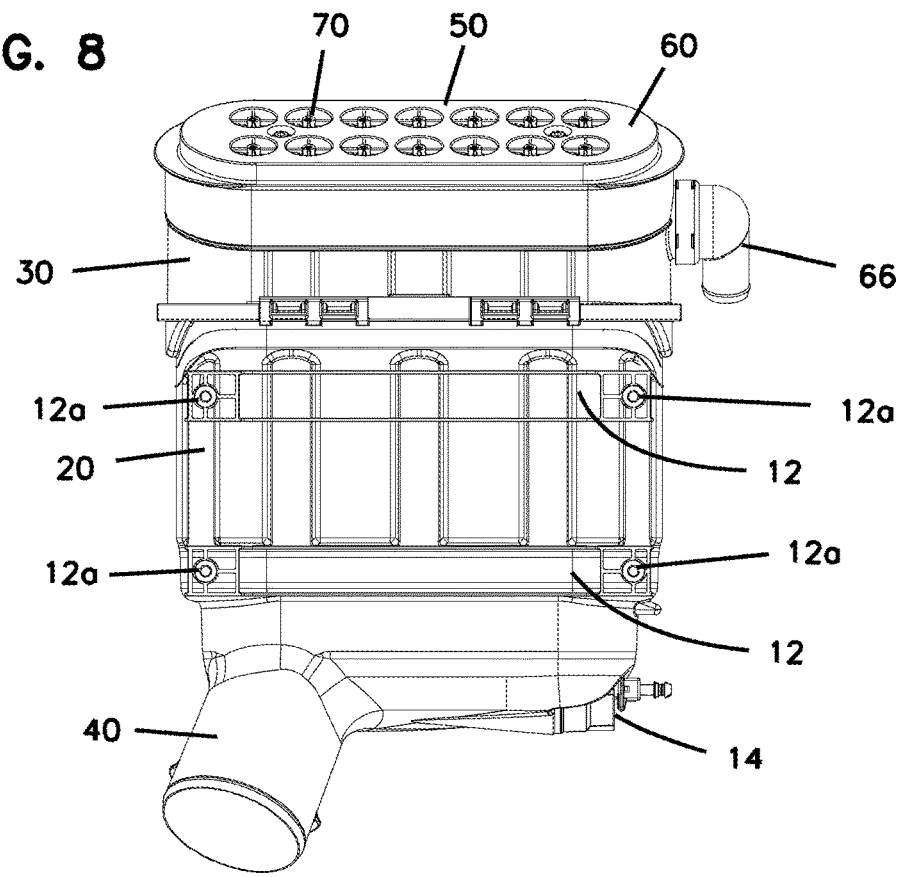
FIG. 8 is a fourth side view of the air cleaner assembly shown in FIG. 1.
Figure 9:
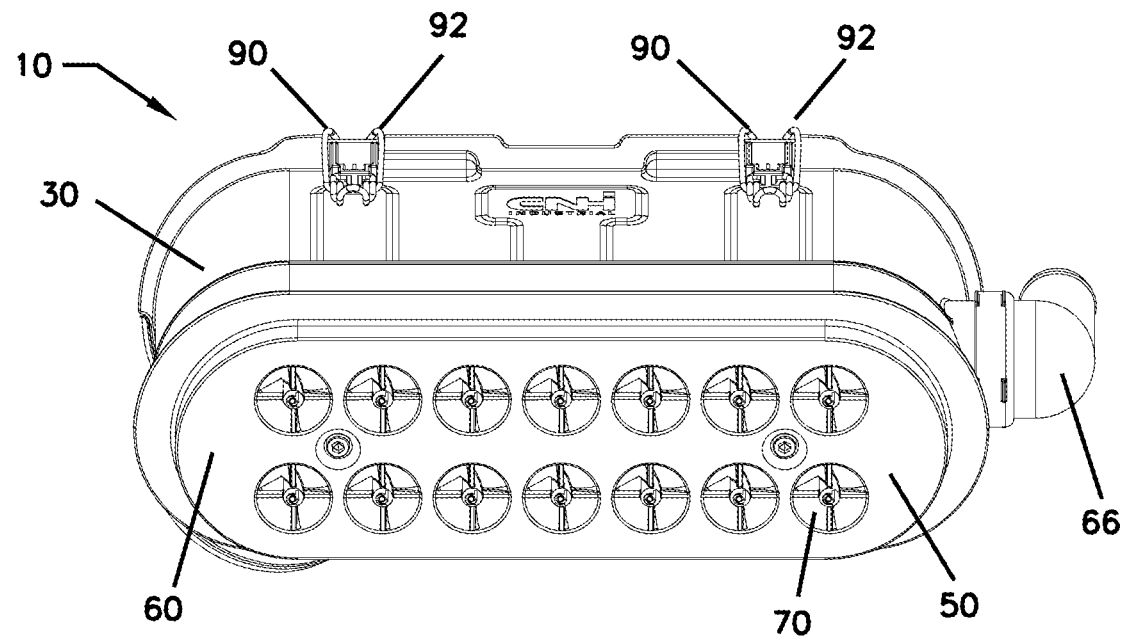
FIG. 9 is a first end view of the air cleaner assembly shown in FIG. 1.
Figure 10:
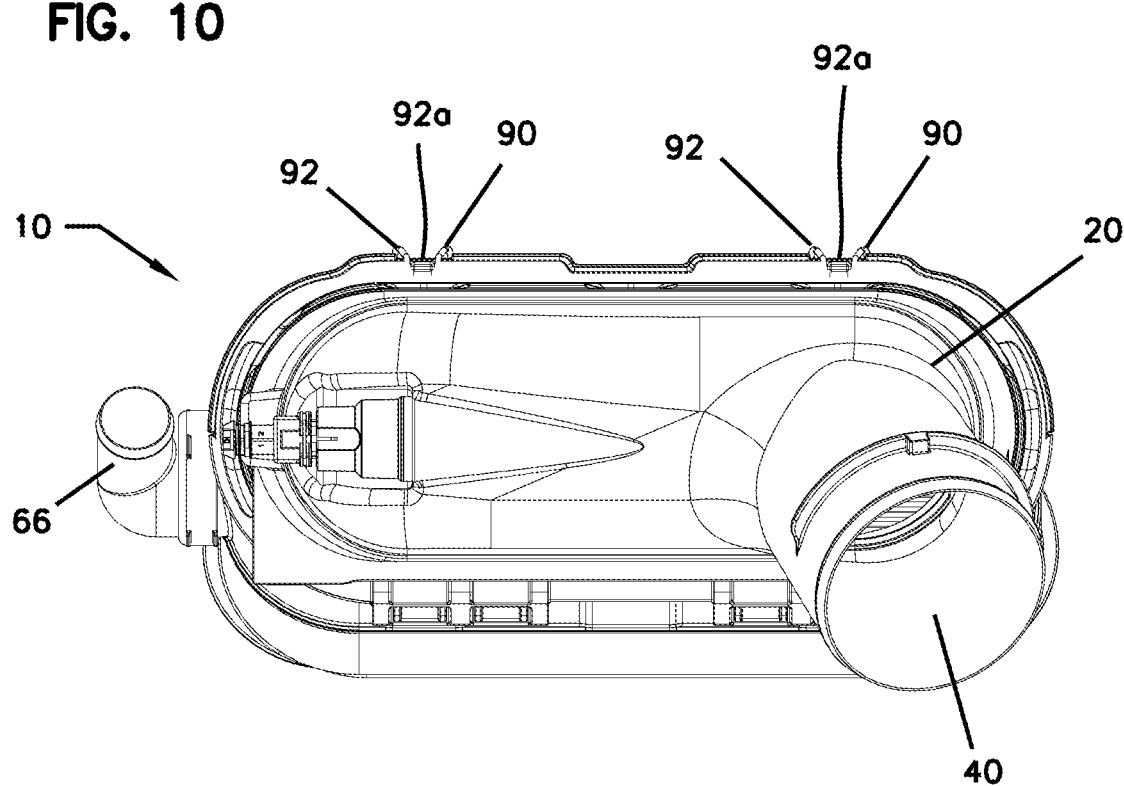
FIG. 10 is a second end view of the air cleaner assembly shown in FIG. 1.
Figure 11:
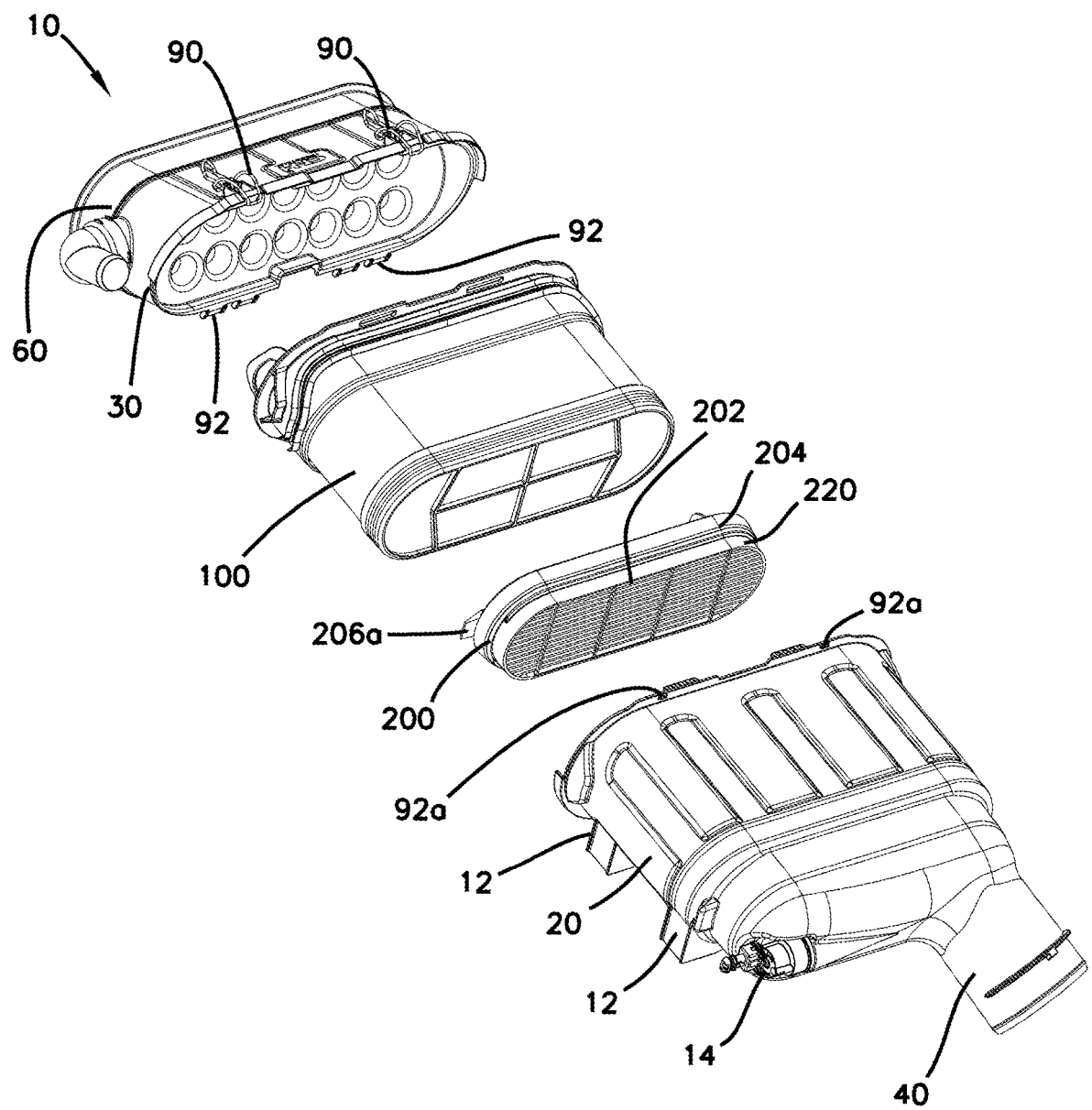
FIG. 11 is a first perspective exploded view of the air cleaner assembly shown in FIG. 1.
Figure 12:
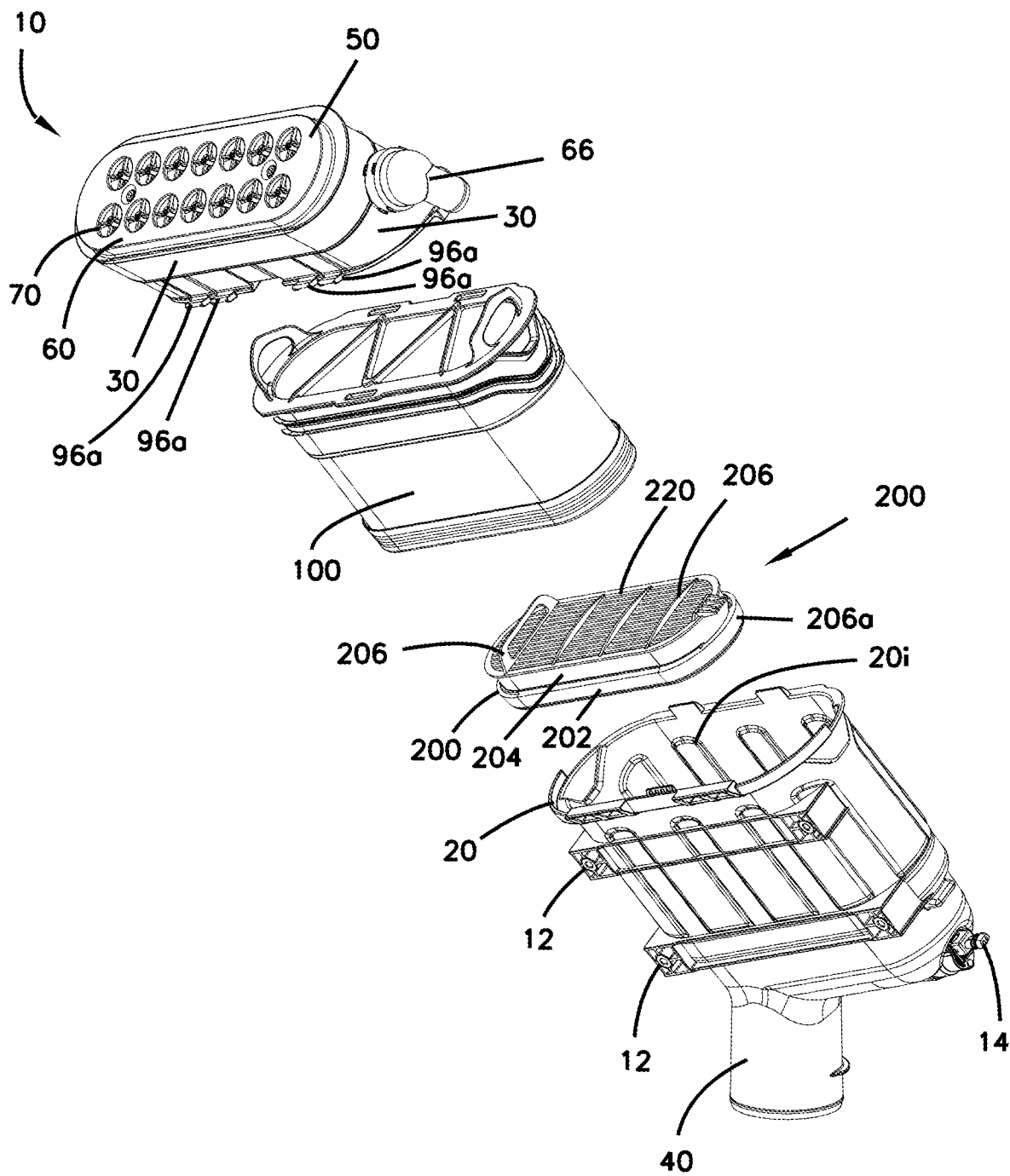
FIG. 12 is a second perspective exploded view of the air cleaner assembly shown in FIG. 1.
Figure 15:
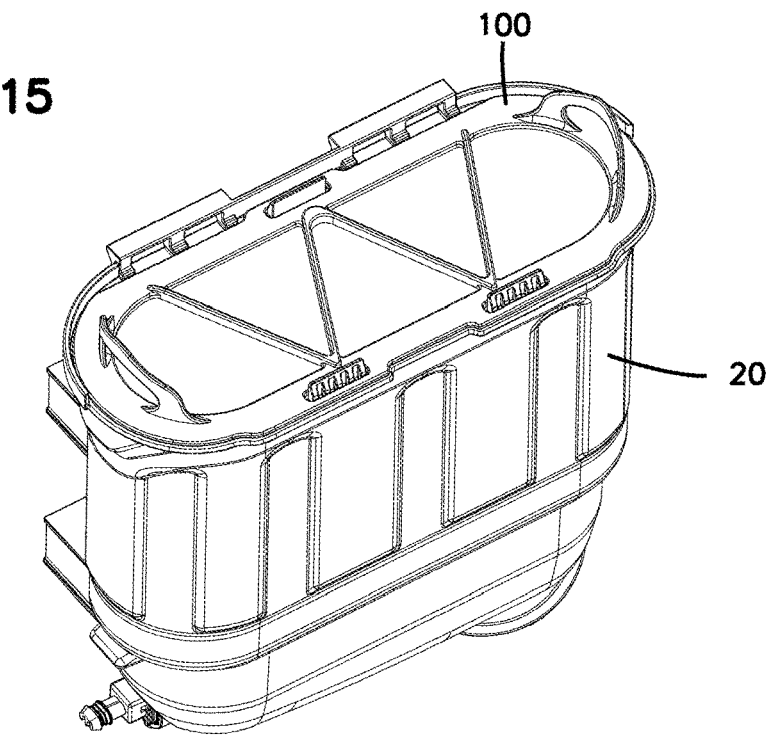
FIG. 15 is a first perspective view of the air cleaner assembly shown in FIG. 1 with the cover assembly removed.
Figure 16:
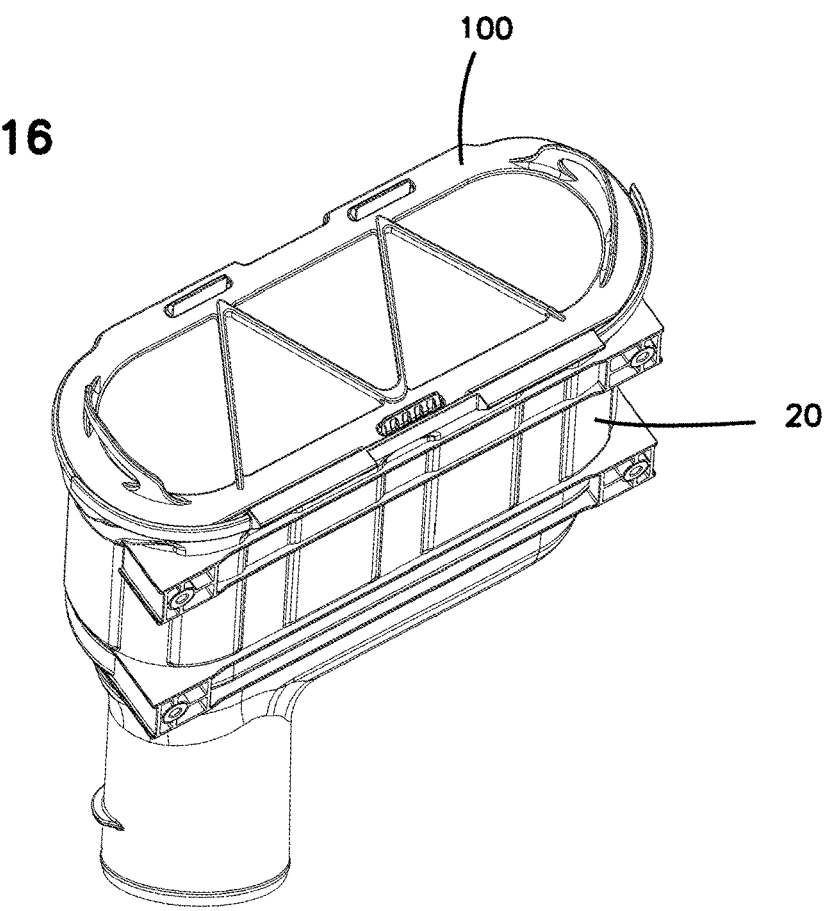
FIG. 16 is a second perspective view of assembly shown in FIG. 15.
Figure 17:
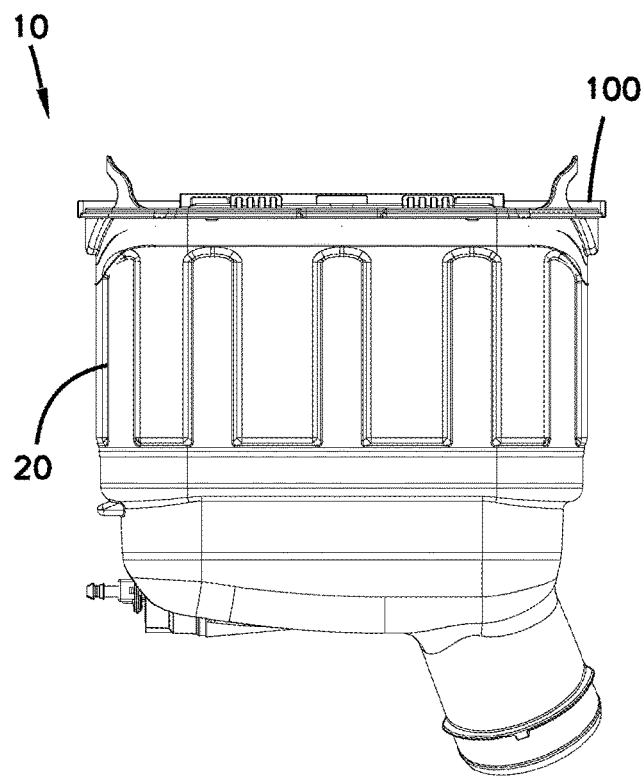
FIG. 17 is a first side view of assembly shown in FIG. 15.
Figure 18:
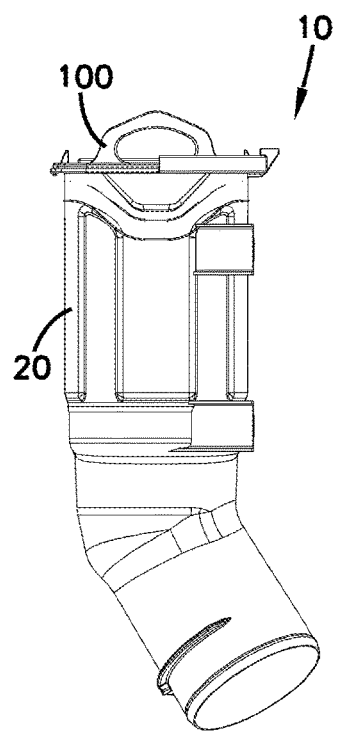
FIG. 18 is a second side view of assembly shown in FIG. 15.
Figure 19:
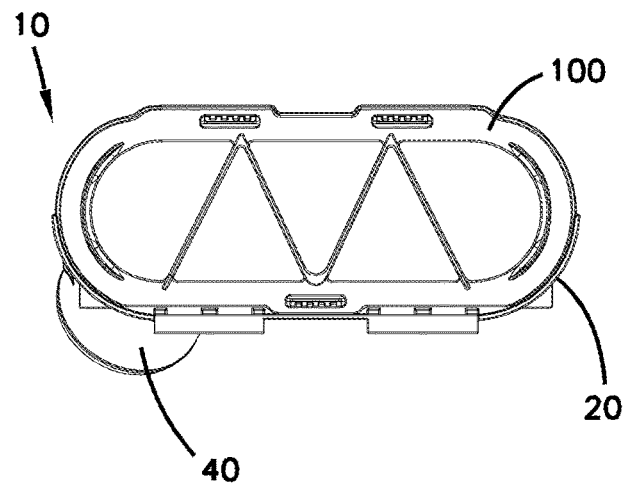
FIG. 19 is a first end view of assembly shown in FIG. 15.
Figure 20:
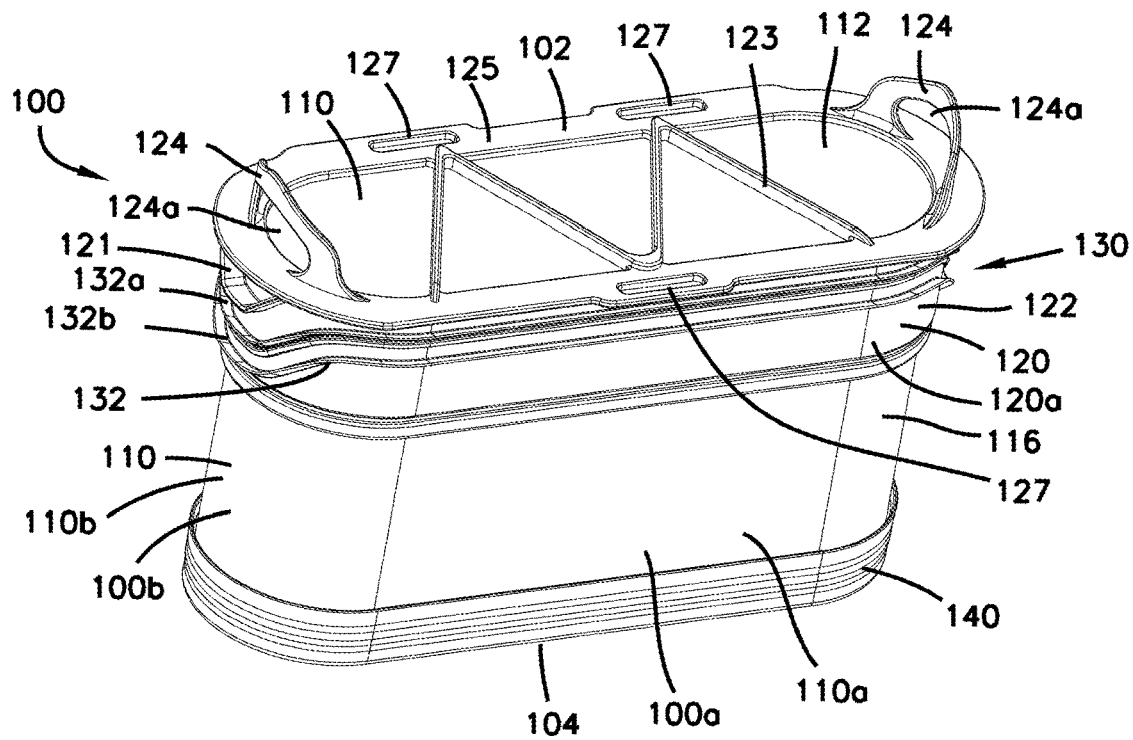
FIG. 20 is a first perspective view of a filter cartridge installed in the air cleaner assembly shown in FIG. 1.
Figure 21:
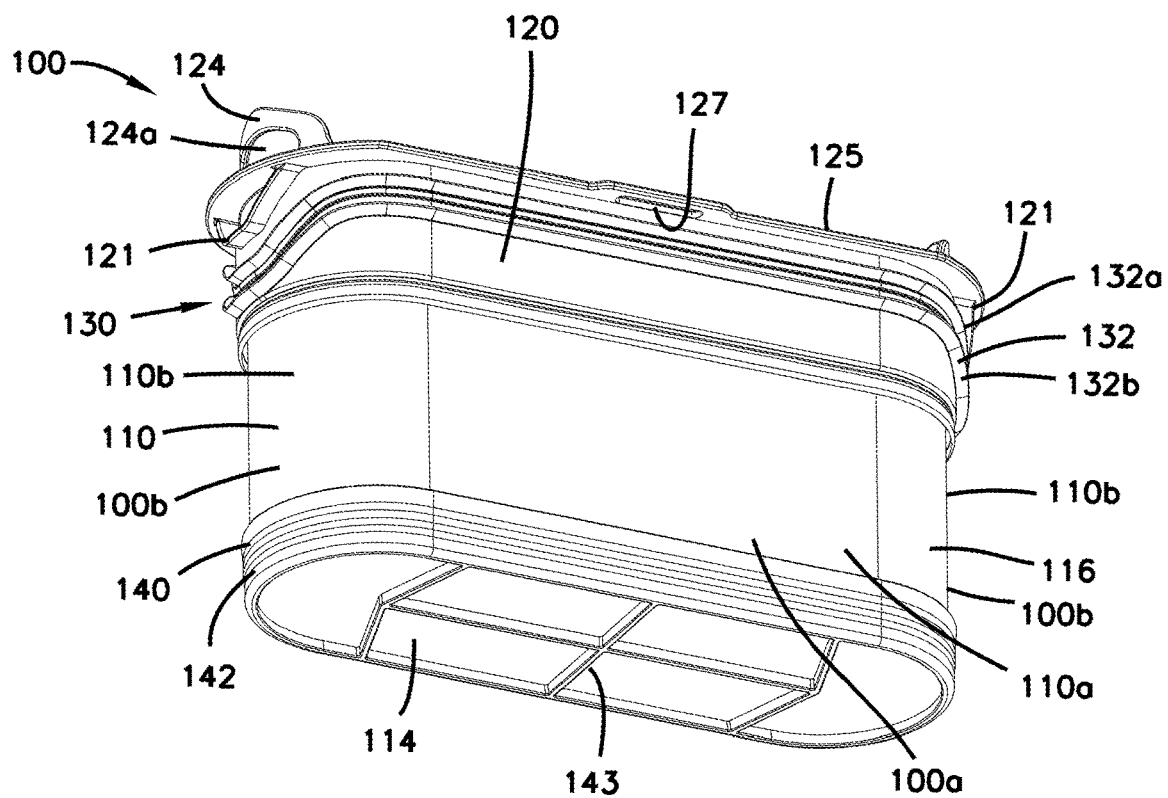
FIG. 21 is a second perspective view of the filter cartridge shown in FIG. 20.

Various examples will be described in detail with reference to the drawings, wherein like reference numerals represent like parts and assemblies throughout the several views. Reference to various examples does not limit the scope of the claims attached hereto. Additionally, any examples set forth in this specification are not intended to be limiting and merely set forth some of the many possible examples for the appended claims. Referring to the drawings wherein like reference numbers correspond to like or similar components throughout the several figures.

General Construction

Referring to FIGS. 1-14, a filter assembly 100 is presented. In many examples, the filter assembly 100 depicted is an air cleaner assembly 100, for example, used to filter intake air for an internal combustion engine. Additional applications are possible, for example, applications in which the filter assembly 100 is a crankcase ventilation filter assembly, in which the filter cartridge is used to filter crankcase blowby gases which include, typically, both particulate and liquid contaminant therein. Both type of filter assemblies are generally "gas filter assemblies," since the carrier stage being filtered is gas (air or crankcase ventilation gases). While the techniques described herein will typically be used in application for gas filtration, they can be used in the filtration of other materials, for example, liquids, if desired.

Referring now to the Figures, wherein the components are labeled with like numerals throughout the several Figures, FIG. 1 is a perspective view of an air cleaner 10 in accordance with an embodiment of the invention. The air cleaner 10 includes a housing body 20 a cover assembly 30 which cooperatively define an interior region 20*i* within which a primary removable filter cartridge 100 and a secondary removable filter cartridge 200 are disposed. The air cleaner assembly 10 further includes an air inlet end 50 through which air to be filtered enters the assembly 10. The air cleaner assembly 10 further includes an outlet 40 that is positioned for exit of filtered air. The outlet 40 can be made separately from the housing body 20 and attached thereto, or it can be integrally constructed as a portion of the housing body 20.

In one aspect, the air cleaner assembly 10 illustrated is a two-stage air cleaner assembly that includes a precleaner 60 as part of the cover assembly 30. In one aspect, the cover assembly 30 is provided as two separable components 30*a*, 30*b* in which a cover body 30*a* is embodied in sidewall 32 and the precleaner 60 is embodied as the second component 30*b*. The components 30*a*, 30*b* can be secured to the housing body 20 via fasteners (e.g. threaded screws) 30*c*. The precleaner 60 generally is used to clean selected material or contaminants carried by an air stream into the air cleaner assembly 10 before the air reaches the filter cartridge positioned therein. The precleaner generally includes a plurality of separator tubes 62 or centrifugal separators that receive air and spin the air in order to remove large particulates, and then permit pre-cleaned air to exit the precleaner. The separator tubes 62 can be viewed most easily at the cross-sectional views shown in FIGS. 13 and 14. The pre-cleaned air from the separator tubes 62 exits at an outlet 64 of the precleaner 60 and then flows into the inlet flow face of the filter cartridge 100. A scavenge port or outlet 66 can be provided in the cover assembly 30 for removal of the separated large particulates. In the embodiment shown in FIG. 14, fourteen separator tubes 64 are provided. More or fewer separator tubes may be provided. The air cleaner assembly 10 may be provided without a precleaner assembly, such that the air cleaner assembly 10 is a single stage assembly with a primary only filter cartridge 100 or with a primary and secondary filter cartridge 100, 200.

In one aspect, the housing body 20 is defined by a perimeter sidewall 22 defined a pair of long, straight sides 22*a* and a pair of short, curved sides 22*b*. In one aspect, the long, straight sides 22*a* are relatively flexible, particularly in comparison to the sides 22*b*. The sidewall 22 extends from an open end 22*c* for receiving the filter cartridges 100, 200 to an outlet end 22*d* proximate the outlet 40. The housing body 20 is shown in isolation at FIGS. 41 to 47. As shown, the perimeter sidewall 22 extends to a radial flange wall 24 proximate the open end 22*a*. The flange wall 24 is for supporting a corresponding flange 125 (discussed later) of the filter cartridge 100. An axial flange wall 26 is also shown as extending from the radial flange wall 24. The axial flange wall 26 of the housing body 20 cooperates with an axial flange wall 26 on the cover assembly 30 to form a weather barrier to prevent general ingress of moisture and contaminants into the filter housing. As shown, a plurality of axial protrusions 28 extend from the radial flange wall 24.

The axial protrusions 28 are received by corresponding openings 127 (discussed later) of the filter cartridge 100. Taken together, the protrusions 28 and openings 127 form cooperating components of a projection-receiver arrangement, wherein the openings 127 can be referred to as a first component 127 and the protrusions can be referred to as a second component 28 of the projection-receiver arrangement. In one aspect, the axial protrusions 28 are tapered with a ramped surface 28a to enable easier initial alignment of the protrusions 28 within the openings 127 and to allow a smooth transition to the full thickness of the protrusions 28 such that tension can be gradually increased. Although the ramped surface 28a is shown as facing outwardly from the housing body 20, the ramped surface 28a could also be arranged to be inwardly facing towards the longitudinal axis of the housing body. In the embodiments shown, the protrusions 28 contact only the radially inwardly facing portions of the openings 127 on the side of the ramped surface 28a such that the interaction between the openings 127 and protrusions 28 only acts to constrain radially outward deflection of the relatively flexible housing sidewall long sides 22a. While projections 28 with ramped surfaces 28a could be provided on both sides of the projections 28 such that the interaction of the projections 28 and openings 127 constrain the sidewall long sides 22a in both the inward and outward radial directions, a larger filter cartridge 100 would result as the location of the protrusions would need to be moved radially outward. Thus, the disclosed arrangement of utilizing the protrusions 28 and openings to provide an outward constrain on the housing sidewalls 22a results in a more compact configuration.

As shown, the protrusions 28 are disposed along the long sides 22a of the flange wall 24. In the embodiment shown, the protrusions 28 are configured as elongate members extending in a lengthwise direction that is parallel to the long sides 24a of the flange wall 24. As shown, one protrusion 28 is provided on one of the long sides 24a while two protrusions 28 are provided on the other of the long sides 24a of the flange wall 24. However, other configurations are possible, such as providing two or more protrusions 28 on each long side 24a. Although the protrusions 28 are shown as being elongated members, the protrusions 28 could be formed from a variety of shapes, for example, prismatic geometric shapes such as circles, triangles, squares, etc.

In one aspect, the housing body 20 defines a pair of recesses or cavities 22e disposed along the short sides 22b of the housing body 20. The recesses 22e form part of a receiver-projection arrangement and are configured to receive correspondingly shaped projections 121 on the filter cartridge 100. The interaction between the recesses 22e and the projections 121 that cooperatively form the receiver-projection arrangement enables the filter cartridge 100 to be properly aligned with the housing body 20 such that a seal member 130 of the filter cartridge can adequately form a seal against a seal surface 22f of the housing body 20. The projections 121 and seal member 130 of the filter cartridge 100 are further discussed in the following section.

In one aspect, the air cleaner assembly 10 can be provided with a mounting system 12 for mounting the air cleaner assembly 10 to a structure, such as a portion of a vehicle. As shown, the mounting system 12 are presented as a pair of feet or ribs 12a extending from the housing body 20. The feet 12a can be provided with openings 12b for accepting screws or bolts. In some examples, the openings 12b are threaded.

In one aspect, the air cleaner assembly 10 can be provided with an airflow sensing system 14 for measuring the airflow exiting the air cleaner assembly 10. In one aspect, the airflow sensing system 14 includes an airflow measuring component 14a. In one example, the airflow measuring component 14a includes a mechanical airflow restriction indicator. The housing body 20 can include a port 14b for receiving the airflow measuring component 14a.

In one aspect, the air cleaner assembly 10 can include a locking or latching mechanism 90 for securing the cover assembly 30 to the housing body 20. In the embodiment shown, the latching mechanism 90 includes a pair of over-center type latches 92 that secure one side of the interface between the cover assembly 30 and housing body 20. More or fewer latches 92 may be provided. Also, latches of a different style may also be provided. In the embodiment shown, the latches 92 are mounted to the cover assembly 30 and engage with a latch connection portion 92a located on the housing body 20. The latches 92 can be alternatively mounted on the housing body 20.

On the side of the air cleaner assembly 10 opposite the latches 90, the housing body 20 includes a pair of first interface members 94 and the cover assembly 30 includes a pair of second interface members 96. As configured, each of the first interface members 94 define a pair of central openings 94a and each of the second interface members 96 define a pair of laterally extending protrusions 96a. The central openings 94a of each first interface member 94 receive the laterally extending protrusions 96a of one of the second interface members 96, but allow for rotation of the cover assembly 30 with respect to the housing body 20. The cover assembly 30 is installed onto the housing body 20 by first inserting the laterally extending protrusions 96a into the openings 94a, and then rotating the cover assembly 30 into a closed position with respect to the housing body 20. In the closed position, the latches 92 can engage with the housing body latch connection portions 92a to secure the cover assembly 30 to the housing body 20. Although two interface members 94, 96 are shown and although two openings 94a and two protrusions 96a are shown for each interface member 94, 96, more or fewer interface members and/or protrusions and openings may be provided. Additionally, the openings 94a can be provided on the cover assembly 30 and the protrusions 96a could be provided on the housing body 20 in some configurations.

In the embodiment shown, the cover assembly 30 is defined by a perimeter wall 32 and a flange wall 34. The cover assembly 30 is shown in isolation at FIGS. 35-40. In one aspect, each of the perimeter wall 32 and flange wall 34 have a pair of straight, long sides 32a, 34a adjoining a pair of short, curved sides 32b, 34b. At the location of the protrusions 28 of the housing body 28, the cover assembly 30 is provided with recessed or cavity portions 36 for receiving the protrusions 28. Thus, when the cover assembly 30 is rotated into the closed position, the protrusions 28 do not interfere with the closing action. The cover assembly 30 is also provided with a radial flange wall 34 extending from the perimeter wall 32. When the cover assembly 30 is in the closed position, the flange wall 34 of the cover assembly 30 and the flange wall 24 of the main body 20 sandwich the flange wall 125 of the filter cartridge 100 to secure the filter cartridge 100 in the installed position. As stated previously, the cover assembly 30 also includes an axially extending flange wall 38 that acts as a weather barrier in conjunction with flange wall 26 of the housing body 20. Although the flange wall 38 is not shown as extending completely about the flange wall 34, such a configuration is possible.

Filter Cartridge 100

Referring now to FIGS. 20-34, an exemplary embodiment of filter cartridge 100 of air cleaner assembly 10 is illustrated. The filter cartridge 100 extends between a first end 102 and a second end 104. In one aspect, the first end 102 can be characterized as the upstream end of the filter cartridge 100 while the second end 104 can be characterized as the downstream end of the filter cartridge 100. The filter cartridge 100 can be considered to be the main or primary filter cartridge, and is used to selectively separate a desired amount of particulate or containment material.

Filter cartridge 100 is generally a service part or removable component, such that it is periodically removable and replaceable as desired or necessary during the lifetime of the air cleaner 10. In particular, when the cartridge 100 becomes occluded or otherwise needs to be replaced, the cover assembly 30 is unlocked from the housing body 20, and the occluded filter 100 is removed. After such removal, another filter 100 can be placed in the housing body 20 by inserting the filter cartridge 100.

The filter cartridge 100 generally includes a media pack 110, a shell 120, a sealing member 130 at the inlet end of the media pack 110, and a second shell 140.

In one aspect, the sealing member 130 will generally be made of a relatively flexible material and may be referred to herein as a "flexible sealing member," and can include a pinch, axial (i.e. facing in a direction or plane orthogonal to the longitudinal axis of the filter cartridge), or radial (i.e. facing in a direction or plane(s) parallel to the longitudinal axis of the filter cartridge) sealing member. In the example shown, the flexible material is an injection-molded thermoplastic elastomer (TPE). The seal member 130 may also be formed from other materials, such as polyurethane. The retaining features of the housing and filter cartridges disclosed herein are particularly advantageous for use with configurations with filter cartridges with radial sealing members. In one example, the sealing member 130 is provided as an injection-molded gasket that is molded directly onto the shell 120. In the embodiment shown, the sealing member 130 is provided as an injection-molded gasket with a pair of radially acting, parallel lip seals 132 (132a, 132b). In some arrangements, the sealing member 130 can be formed directly onto the media pack 110 or directly secured to the media pack 110. In one aspect, the lip seals 132 can be characterized as outwardly directed radial seals that seal against an interior face or surface of the housing body 20 within the interior region 20i.

Figure 26:
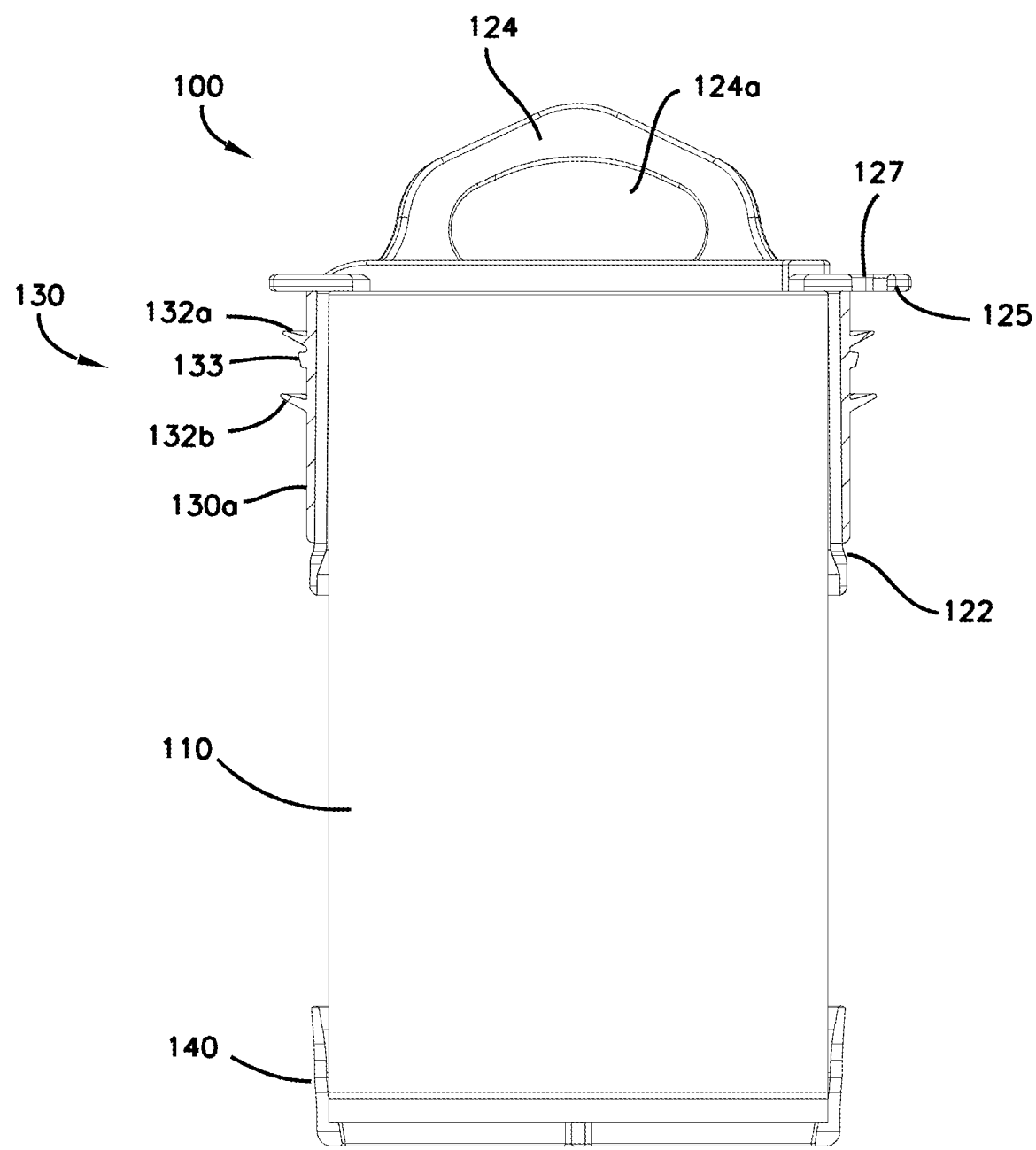
FIG. 26 is a cross-sectional view of the filter cartridge shown in FIG. 20.
Figure 27:
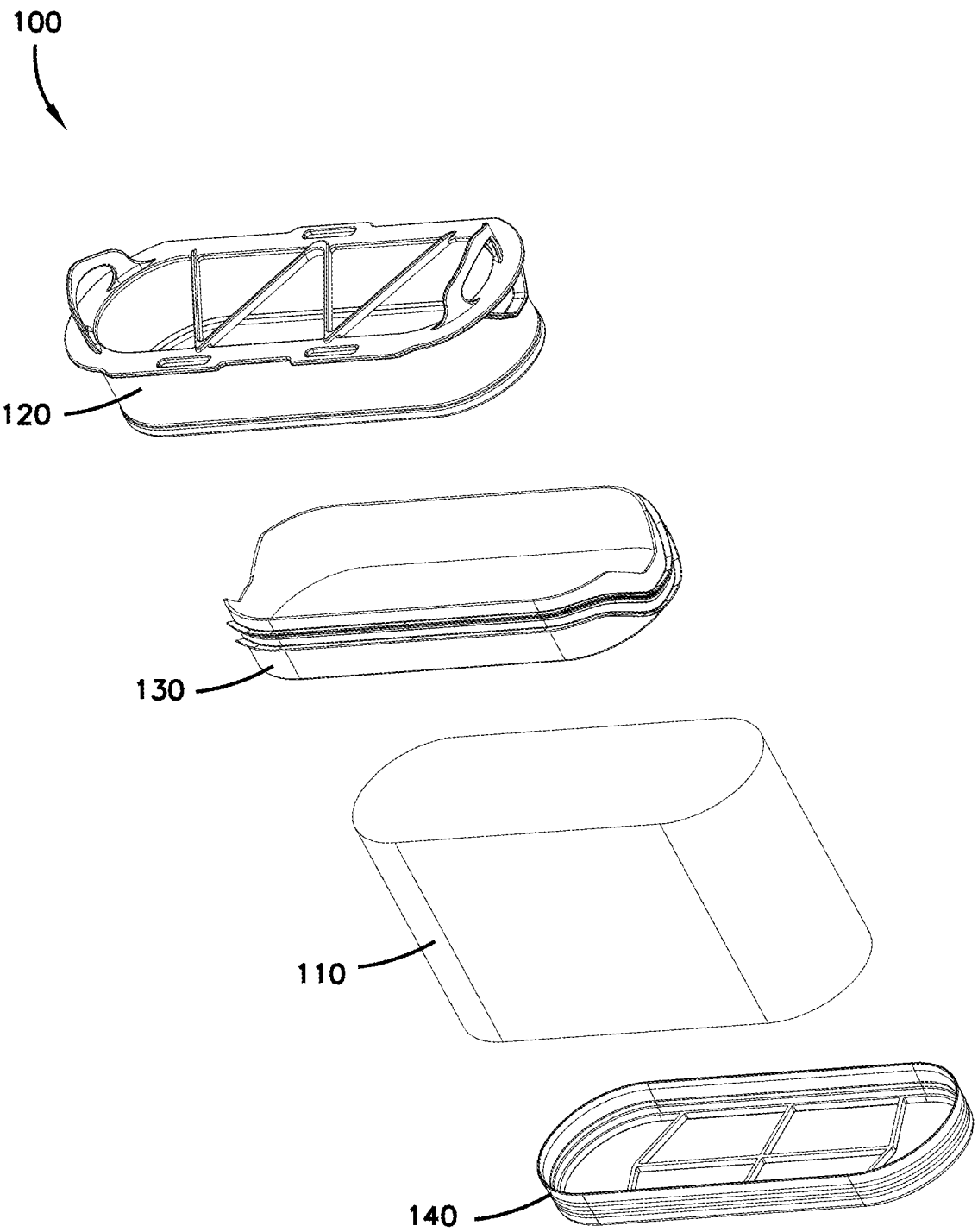
FIG. 27 is a first exploded perspective view of the filter cartridge shown in FIG. 20.
Figure 28:
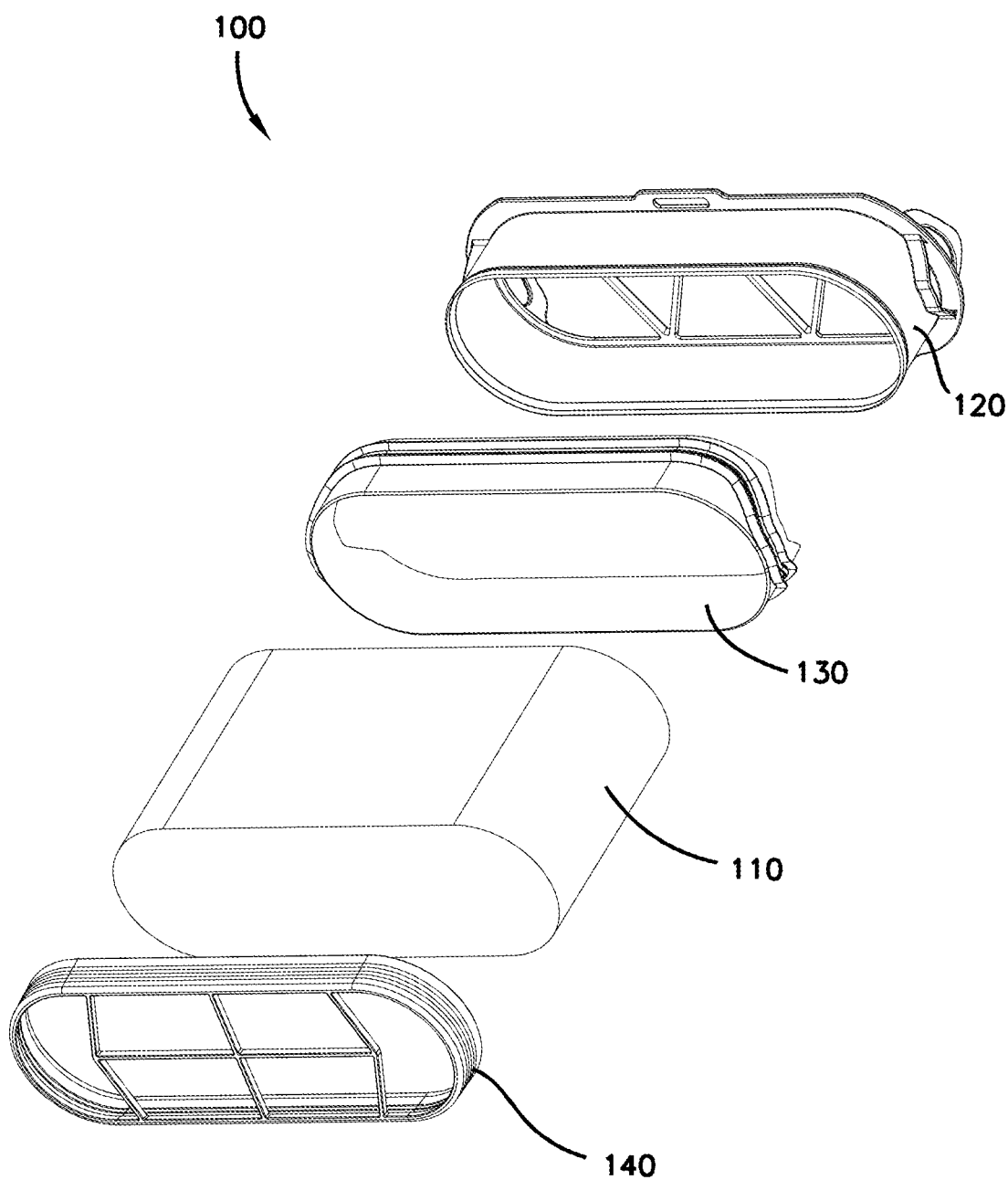
FIG. 28 is a second exploded perspective view of the filter cartridge shown in FIG. 20.
Figure 29:
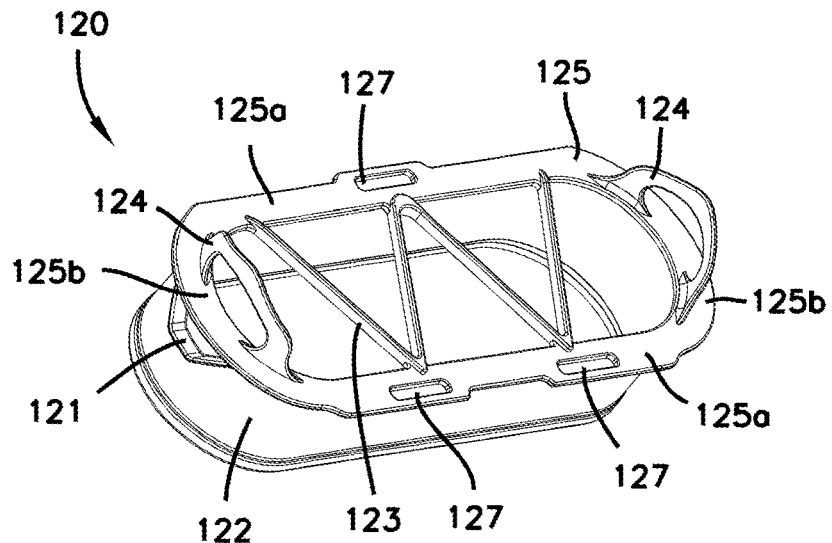
FIG. 29 is a first perspective view of a shell of the filter cartridge shown in FIG. 20.
Figure 30:
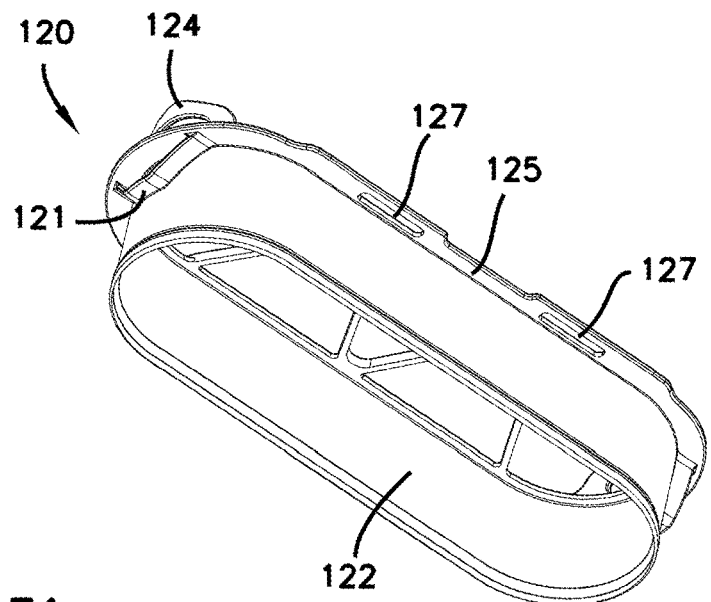
FIG. 30 is a second perspective view of the shell shown in FIG. 29.
Figure 31:
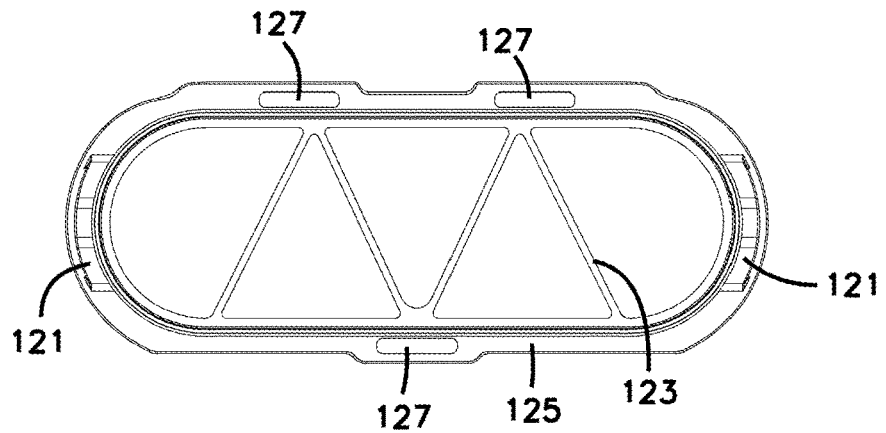
FIG. 31 is a first end view of the shell shown in FIG. 29.
Figure 32:
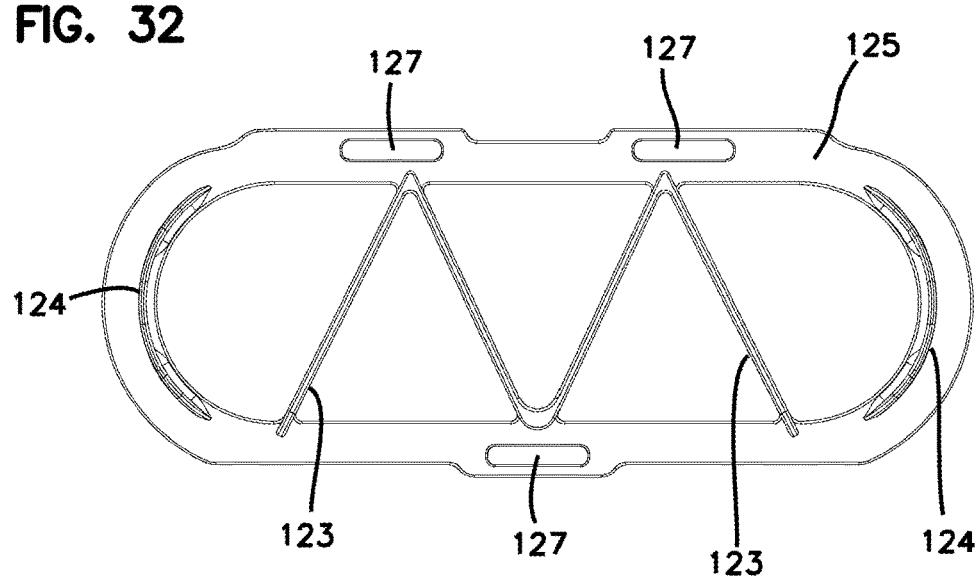
FIG. 32 is a second end view of the shell shown in FIG. 29.
Figure 33:
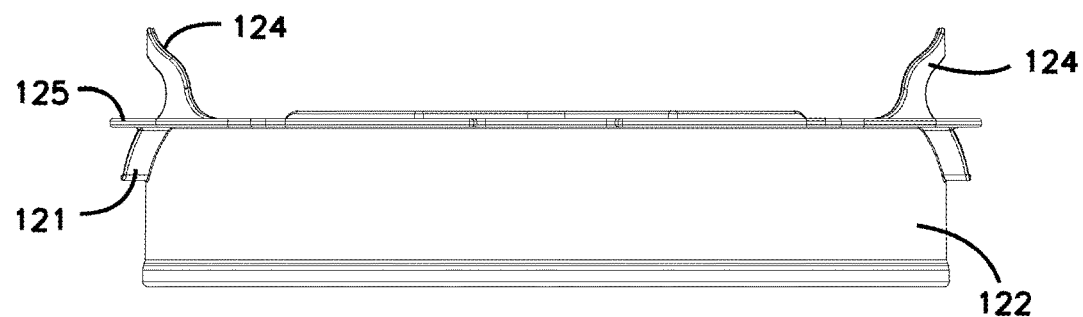
FIG. 33 is a first side view of the shell shown in FIG. 29.
Figure 34:
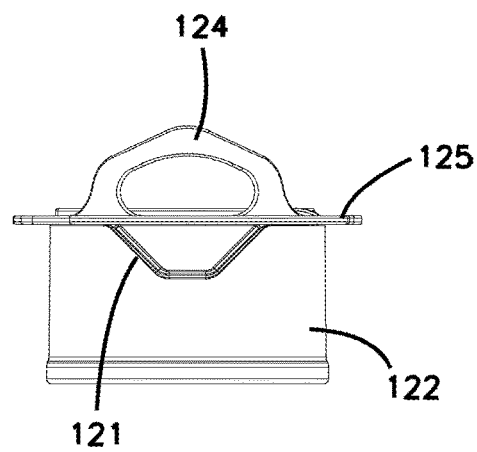
FIG. 34 is a second side view of the shell shown in FIG. 29.
Figure 35:
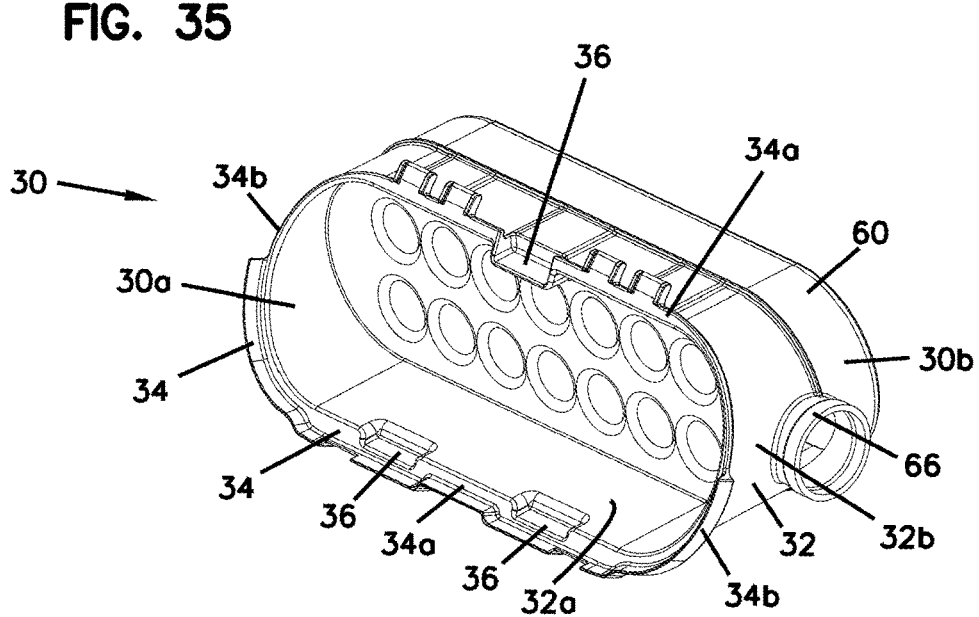
FIG. 35 is a first perspective view of a cover assembly of the air cleaner assembly shown in FIG. 1.
Figure 36:
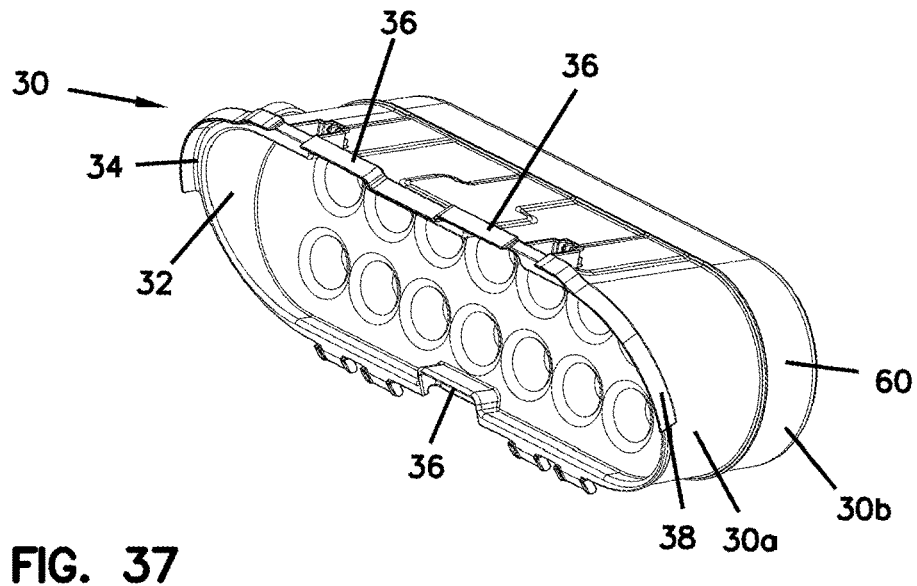
FIG. 36 is a second perspective view of the cover assembly shown in FIG. 35.
Figure 37:
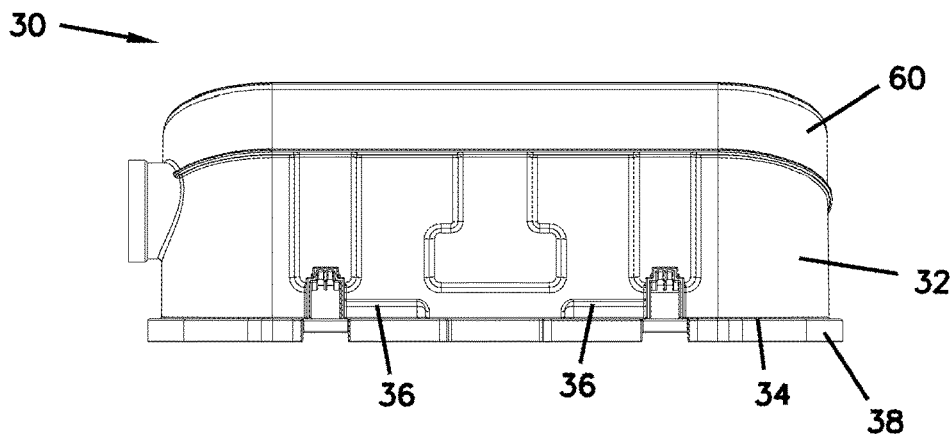
FIG. 37 is a first side view of the cover assembly shown in FIG. 35.
Figure 38:
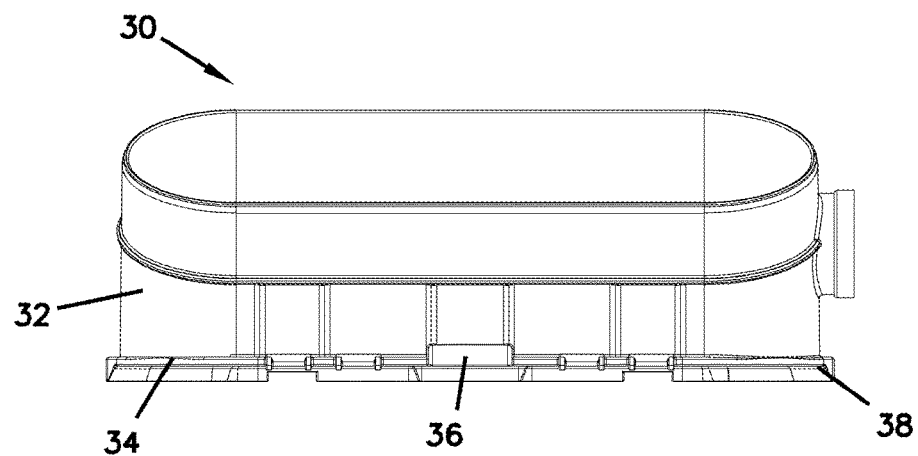
FIG. 38 is a second side view of the cover assembly shown in FIG. 35.
Figure 39:
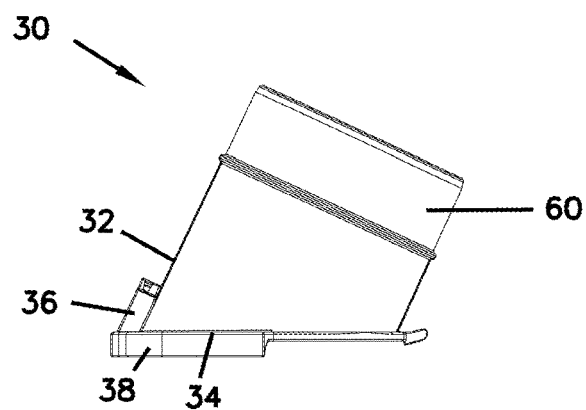
FIG. 39 is a third side view of the cover assembly shown in FIG. 35.
Figure 40:
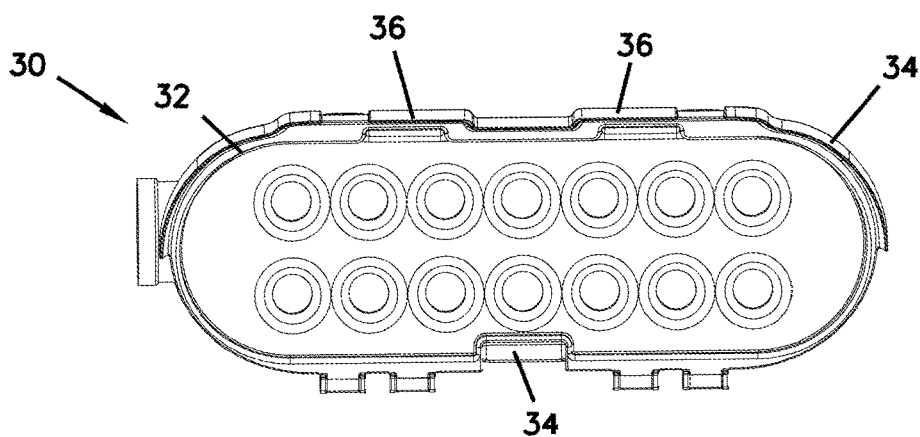
FIG. 40 is a first end view of the cover assembly shown in FIG. 35.
Figure 41:
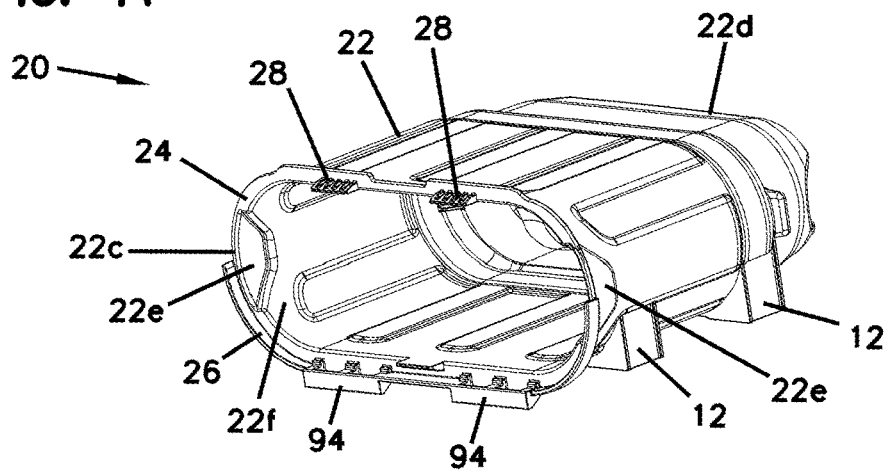
FIG. 41 is a first perspective view of a housing of the air cleaner assembly shown in FIG. 1.
Figure 42:
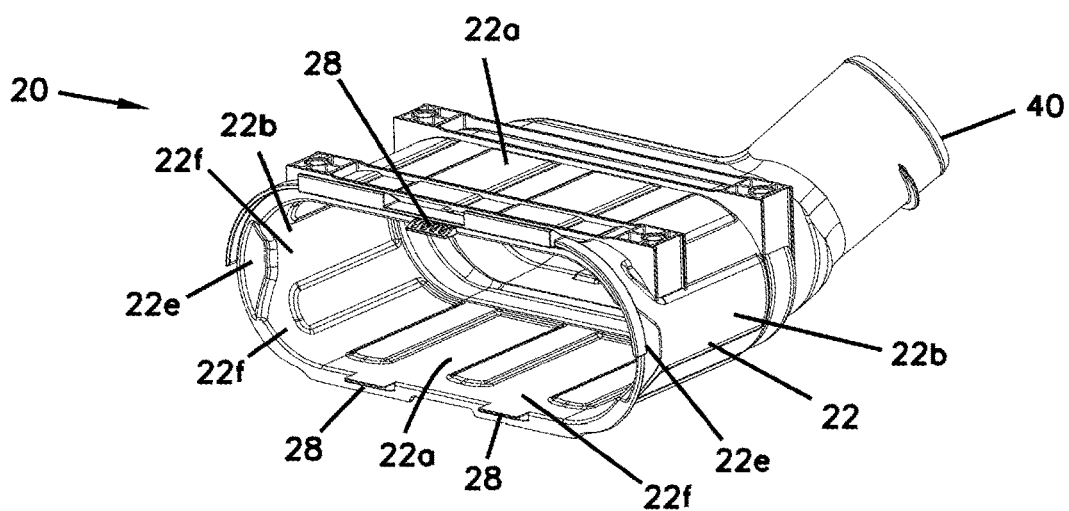
FIG. 42 is a second perspective view of the housing shown in FIG. 41.
Figure 43:
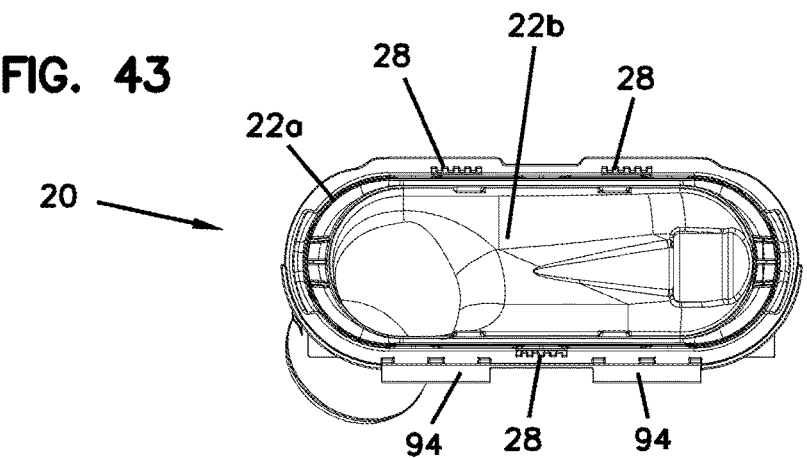
FIG. 43 is a first end view of the housing shown in FIG. 41.
Figure 44:
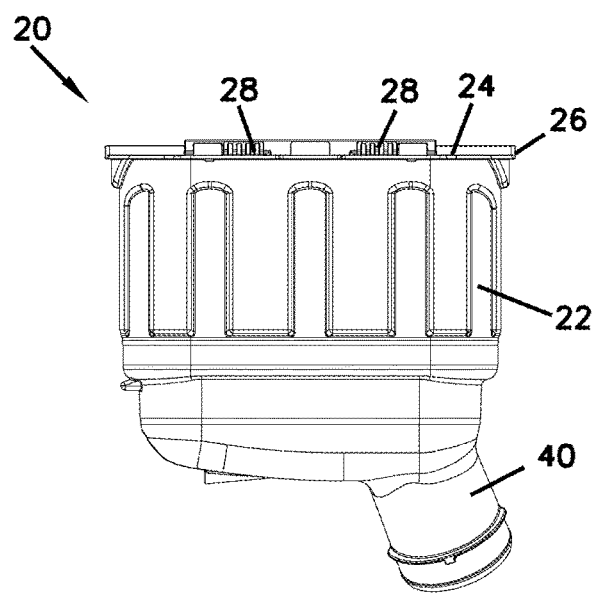
FIG. 44 is a first side view of the housing shown in FIG. 41.
Figure 45:
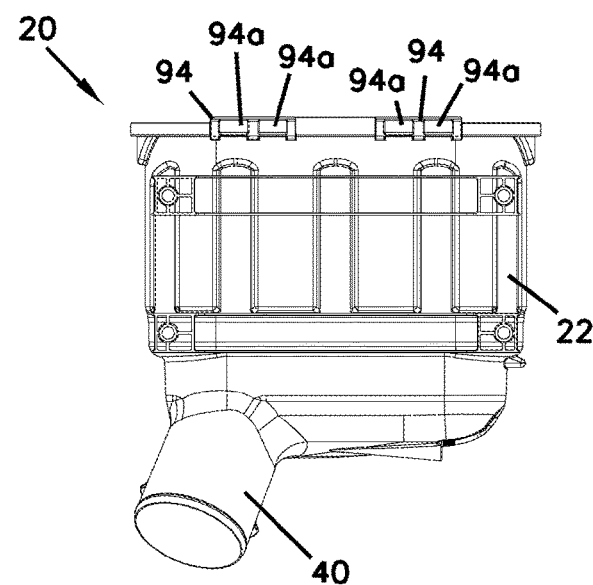
FIG. 45 is a second side view of the housing shown in FIG. 41.
Figure 46:
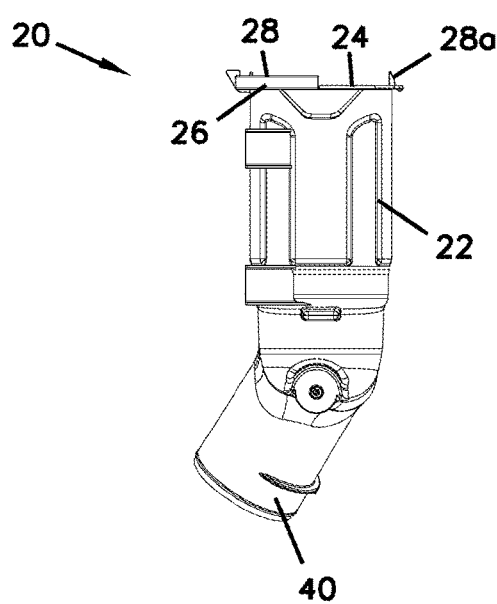
FIG. 46 is a third side view of the housing shown in FIG. 41.
Figure 47:
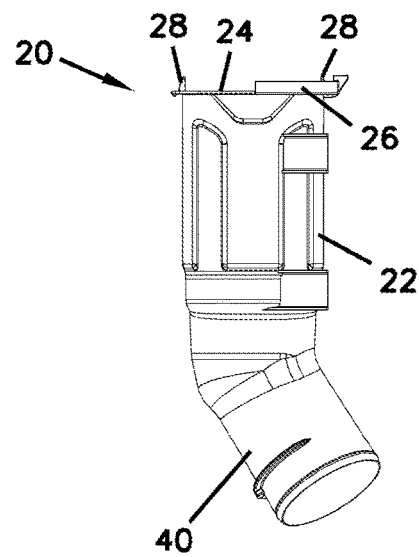
FIG. 47 is a fourth side view of the housing shown in FIG. 41.

With reference to FIG. 26, details of the sealing member 130 are further illustrated. In one aspect, the two seal lips 132a, 132b extend at an oblique angle to the filter cartridge longitudinal axis from a base portion 130a such that the seal lips extend in a radial outward direction and in an axial direction towards the first end 102. The seal arrangement 130 also includes a bumper projection 133 extending from the base portion 130a at a location between the seal lips 132a, 132b. The bumper projection 133, which is an area of thickened material extending radially outward, operates to help maintain the filter cartridge 100 in a generally centered position within the housing body 20 and limits radial movement of the filter cartridge 100 within the housing body 20. Accordingly, the bumper projection 133 ensures that the seal lips 132a, 132b do not become overly compressed on one side and then uncompressed and potentially unsealed to the housing body 20 on the opposite side. The bumper projection 133 can also be positioned at other locations.

As shown, the shell 120 includes a pair of projections 121 that are received into corresponding recesses 22e defined within the housing body 20. In the example shown, the projections 121 are trapezoid-shaped with a center portion adjoined by ramped surfaces that extend from a perimeter wall 122 and a flange wall 125 of the shell 120. The seal member 130 deviates towards the second end 104 of the filter cartridge 100 proximate the projections 121 such that the seal member 130 is located between the projections 121 and the second end 104 of the filter cartridge 100. At other locations, portions of the seal member 130 are located in a coplanar relationship with the projections 121. In an alternative arrangement, the projections 121 can be provided on the housing body 20 and the receiving arrangements 22 can be provided on the filter cartridge 100. In one aspect, the shell projections 121 and seal member 130 are configured in a manner similar to that shown and described in PCT patent application publication WO 2017/106752 published on 22 Jun. 2017, the entirety of which is incorporated by reference herein. The WO '752 publication discloses trapezoid-shape ramped projections and an axially deviating seal member. In one aspect, the flange wall 125 and the projections 121 cooperate with the housing 20 to form a weather barrier to shield the seal member 130 from the outside environment. In one aspect, the projections 121 function to fix the rotational and/or axial position of the filter cartridge 100 with respect to the housing 20.

Figure 70:
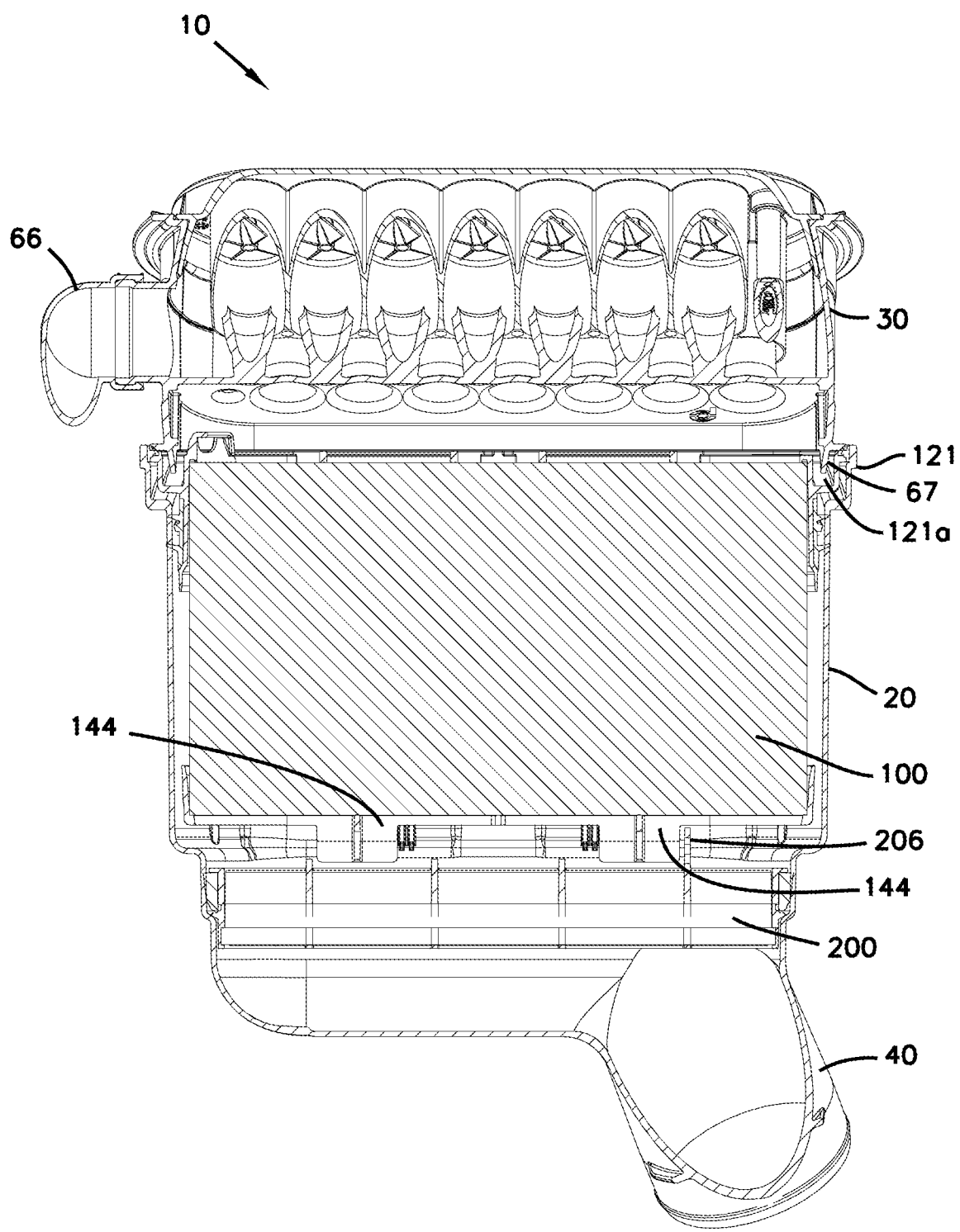
FIG. 70 is a second cross-sectional view of the air cleaner assembly shown in FIG. 67.
Figure 71:
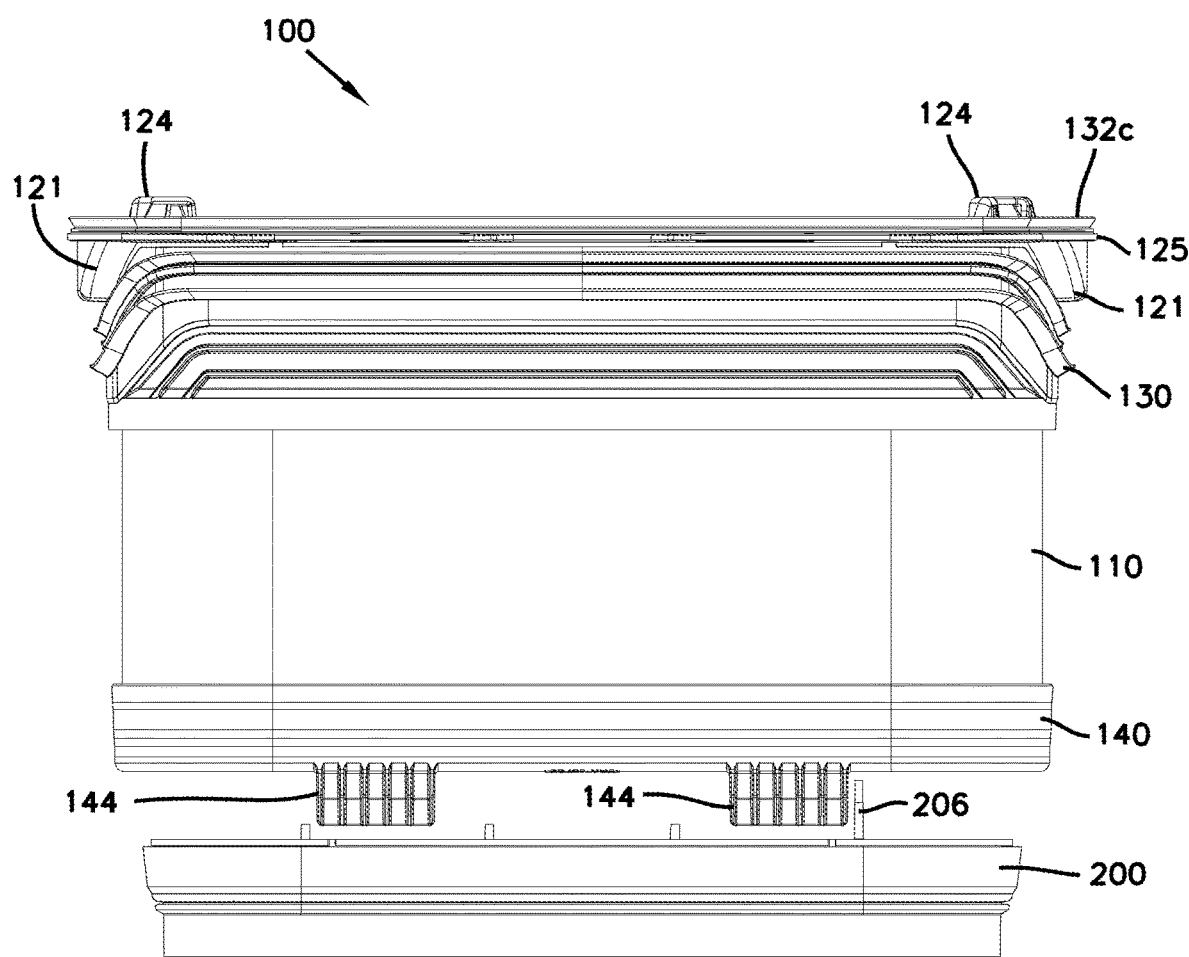
FIG. 71 is a side view of a primary and secondary filter cartridge of the air cleaner assembly shown in FIG. 67.
Figure 72:
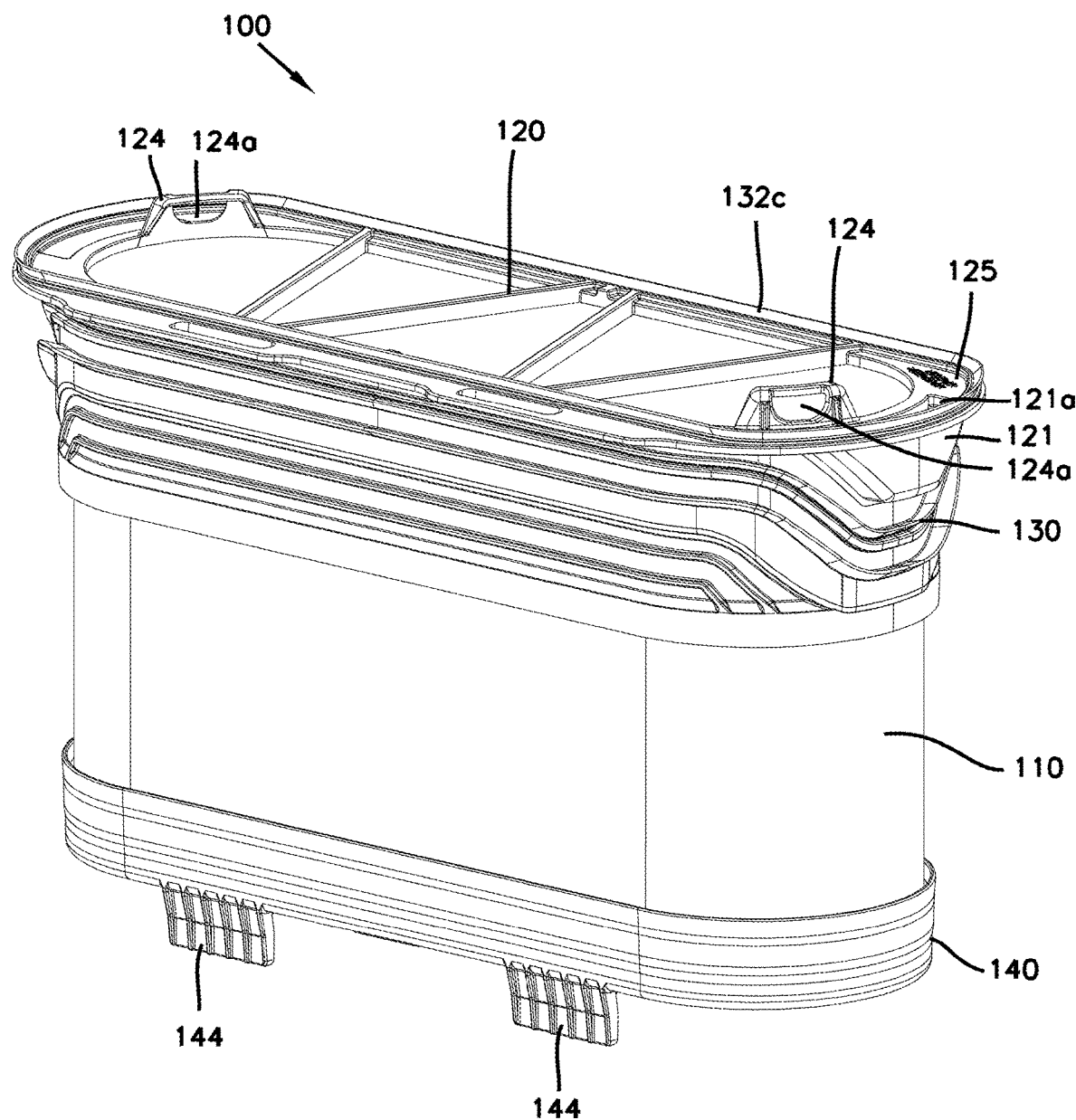
FIG. 72 is perspective view of the primary filter cartridge shown in FIG. 71.
Figure 73:
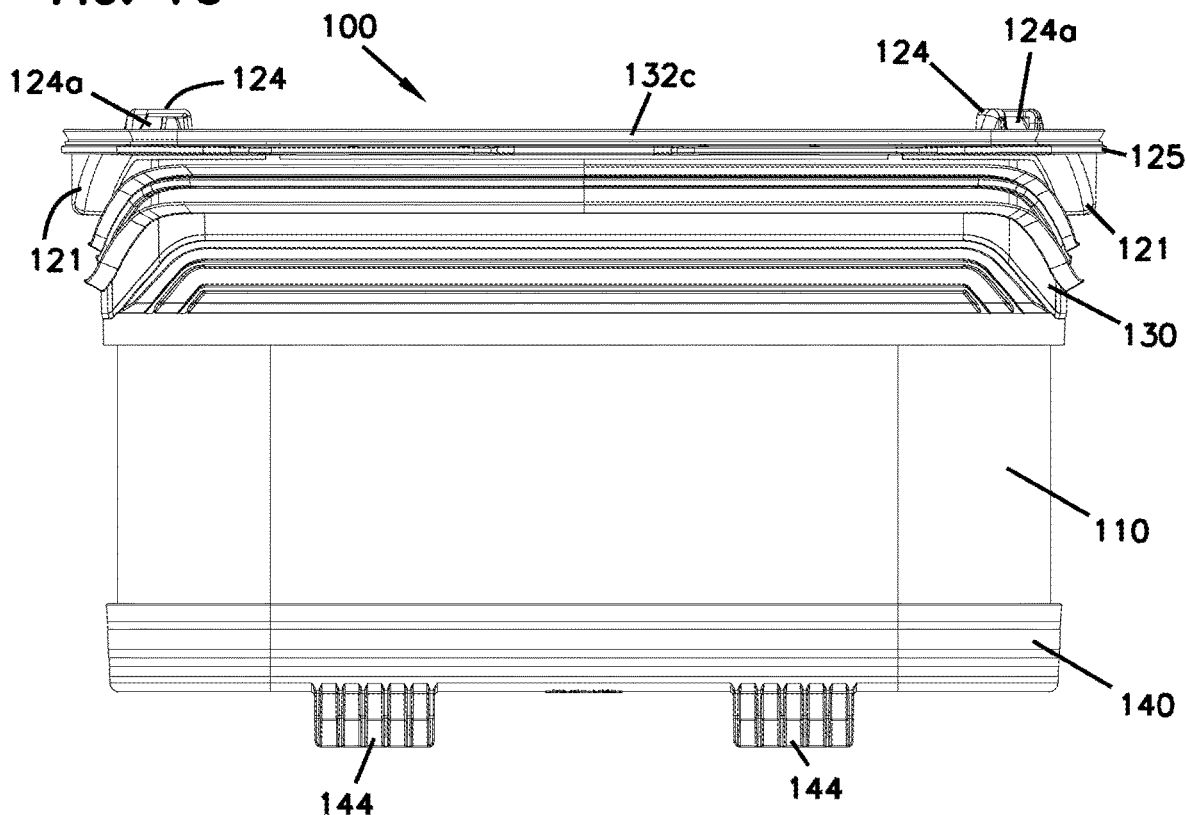
FIG. 73 is a first side view of the primary filter cartridge shown in FIG. 71.
Figure 74:
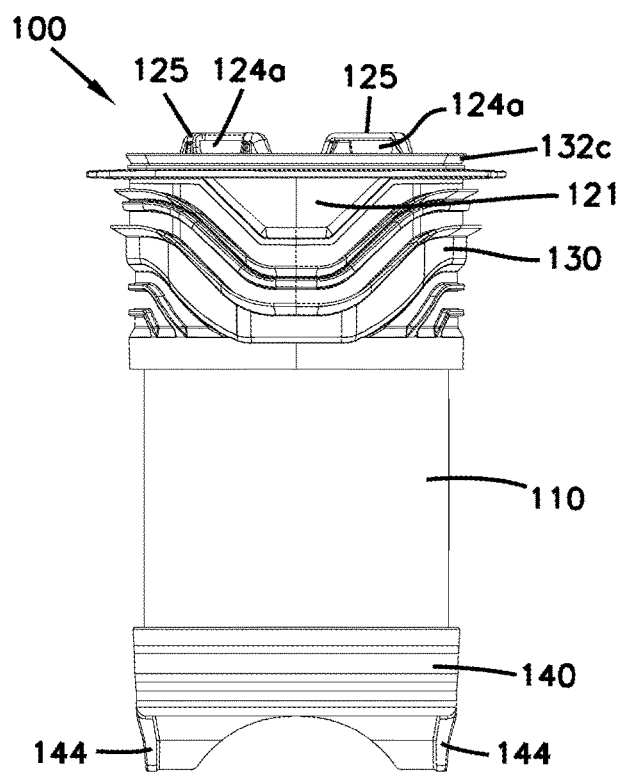
FIG. 74 is a second side view of the primary filter cartridge shown in FIG. 71.
Figure 75:
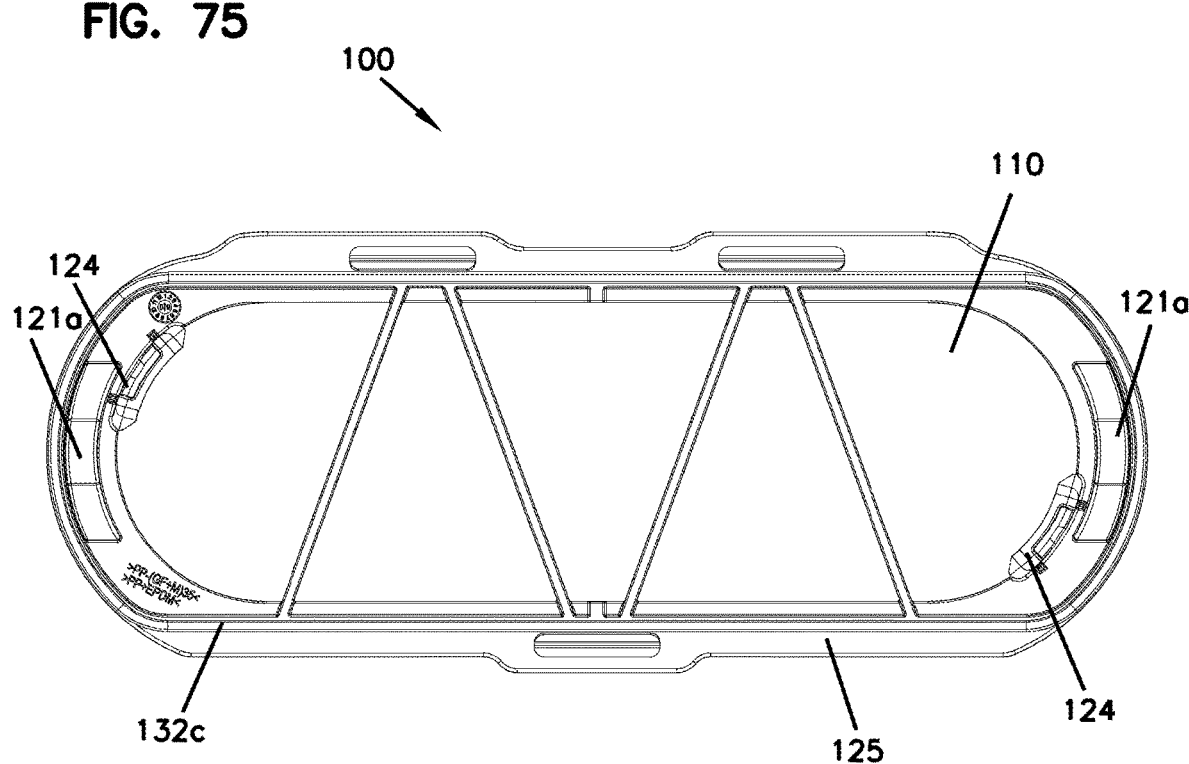
FIG. 75 is a top view of the primary filter cartridge shown in FIG. 71.
Figure 76:
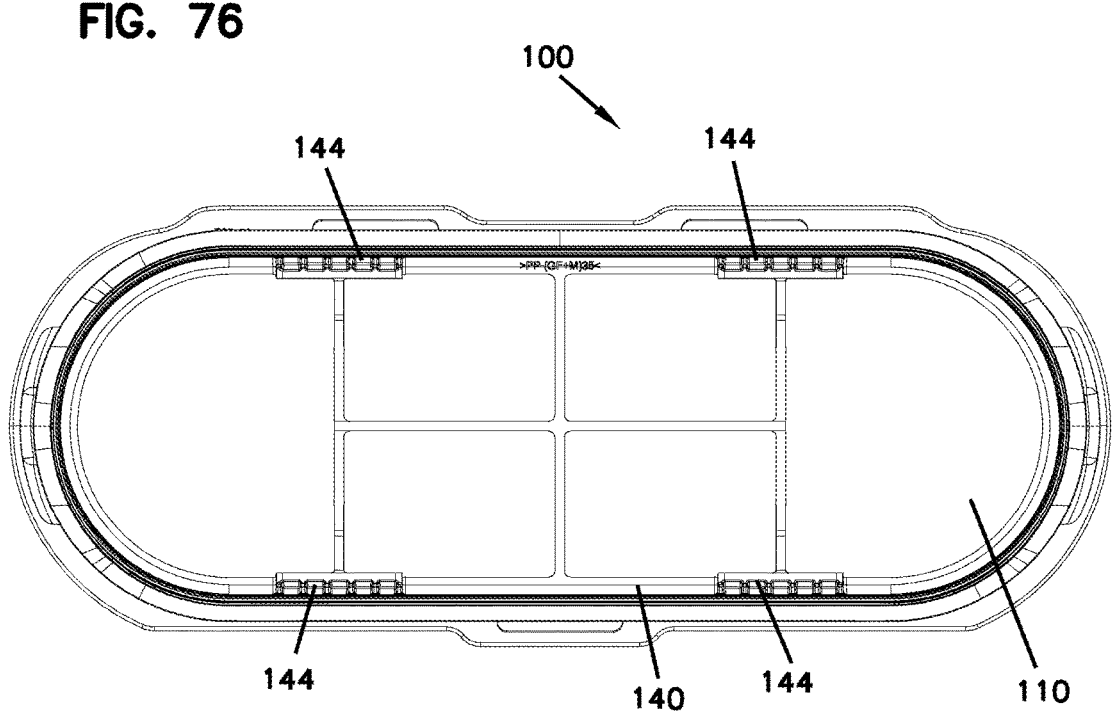
FIG. 76 is a bottom view of the primary filter cartridge shown in FIG. 76.
Figure 77:
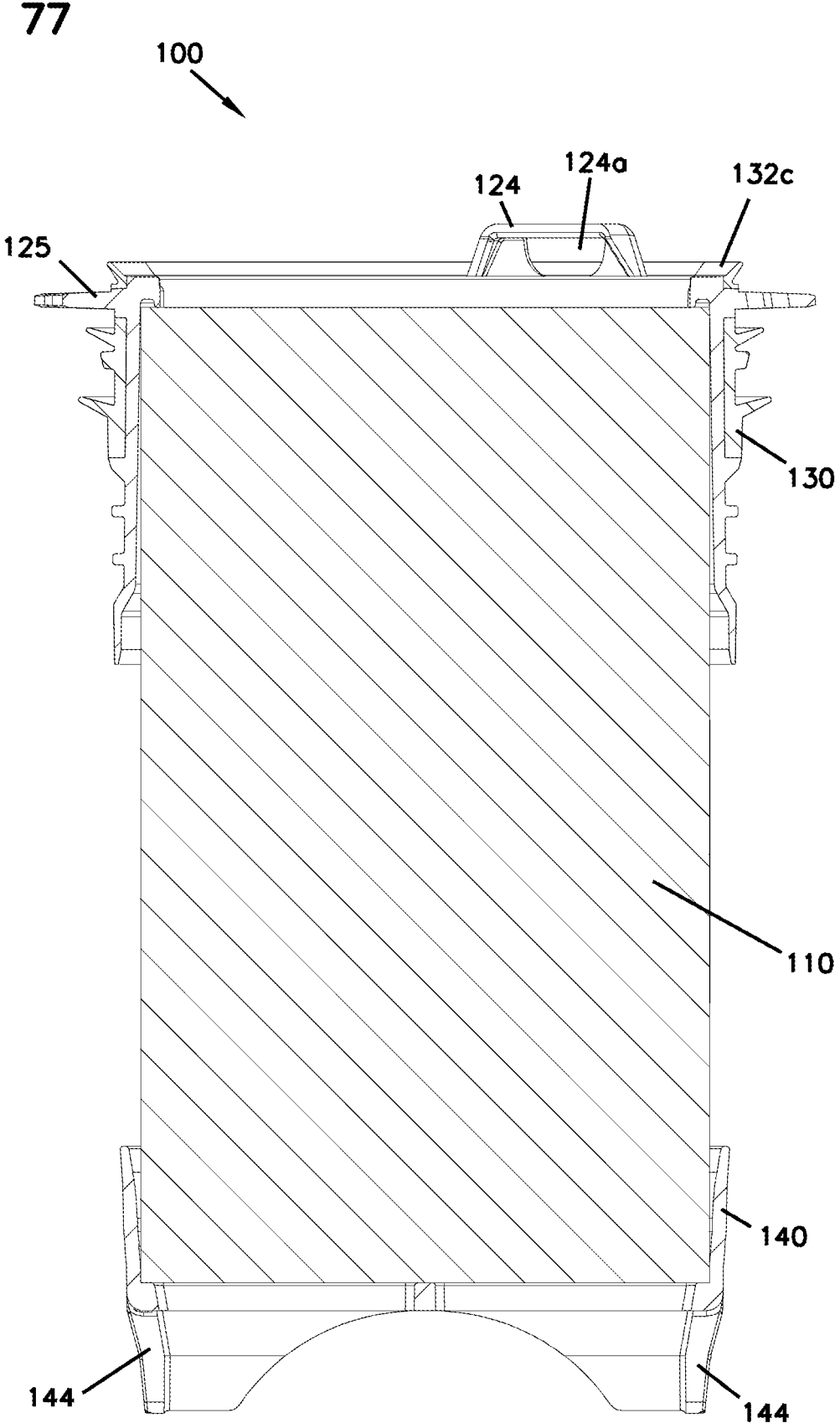
FIG. 77 is a cross-sectional side view of the primary filter cartridge shown in FIG. 71.
Figure 78:
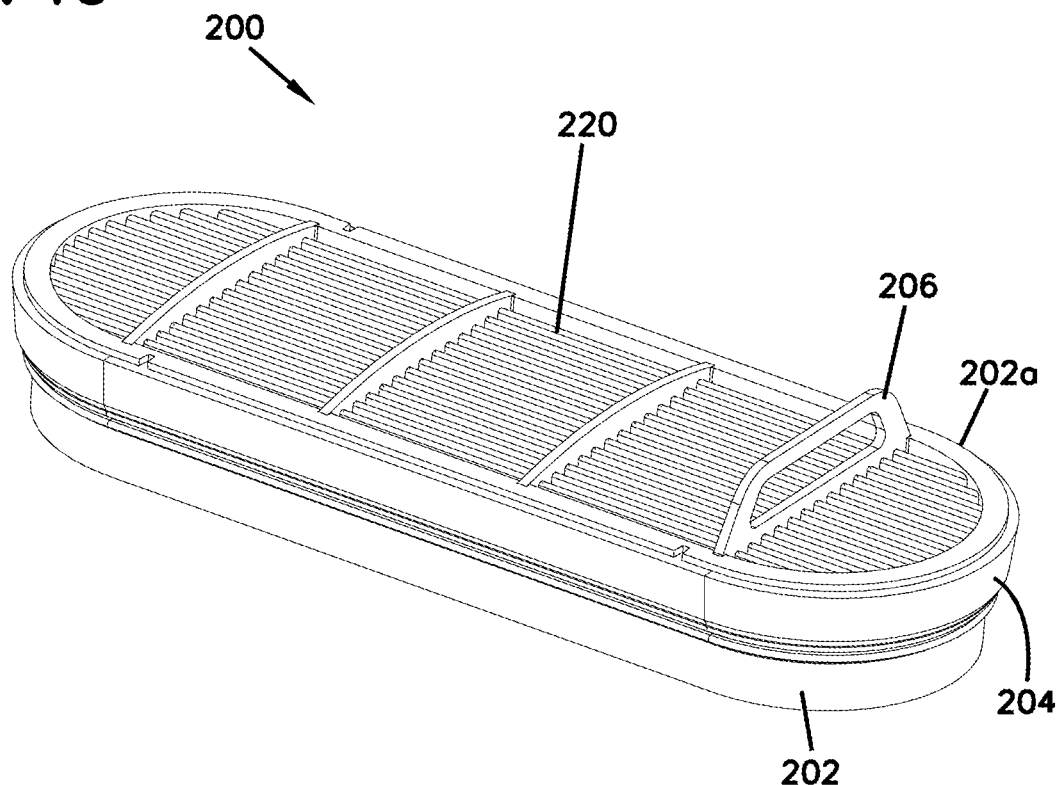
FIG. 78 is a perspective view of the secondary filter cartridge shown in FIG. 71.
Figure 79:
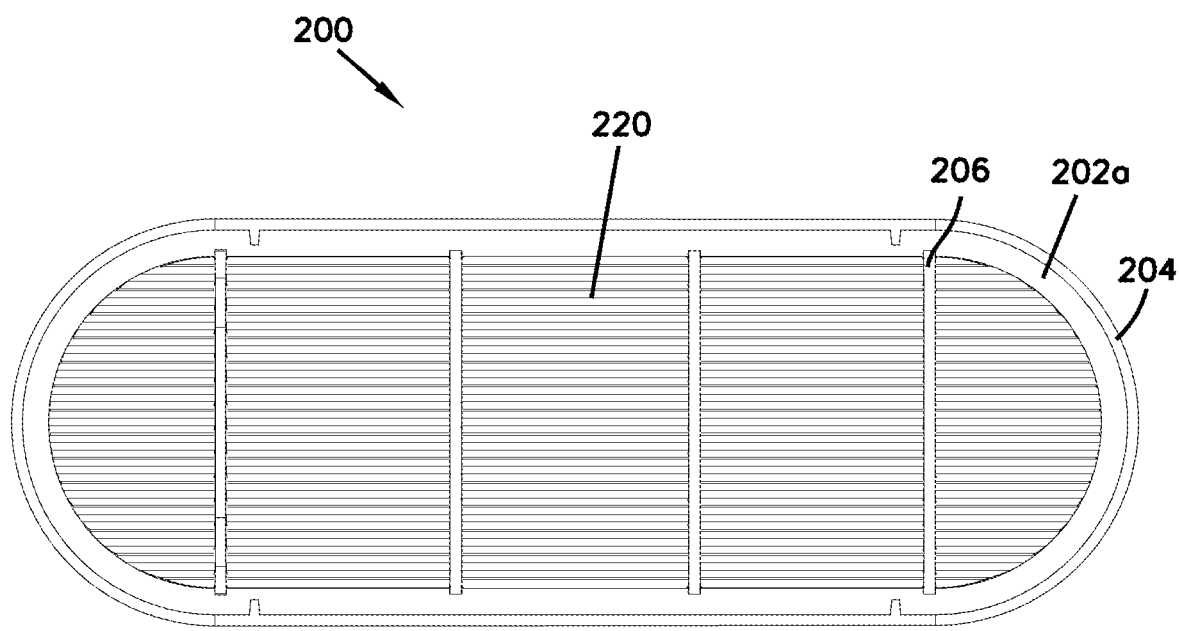
FIG. 79 is a top view of the secondary filter cartridge shown in FIG. 71.
Figure 80:
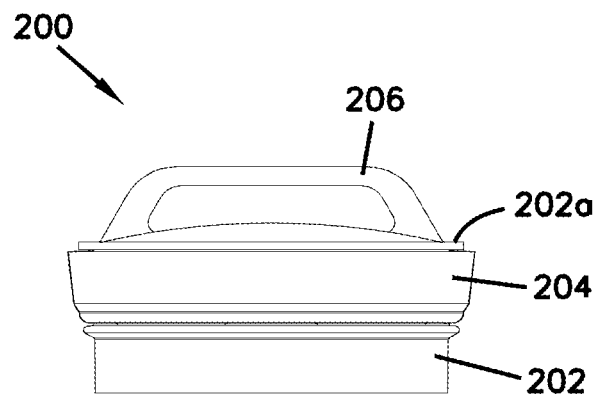
FIG. 80 is a first side view of the secondary filter cartridge shown in FIG. 71.

In the example shown, the media pack 110 has inlet flow face 112 for receiving unfiltered air or pre-cleaned air from the precleaner (if provided) and an outlet flow face 114 for delivering filtered air. The media pack 110 is shown in isolation at FIG. 70. In the example shown, the media pack 110 has an obround cross-sectional shape such that the media pack 110 and filter cartridge 100 have a pair of long, straight sides 110a, 100a and a pair of short, rounded sides 110b, 100b. However, other shapes are possible, such as curved, round, oval, kidney, leminscate (i.e. figure 8, peanut, or binocular) and rectangular cross-sectional shapes. Where such other shapes are provided, the housing 20 can be likewise provided with a similar shape such that the sealing member 130 can form a seal with the sealing surface 22f of the housing body 20. In such configurations, the "long side" or "length" of the filter and housing can be characterized as being each side or portion of the perimeter which has the greatest dimension and/or that runs generally along or parallel to the longest dimensional axis extending through the filter and housing. Similarly, the "short side" or "width" of the filter and housing can be characterized as being each side or portion of the perimeter which has the shortest dimension and/or that runs generally along or parallel to the shorter dimensional axis extending through the filter and housing. For example, a kidney shaped filter has longer concave and convex shaped sides, characterized as the long sides or lengths, interconnected by two shorter ends, characterized as the shorter sides or width. Similarly, a leminiscate-shaped filter element would have two long sides extending between the two end lobes and the interconnecting concave portions and would have two short sides extending about the ends of each lobe.

In one aspect, the media pack 110 defines an outer perimeter 116 extending between the inlet and outlet flow faces 112, 114. In the example shown, the media pack 110 is formed from a coiled media construction, for example a media construction having a fluted (typically corrugated) media sheet and a facing media sheet that together define parallel flutes to form a fluted or z-filter media construction. Suitable media constructions for the media pack 110 are discussed in more detail in the Media Types and Configurations section.

In one aspect, the shells 120 and 140 of the filter cartridge 100 are formed from a polymeric material, such as ABS plastic. The shell 120 is shown in isolation at FIGS. 27-34. In one aspect, the shell 120 defines a perimeter wall 122 that surrounds a portion of the outer perimeter 116 of the media pack 110 while the shell 140 defines a perimeter wall 142 that surrounds a portion of the media pack outer perimeter 116. A grid structure 123 is also shown as being provided with the shell 120 for supporting the inlet flow face 114 of the media pack 110. A grid structure 143 is also provided with the shell 140 for supporting the outlet flow face 114 of the media pack 110. The shells 120, 140 can be provided without the grid structures 123, 143. However, the grid structures 123, 143 aid in preventing the wound media pack 110 from telescoping. The shells 120, 140 may be secured to the media pack 110 by an adhesive. Of note, the grid structure 123 aids in providing structural integrity to the filter cartridge in a direction between the openings 127 such that the filter cartridge 100 is not pulled apart by the force of the interaction between the protrusions 28 and the openings 127. In one aspect, the perimeter wall 122 may surround a portion of the media pack outer perimeter 116, as shown, or surround the entirety of the media pack outer perimeter 116. In the latter case, shells 120 and 140 could be integrally formed together.

In one aspect, the shell 120 can be more generally characterized as a support structure that supports the flange 125 (and opening 127) and the grid structure 123. Additionally, the support structure can be configured as a support ring or frame that is directly connected to the media pack 110 without there necessarily being a shell-like structure extending about the media pack perimeter.

The shell 120 is also shown as being integrally formed with a pair of handles 124 extending from the flange wall 125 for allowing an operator to remove and install the filter cartridge 100. In the example shown, the handle 124 is formed with the shell 120 such that an open space 124a exists between the handle 124 and the flange wall 125 of the shell 120 to allow an operator to grasp the handles 124.

The shell 120 is also shown as including a radially extending flange wall 125. The flange wall 125 extends from the shell perimeter wall 122 and radially beyond the outer perimeter 116 of the media pack 110. Similar to the media pack 110, the flange wall 125 includes a pair of long, straight sides 125a and a pair of short, rounded sides 125b. The flange wall 125 is located proximate the inlet flow face 112 and defines the distal most end of the inlet of the filter cartridge 100, notwithstanding the presence of the handles 124. When the filter cartridge 100 is installed within the housing body 20, the flange wall 125 rests against a corresponding flange 24 on the housing body 20. Accordingly, the filter cartridge 100 is supported by the housing body 20 via the flange wall 125.

In one aspect, the flange wall 125 includes a plurality of openings 127 disposed along the long sides 125a of the flange wall 125. As most easily seen at FIG. 26, the openings 127 are laterally offset from the media pack outer perimeter 116 and the shell perimeter wall 122. This offset allows for the openings 127 to receive correspondingly shaped projections 28 extending from the housing body 20. In the embodiment shown, the openings 127 are configured as slots extending in a lengthwise direction that is parallel to the long sides 125a of the flange wall 125. As shown, one opening 127 is provided on one of the long sides 125a while two openings 127 are provided on the other of the long sides 125a of the flange wall 125. However, other configurations are possible, such as providing two or more openings 127 on each long side 125a. Although the openings 127 are shown as being elongated openings, the openings 127 could be formed from a variety of shapes, for example, geometric shapes such as circles, triangles, squares, etc. Additionally, the openings 127 can be formed from discrete or separate flange-type members rather than by the single, continuous flange 125 that is shown.

When the filter cartridge 100 is installed in the housing 20, the projections 28 of the housing body 20 are fully received into the openings 127 on the filter cartridge 100 to stabilize the flexible sides 22a of the housing body 20. At the same time, the sidewall 122 of the shell 120 is drawn into the housing body interior region 20i with the base member 130a of the seal member 130 contacting the interior surface of the housing body perimeter wall 122. Thus, the shell sidewall 122 and base member 130a provide an outward constraint on the housing body sidewall 22 that prevents inward deflection of the housing body sidewall 22 while the projections 28 and openings 127 provide both inward and outward deflection of the body sidewall 122. The disclosed configuration can also compensate for manufacturing differences by positively locating the sealing surface 22f with respect to the filter cartridge seal member 130. In one configuration, the filter cartridge 100 and body 22 are configured such that there is no contact between the base member 103a/shell sidewall 122 and the housing body perimeter wall 122, wherein the projections 28 and openings 127 are the only features that stabilize the housing body 20. However, where such contact is provided an enhanced stabilization of the housing body 20 results. FIGS. 13-19 show the filter cartridge 100 in such a position with respect to the housing body 20.

As the filter cartridge 100 is provided with an outwardly directed radial seal member 130 that seals against the seal surface 22f on the interior of the housing body 20, any outward deflection of the housing body 20 can result in a leak path being formed between the housing body 20 and the seal member 130. The location at which such deflection is most likely to occur is along the long sides 22a of the housing body 20. This circumstance is especially prevalent where an obround or rectangular filter cartridge 100 and housing body 20 with a relatively high length-to-width aspect ratio are used. To ensure that no such outward deflection occurs, the protrusions 28 and openings 127 are located along the longs sides 22a of the housing body 20. Once the filter cartridge 100 is installed within the housing body 20, the protrusions 28 are locked into the openings 127. Thus, the protrusions 28 are prevented from deflecting radially outward by the openings 127 in the filter cartridge 100. As the protrusions 28 are part of the housing body 20, the long sides 22a of the housing body 20 are likewise prevented from deflecting radially outward by the interaction between the openings 127 and protrusions 28.

Figure 48:
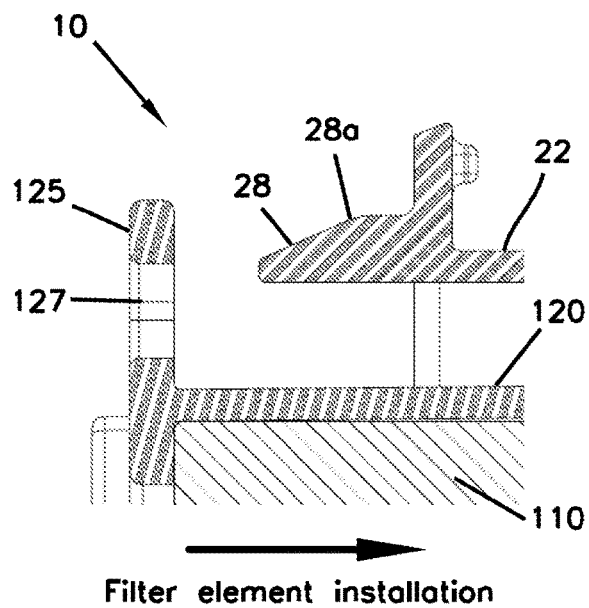
FIG. 48 is a partial cross-sectional view of the air cleaner assembly shown in FIG. 1 with the filter cartridge being installed into the housing of the air cleaner assembly.
Figure 49:
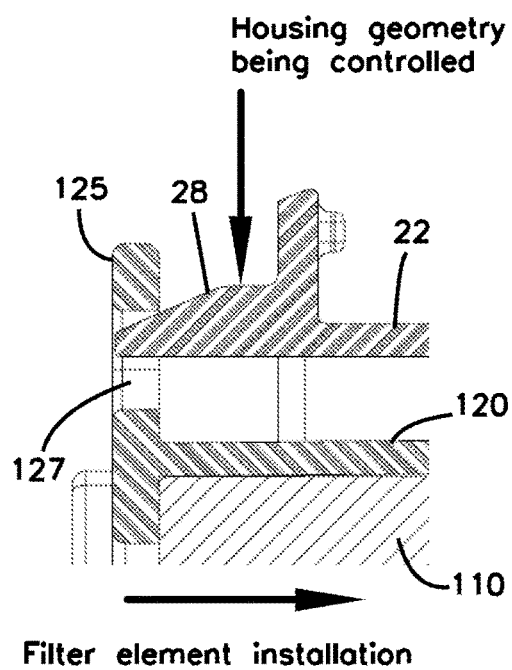
FIG. 49 is a partial cross-sectional view of the air cleaner assembly shown in FIG. 48, with the filter cartridge being further installed.
Figure 50:
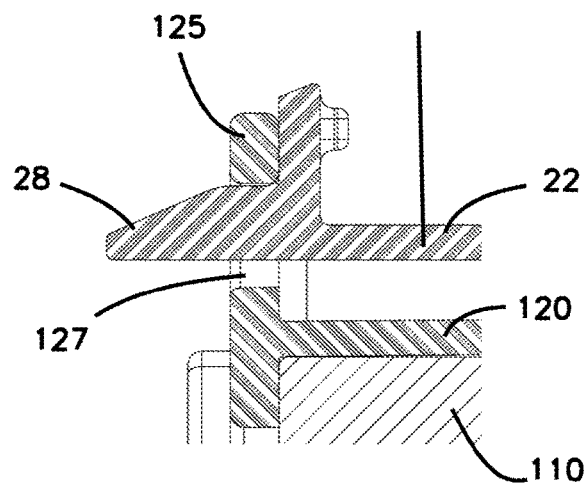
FIG. 50 is a partial cross-sectional view of the air cleaner assembly shown in FIG. 48, with the filter cartridge being fully installed.
Figure 51:
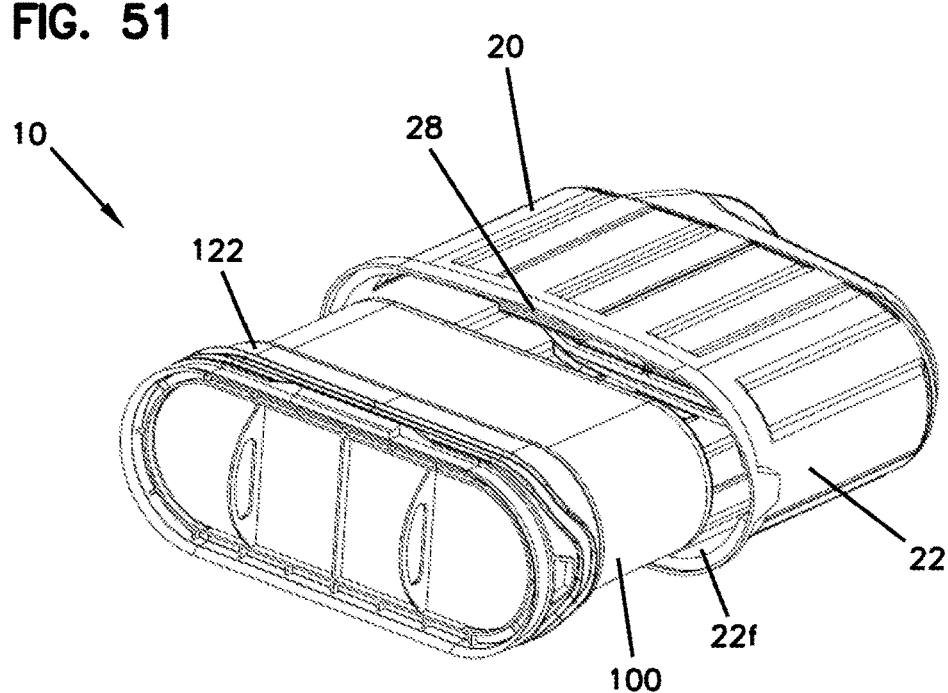
FIG. 51 is a first perspective view that is a schematic representation of a second example of an air cleaner assembly having features in accordance with the present disclosure.
Figure 52:
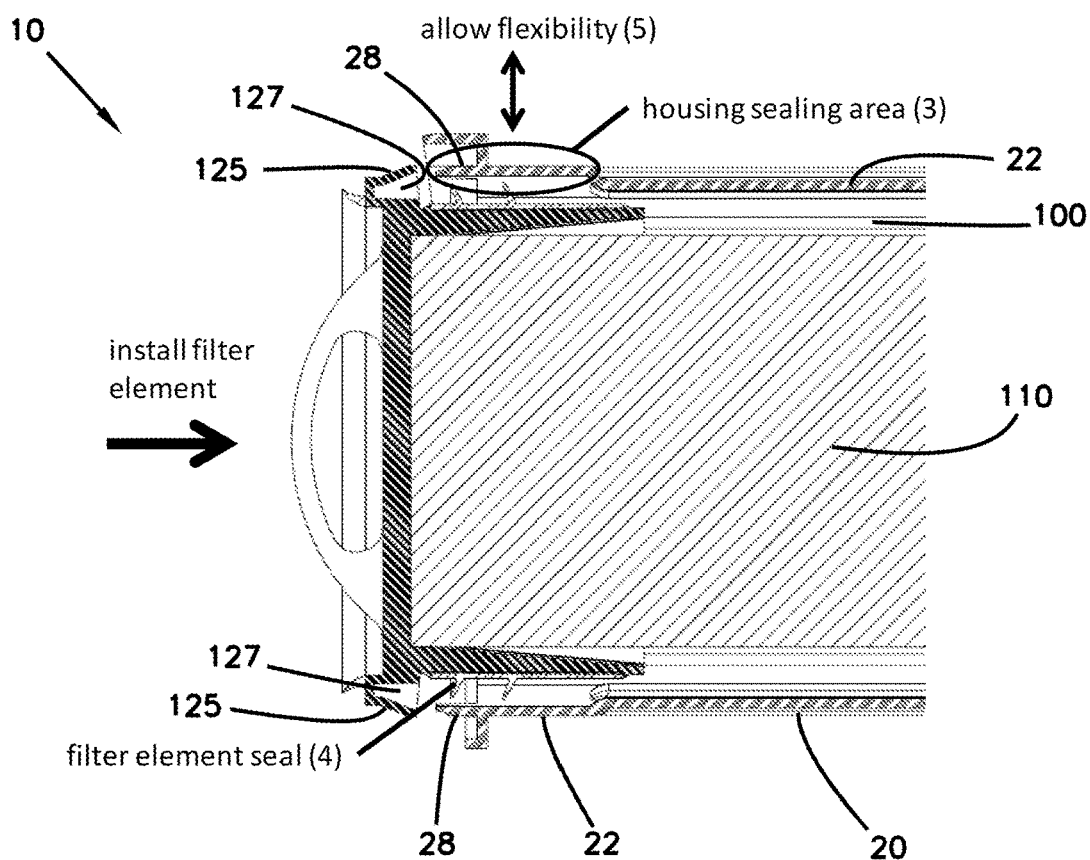
FIG. 52 is a partial cross-sectional view of the air cleaner assembly shown in FIG. 51 with the filter cartridge being installed into the housing of the air cleaner assembly.
Figure 53:
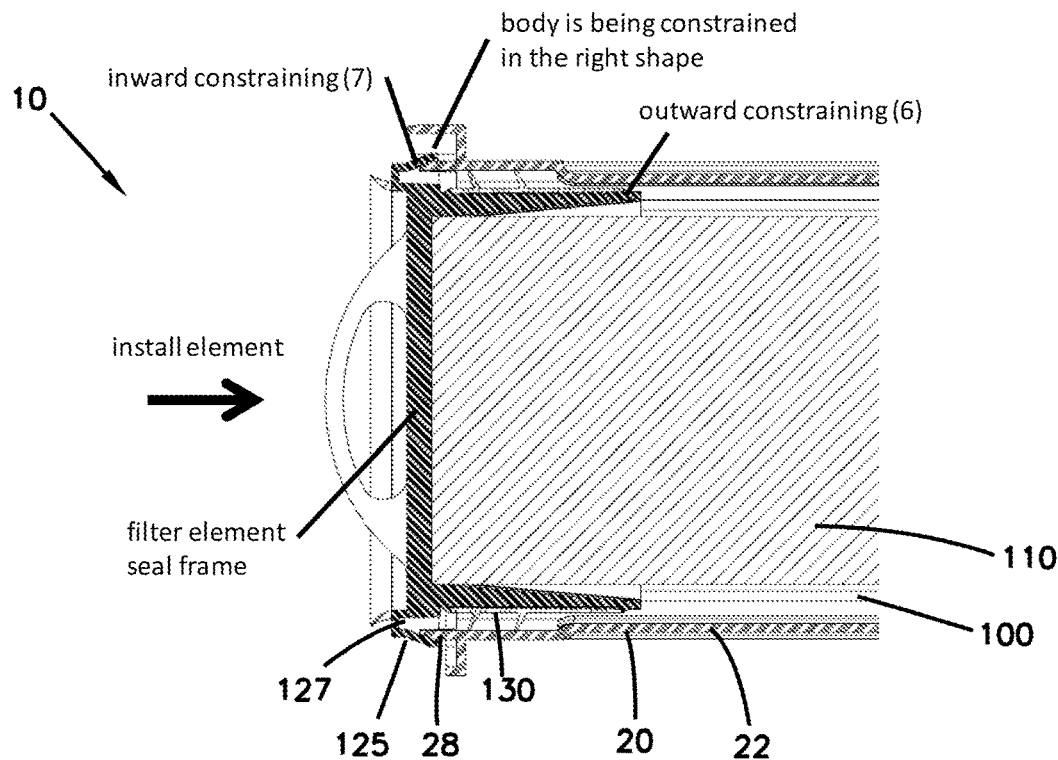
FIG. 53 is a partial cross-sectional view of the air cleaner assembly shown in FIG. 51, with the filter cartridge being further installed.
Figure 54:
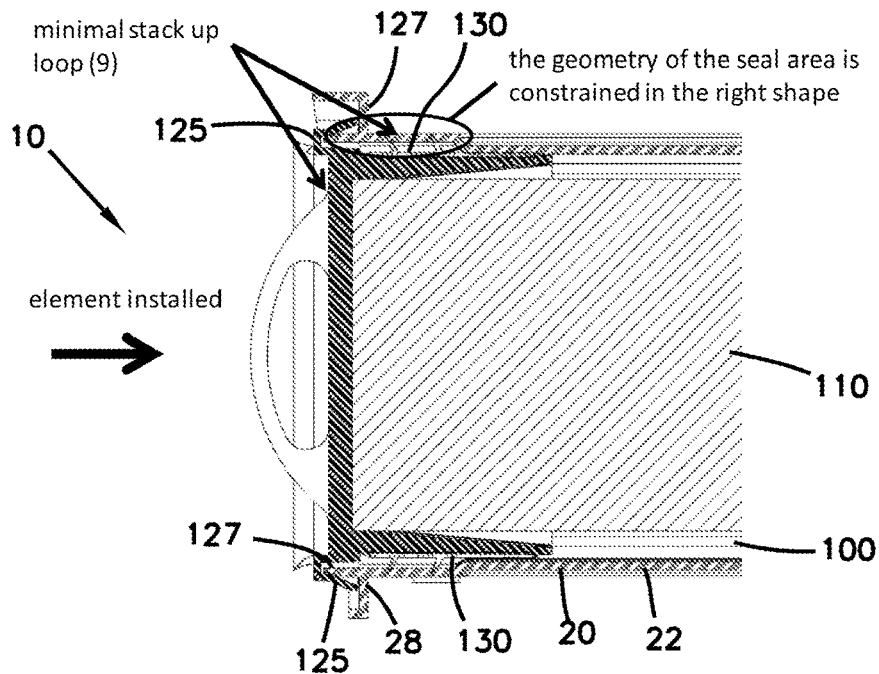
FIG. 54 is a partial cross-sectional view of the air cleaner assembly shown in FIG. 52, with the filter cartridge being fully installed.

In the example shown, the openings 127 act on the protrusions 28 to draw the housing body 20 inward into the desired shape such that the housing body geometry is controlled and a more effective seal is formed. In such a configuration, the ramped surfaces 28a aid in initially alignment of the protrusions 28 into the openings 127. For example, reference can be made to FIGS. 48 and 49 where it can be seen that the protrusion 28 draws the housing body perimeter wall 22 closer to the filter cartridge 100. FIG. 50 shows the final drawn-in position of the perimeter wall 22 with the protrusion 28 fully seated into the opening 127 of the filter cartridge 100.

Although protrusions 28 are shown as being associated with the housing body 29 and the openings 127 are shown as being associated with the filter cartridge 100, the filter cartridge 100 could be provided with protrusions and the housing body 20 could be provided with openings. Additionally, although openings 127 are shown as extending completely through the flange wall 125, the openings 127 could be formed as pocket or cavity structures that similarly constrain movement of the protrusions 28.

Filter Cartridge 200

Referring to FIGS. 11-20, the exemplary air cleaner assembly 10 includes an optional secondary or safety filter cartridge 200. The safety filter cartridge 200 is shown in isolation at FIGS. 11 and 12. The safety filter 200 is generally positionable between the main filter cartridge 100 and the outlet 40 of the housing body 20. In a typical arrangement, the safely filter 200 is removably positioned within the air cleaner assembly 10 and would also typically be considered to be a service component that is removable and replaceable, as desired and/or necessary.

The exemplary embodiment of safety filter 200 includes an outer frame 202 that carries a seal member 204 and generally matches the size and shape of the inner area of the housing body 20 and can seal to an interior surface of the housing body 20, preferably with no gaps. In this way, the safety filter 200 can be pressed into the housing with a friction fit against the wall of the housing so that no air can reach the outlet without first going through the safety filter 200. The safety filter 200 can also include filtration media 220, such as pleated media. Handles 206 may also be provided to aid in installing and removing the filter cartridge 200 from the housing 20. A tab 206a, received in a recess of the housing body 20 can also be provided on the filter cartridge 200 to aid in retaining the filter cartridge 200 in the proper position.

Media Types and Configurations

Any type of filter media can be used as the media pack for the filter cartridges 100, 200 in accordance with embodiments of the invention. An exemplary configuration includes fluted filter media, such as a z-filter construction. The term "z-filter construction" as used herein, is meant to refer to a type of filter construction in which individual ones of corrugated, folded or otherwise formed filter flutes are used to define sets of longitudinal, typically parallel, inlet and outlet filter flutes for fluid flow through the media; the fluid flowing along the length of the flutes between opposite inlet and outlet flow ends (or flow faces) of the media. Some examples of filter media are provided in U.S. Pat. Nos. 5,820,646; 5,772,883; 5,902,364; 5,792,247; 5,895,574; 6,210,469; 6,190,432; 6,350,296; 6,179,890; 6,235,195; D399,944; D428,128; D396,098; D398,046; and D437,401, each of which is incorporated herein by reference.

One type of z-filter media utilizes two specific media components joined together to form the media construction. The two components include a fluted (typically corrugated) media sheet and a facing media sheet. The facing media sheet is typically non-corrugated, although it is possible for it to also be corrugated (e.g., perpendicular to the flute direction) as described in U.S. Provisional Application No. 60/543,804, filed Feb. 11, 2004, and published as PCT WO 05/077487 on Aug. 25, 2005, which is incorporated herein by reference.

The fluted media sheet and the facing media sheet are used together to define media having parallel inlet and outlet flutes. In some instances, the fluted sheet and facing sheet are secured together and are then coiled as a media strip to form a z-filter media construction. Such arrangements are described, for example, in U.S. Pat. Nos. 6,235,195 and 6,179,890, each of which is incorporated herein by reference.

In certain other arrangements, some non-coiled sections or strips of fluted (typically corrugated) media secured to facing media, are stacked with one another, to create a filter construction.

Corrugated media is a specific form of fluted media, wherein fluted media has individual flutes or ridges (for example formed by corrugating or folding) extending thereacross. The term "corrugated" is used herein to refer to structure in media, such as media having a flute structure resulting from passing the media between two corrugation rollers (e.g., into a nip or bite between two rollers, each of which has surface features appropriate to cause corrugations in the resulting media).

Serviceable filter element or filter cartridge configurations utilizing z-filter media are sometimes referred to as "straight through flow configurations" or by variants thereof. In general, serviceable filter elements or cartridges have an inlet flow end (or face) and an opposite exit flow end (or face), with flow entering and exiting the filter cartridge in generally the same straight through direction. The term "serviceable" in this context is meant to refer to a media containing filter cartridge that is periodically removed and replaced from a corresponding fluid (e.g. air) cleaner.

Air Cleaner 10 (FIGS. 51-54)

Referring to FIGS. 51-54, a second example of an air cleaner 10 is presented. Air cleaner 10 is generally similar to the air cleaner 10 shown in FIGS. 1-50. Thus, where such similarities exist, the previous description is applicable for this example. The air cleaner 10 of FIGS. 51-54 differs from the first example in the manner in which the perimeter wall 22 of the housing body 20 is constrained. In this example, the opening 127 is configured as a pocket structure 127 defined by the radial flange structure 125 that receives a protrusion 28 on the housing body 20. Similar to the first example, the pocket structure 127 contacts the protrusions 28 and draws the perimeter wall into the desired shape once the filter cartridge 100 is fully installed to ensure a seal is fully formed between the seal member 130 and the interior sealing surface 22f of the housing body 20.

Air Cleaner 10 (FIGS. 55-60)

Referring to FIGS. 55-60, a third example of an air cleaner 10 is presented. Air cleaner 10 is generally similar to the air cleaner 10 shown in FIGS. 1-50. Thus, where such similarities exist, the previous description is applicable for this example. The air cleaner 10 of FIGS. 55-60 differs from the first example in that only two projections 28 and openings 127 are respectively provided on the long sides of the housing body 20 and flange 125. Additionally, the seal member 130 is shown as being located further towards the second end 104 of the filter cartridge 102 and more remotely from the flange 125, in comparison to the first example. It is thus illustrated that the seal member 130 can be located adjacent to the flange 125 or in a location remote from the flange 125. The air cleaner 10 of FIGS. 55-60 is also shown as having a flange 125 that splits into two segments 125c, 125d at the short ends 125b of the filter cartridge such that the flange segment 125d performs the same function as the projections 121 of the first example.

In contrast to the other embodiments, the flange 125 is also located at an intermediate point between the first and second ends 102, 104 rather than being located adjacent the first end 102. It is noted that the flange 125 could be also located proximate the second end 104. In one aspect, it is advantageous to locate the openings/projections that retain the housing sidewall 22 as close to the seal member 130 such that potential deflection of the flexible sidewall 22 is minimized at the location of the seal.

In one aspect, the air cleaner of FIGS. 55-64 includes an attachment arrangement 150 for securing the filter cartridge 100 to the housing body 20. In the embodiment shown, the filter cartridge 100 is provided with a first attachment member 152, configured in this example as a pair of hinged latch members 152. The housing body 20 is provided with a second attachment member 154 that interconnects with the first attachment member 152. In the example shown, the second attachment members 154 are configured as rib structures 154 provided on the housing body sidewall 22. In one aspect, the attachment arrangements 150 are provided on the long sides 22a of the housing body sidewall 22 and the long sides 100a of the filter cartridge 100.

Figure 58:
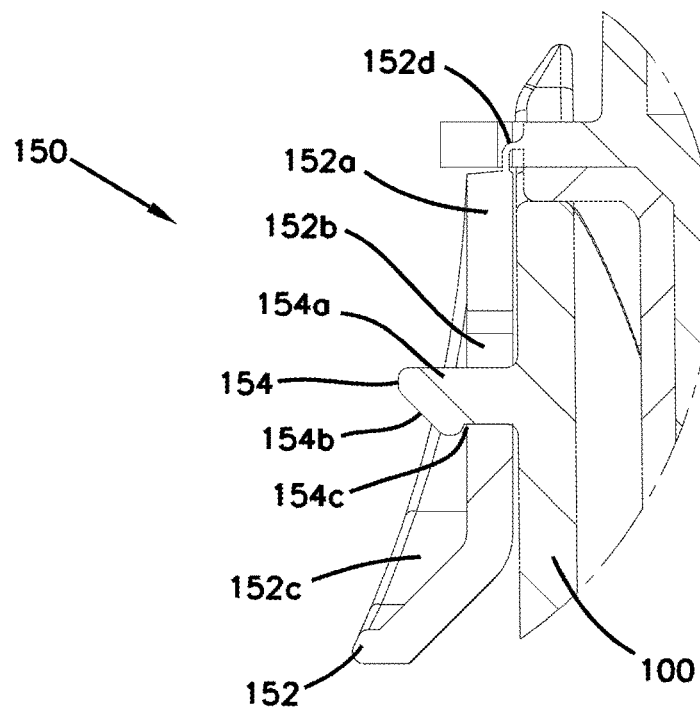
FIG. 58 is a partial cross-sectional view of the air cleaner shown at FIG. 56, showing a first attachment member in the latched position.
Figure 59:
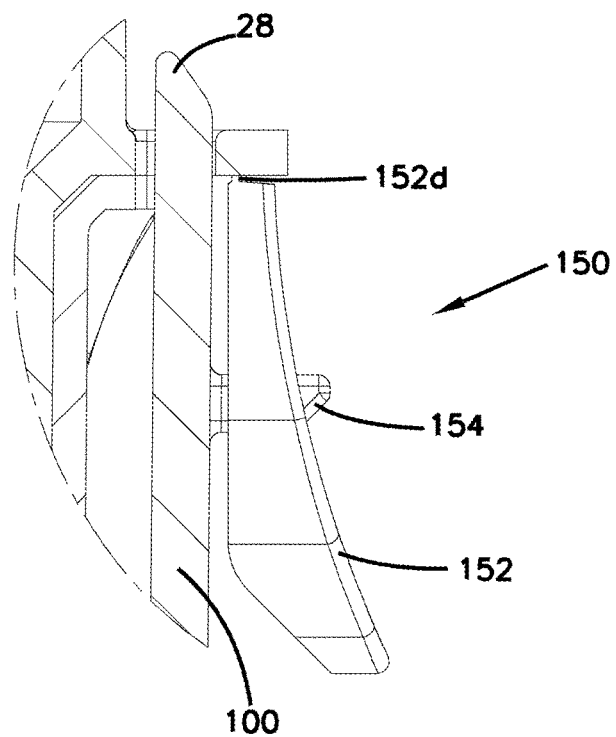
FIG. 59 is a partial cross-sectional view of the air cleaner shown at FIG. 56, showing a second attachment member in the latched position.
Figure 60:
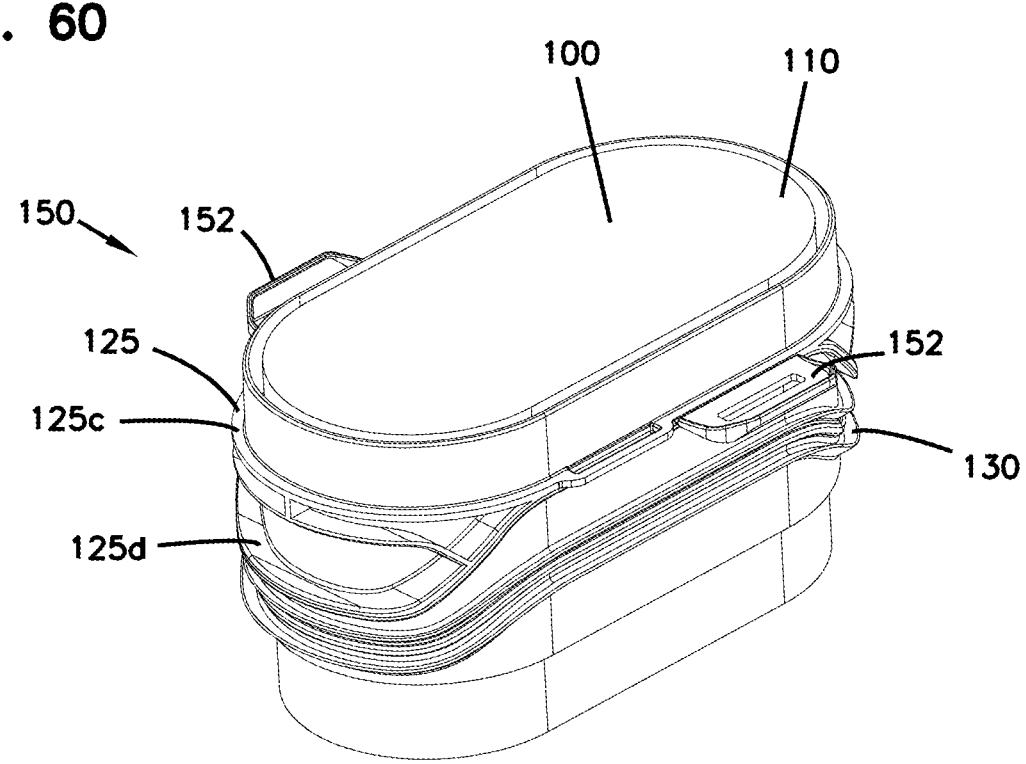
FIG. 60 is a perspective view of the air filter cartridge of the air cleaner assembly shown in FIG. 55.
Figure 62:
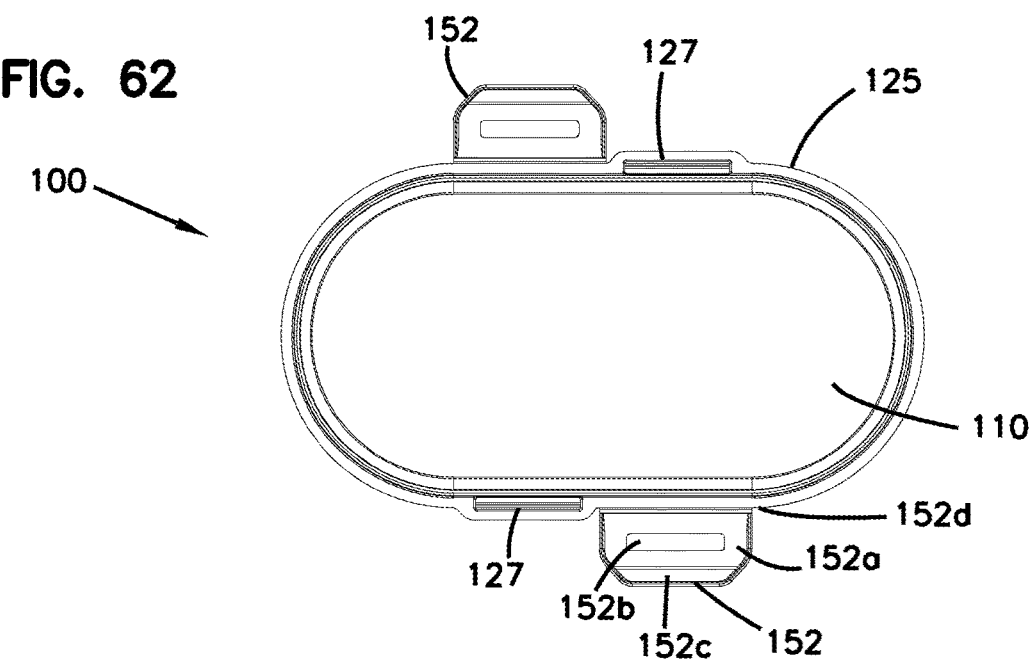
FIG. 62 is a top view of the air filter cartridge shown in FIG. 60.
Figure 63:
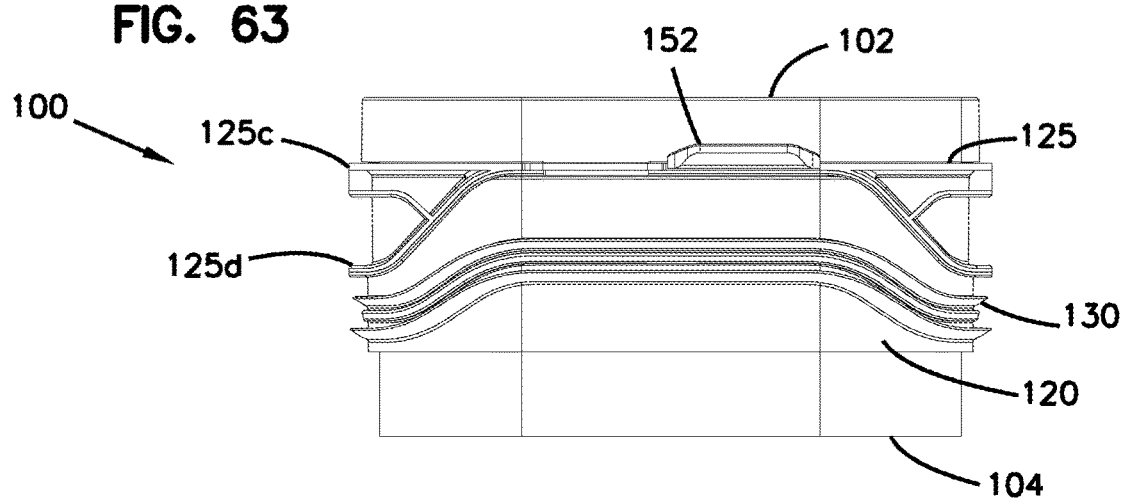
FIG. 63 is a first side view of the air filter cartridge shown in FIG. 60.
Figure 64:
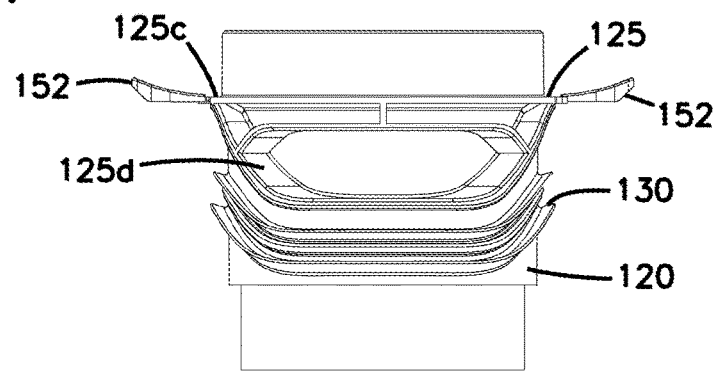
FIG. 64 is a second side view of the air filter cartridge shown in FIG. 60.
Figure 65:
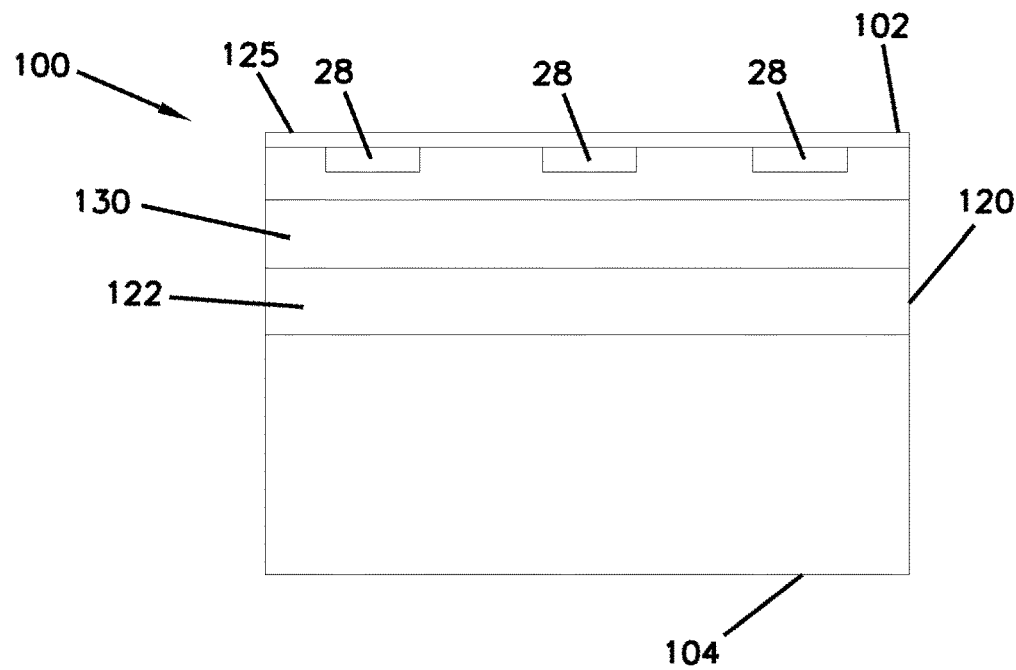
FIG. 65 is a schematic first side view of a fourth example of a filter cartridge having features in accordance with the present disclosure.
Figure 66:
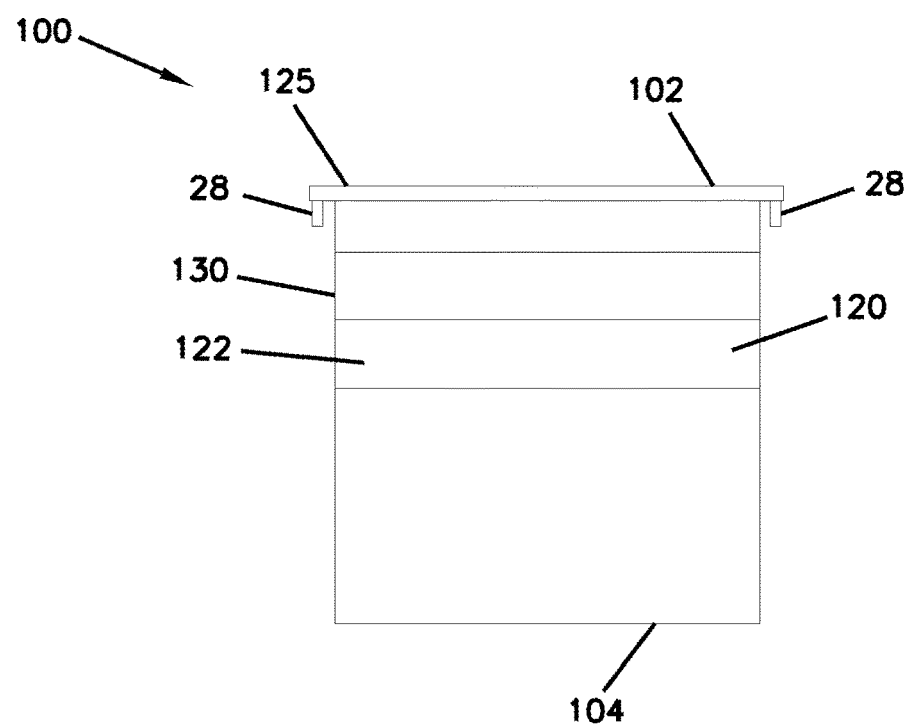
FIG. 66 is a schematic second side view of the filter cartridge shown in FIG. 65.
Figure 67:
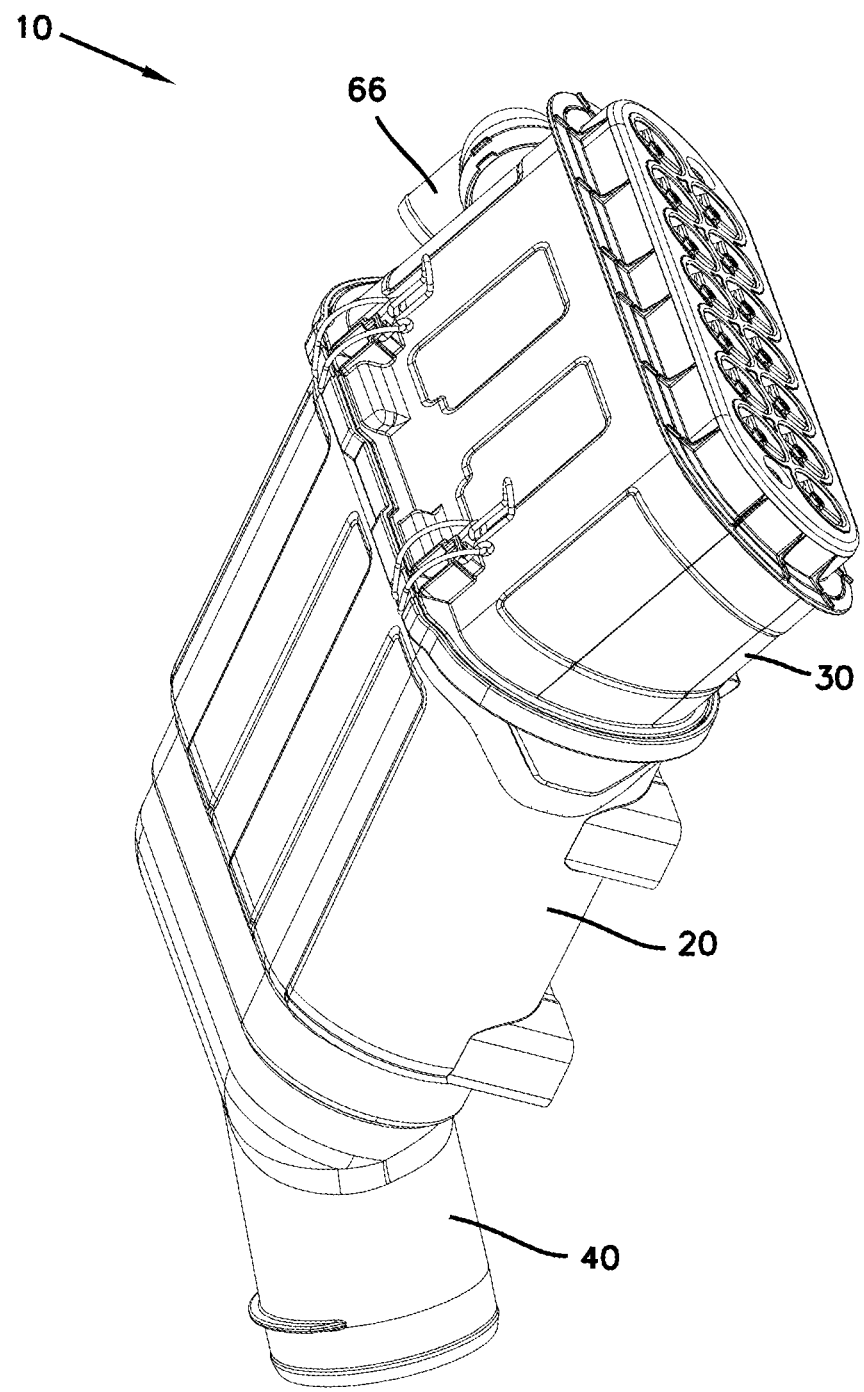
FIG. 67 is a perspective view that is a schematic representation of a fourth example of an air cleaner assembly having features in accordance with the present disclosure.
Figure 68:
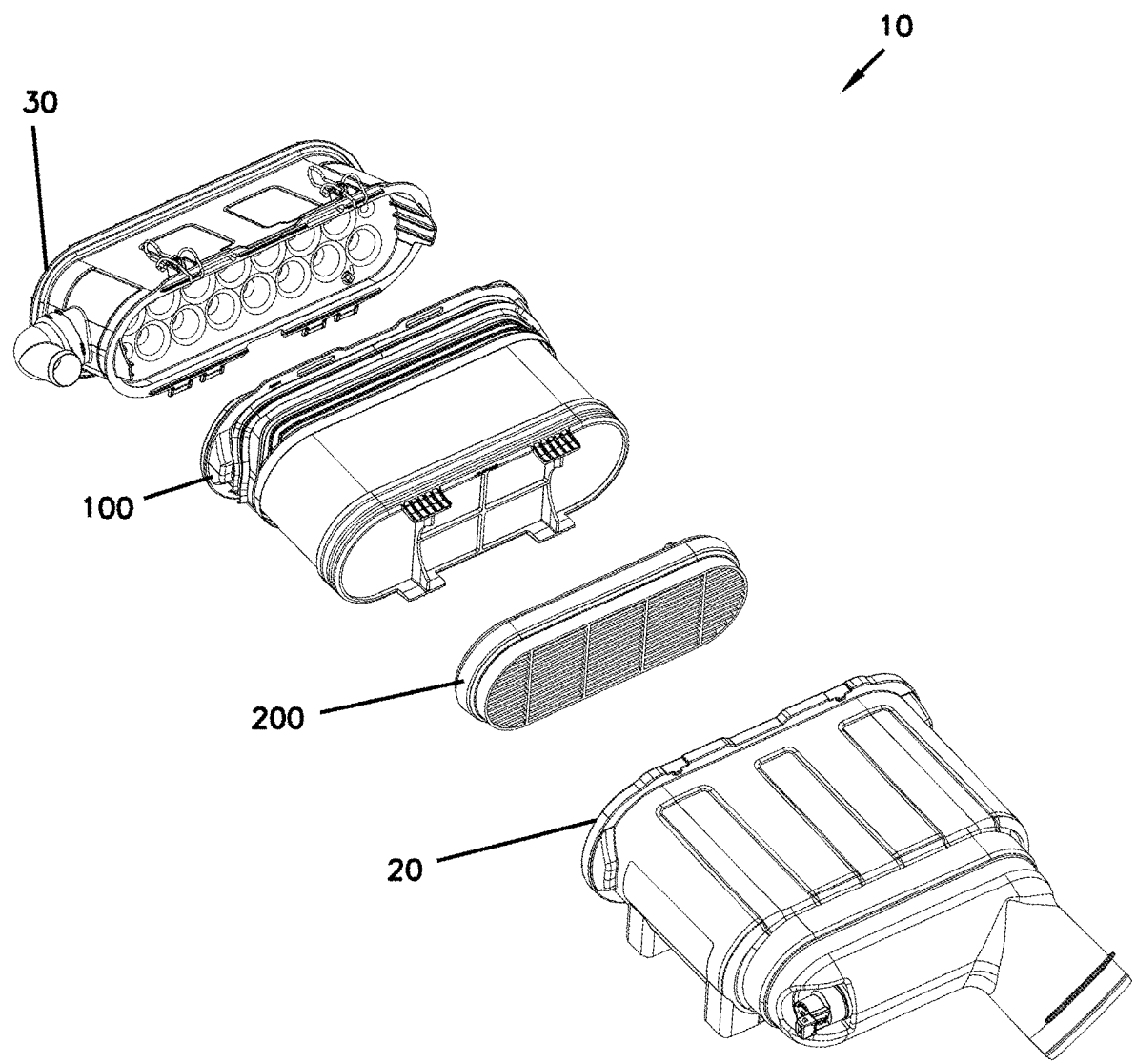
FIG. 68 is an exploded perspective view of the air cleaner assembly shown in FIG. 67.
Figure 69:
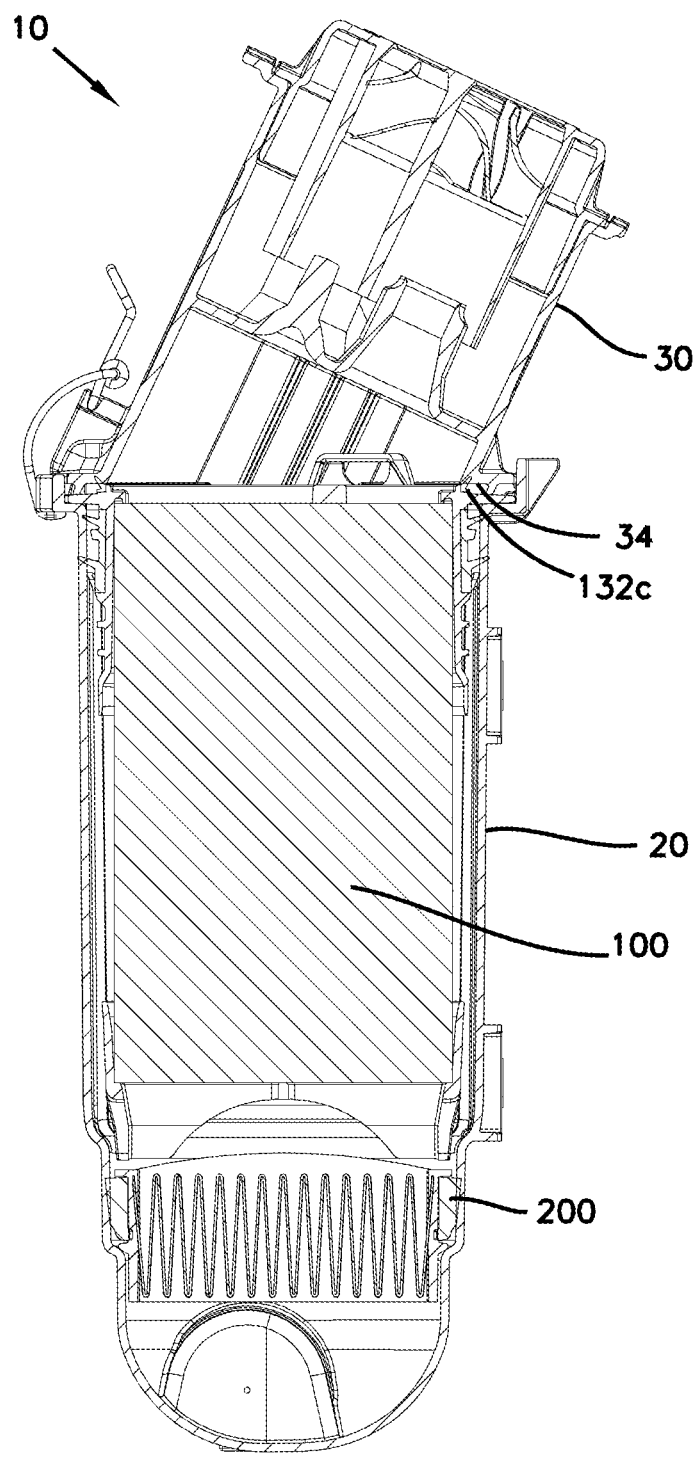
FIG. 69 is a first cross-sectional view of the air cleaner assembly shown in FIG. 67.

As most easily seen at FIGS. 58, 59, and 62, the hinged latch member 152 has a main body 152a defining an opening 152b through which the second attachment member 154 can extend. The hinged latch member 152 is also shown as being provided with a flanged member that can be used by an operator to grip the latch member 152 an can also impart strength to the main body 152a. In the example shown, the main body 152a is connected to the flange 125 via a living hinge 152d. The rib structures 154 include a main body 154a extending radially outward from the housing body sidewall 22 and include a ramped surface 154b and a latch surface 154c. The ramped surface 154b allows the main body 154a to more easily align with and pass through the opening 152b of the latch member 152 while the latch surface 154c engages with the side edge of the latch member main body 152a defined by the opening 152b. Thus, the interaction between the latch members 152 and rib structures 154 can be said to form a snap-fit connection with each other.

Figure 55:
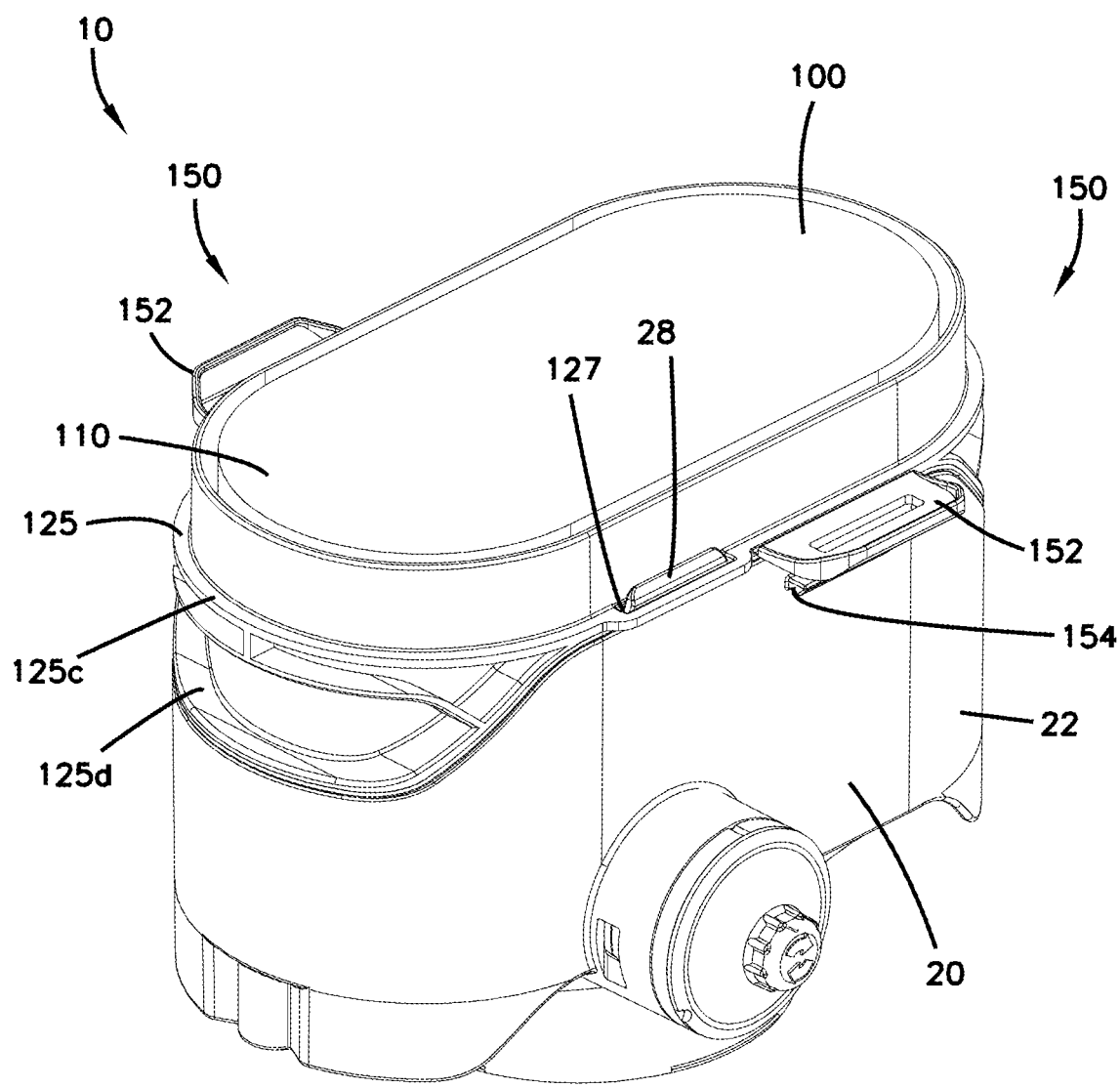
FIG. 55 is a first perspective view that is a schematic representation of a third example of an air cleaner assembly having features in accordance with the present disclosure, with a cover of the air cleaner assembly removed.
Figure 56:
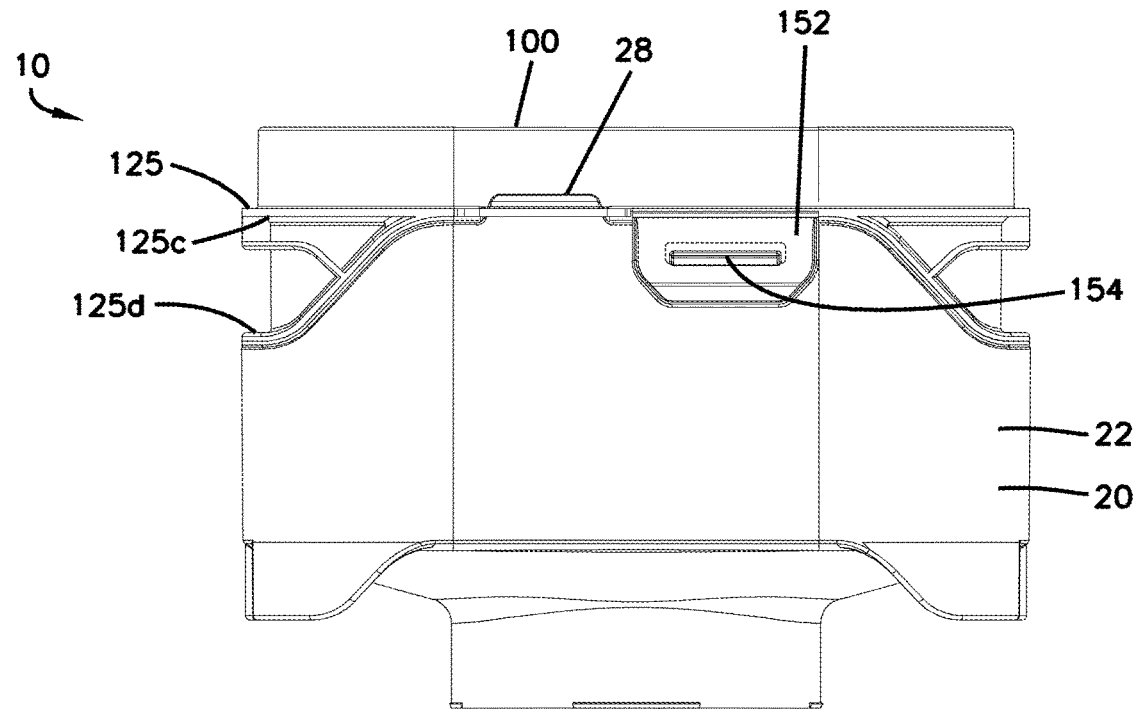
FIG. 56 is a side view of the air cleaner shown at FIG. 55, with attachment members of the filter cartridge being shown in a latched position.
Figure 57:
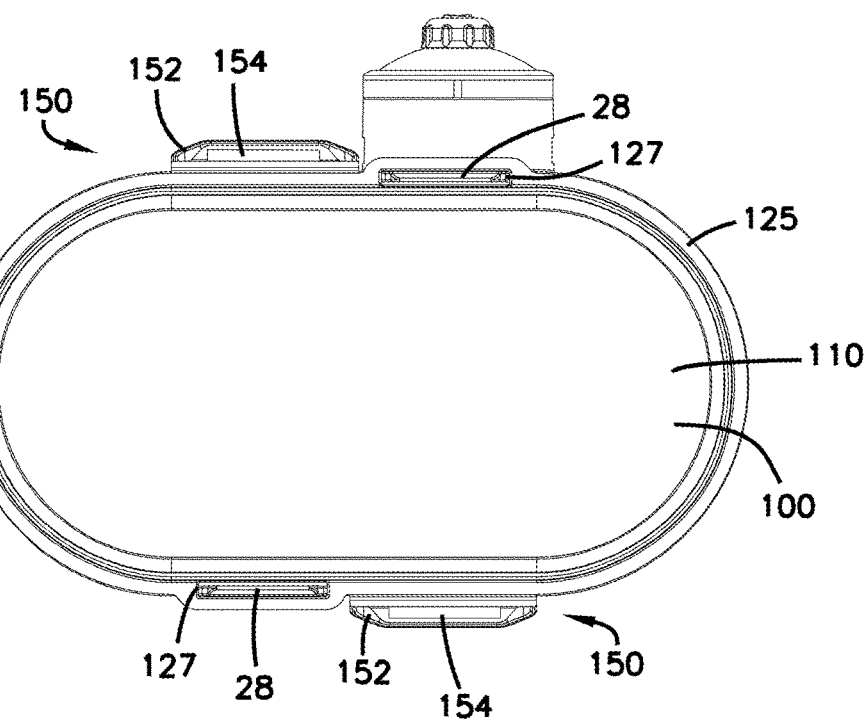
FIG. 57 is a top view of the air cleaner shown at FIG. 56.

FIG. 55 shows the latch member 152 in an open or unlatched position such that the filter cartridge 100 can be separated from the housing body 20 while FIGS. 56-59 show the latch members 152 in the latched or closed position such that the filter cartridge 100 is secured to the housing body 20. As should be appreciated, the attachment arrangements 150 further constrain the housing sidewall 22 from deflecting inwardly and outwardly and thus can be used in conjunction with the projection-receiver arrangement 28/127 to stabilize the long sides 22a of the housing body sidewall 22. Although the filter cartridge 100 is shown with the hinged latch members 152 and the housing 20 is shown with the rib structures 154, the reverse construction could be employed such that one or both of the latch members 152 are located on the housing body 20 and one or both of the rib projections 154 are located on the filter cartridge 100. Although two attachment arrangements 150 are shown, fewer or more could be provided.

Air Cleaner 10 (FIGS. 67-81)

Referring to FIGS. 67-81, a fourth example of an air cleaner 10 is presented. Air cleaner 10 is generally similar to the air cleaner 10 shown in FIGS. 1-50. Thus, where such similarities exist, the previous description is applicable for this example. The air cleaner 10 of FIGS. 67-81 differs from the first example in several aspects. For example, the seal arrangement 130 of the air filter cartridge 100 includes an additional axial seal member 132c. Also, the handles 124 of the filter cartridge 100 are differently configured. The filter cartridge 100 also includes stand-off legs 144 for ensuring that the filter cartridge 200 is fully seated and retained within the housing body 20. The filter cartridge 200 is also shown as being provided without a tab 206a. As discussed in the following section, the air filter cartridge 100 is also provided with recesses 121a in projections 121 for receiving projections or guide members 67 of the precleaner or cover assembly 30.

As most easily seen at FIGS. 71-75 and 77, the seal arrangement 130 is further provided with a seal member 132c. As configured, the seal member 132c is formed onto the flange 125, for example by injection molding a TPE lip-type seal onto the flange. In one aspect, the seal member 132c forms a closed loop on the flange 125 and extends axially away from the flange 125 at an oblique angle to the longitudinal axis X. Once installed, the seal member 132c forms an axial seal with the flange wall 34 of the precleaner assembly 60. As most easily seen at FIG. 69, the flange wall 34 and the flange 124 are generally parallel to each other, with the seal member 132c extending therebetween. The formation of a seal at this location ensures that all air processed through the precleaner assembly 60 is guided into the air filter cartridge 100.

The air filter cartridge 100 is also provided with handles 124 that are lower profile and differently located in comparison to the first disclosed embodiment. As shown, two handles 124 extend axially from the flange 125 and are located on opposite diagonal corners. Each handle 124 may be provided with an aperture 124a for accepting the finger of an operator such that a pulling force can be applied onto the handles 124 for removing the filter cartridge 100. By incorporating low-profile handles 124 into the design, less space is required between the precleaner outlet and the air filter cartridge inlet, thereby allowing the air cleaner assembly 10 to have a shorter overall length. Additionally, the disclosed design of the handles 124 enables a simpler molding procedure in that the entire shell 120 can be formed in an open-close injection molding process without the use of slide gates.

Air filter cartridge 100 is additionally provided with stand-off legs 144 extending from the perimeter wall 142 of the shell 140 in a direction generally parallel with the longitudinal axis X and with the perimeter wall 142. In the example shown, the stand-off legs 144 are integrally formed with the shell 140. However, the stand-off legs 144 could be separately formed and later attached. In the example shown, four stand-off legs 144 are provided. However, more or fewer stand-off legs 144 may be provided. Once the filter cartridge 200 has been at least partially installed, the stand-off legs 144 of the filter cartridge 100 abut a top surface or flange 202a of the filter cartridge frame 202. Once this contact occurs, the installation force and motion of the filter cartridge 100 will exert pressure onto the filter cartridge 200 via the stand-off legs 144 to fully seat the filter cartridge 200 in an installed position. After installation, the stand-off legs 144 act to retain the filter cartridge 200 in place. As most easily seen at FIG. 78, the filter cartridge 200 includes a handle 206 extending in the opposite direction of the stand-off legs 144 and resides within the gap defined between the outlet of the filter cartridge 100 and the inlet of the filter cartridge 200 established by the stand-off legs 144.

Air Cleaner 10 (FIGS. 82-103)

Figure 81:
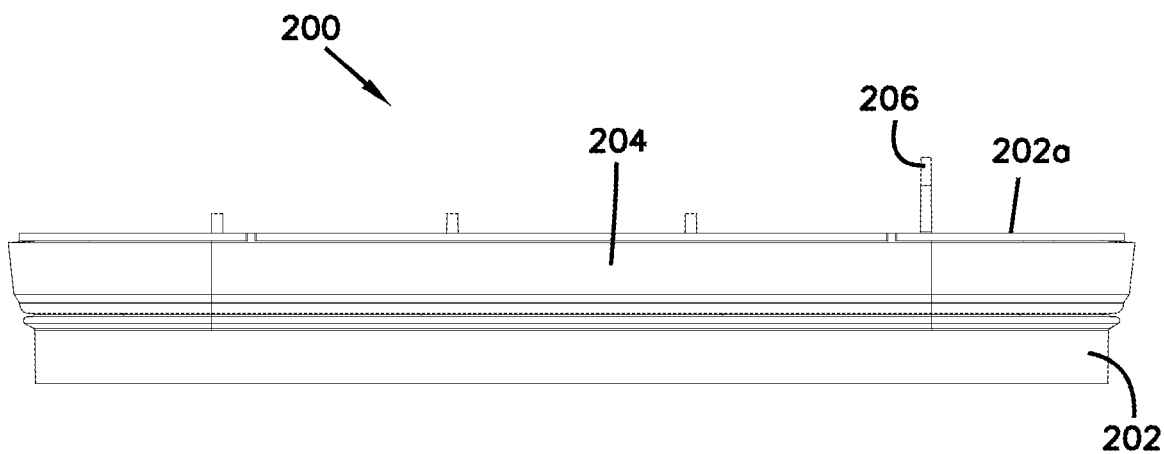
FIG. 81 is a second side view of the secondary filter cartridge shown in FIG. 71.
Figure 82:
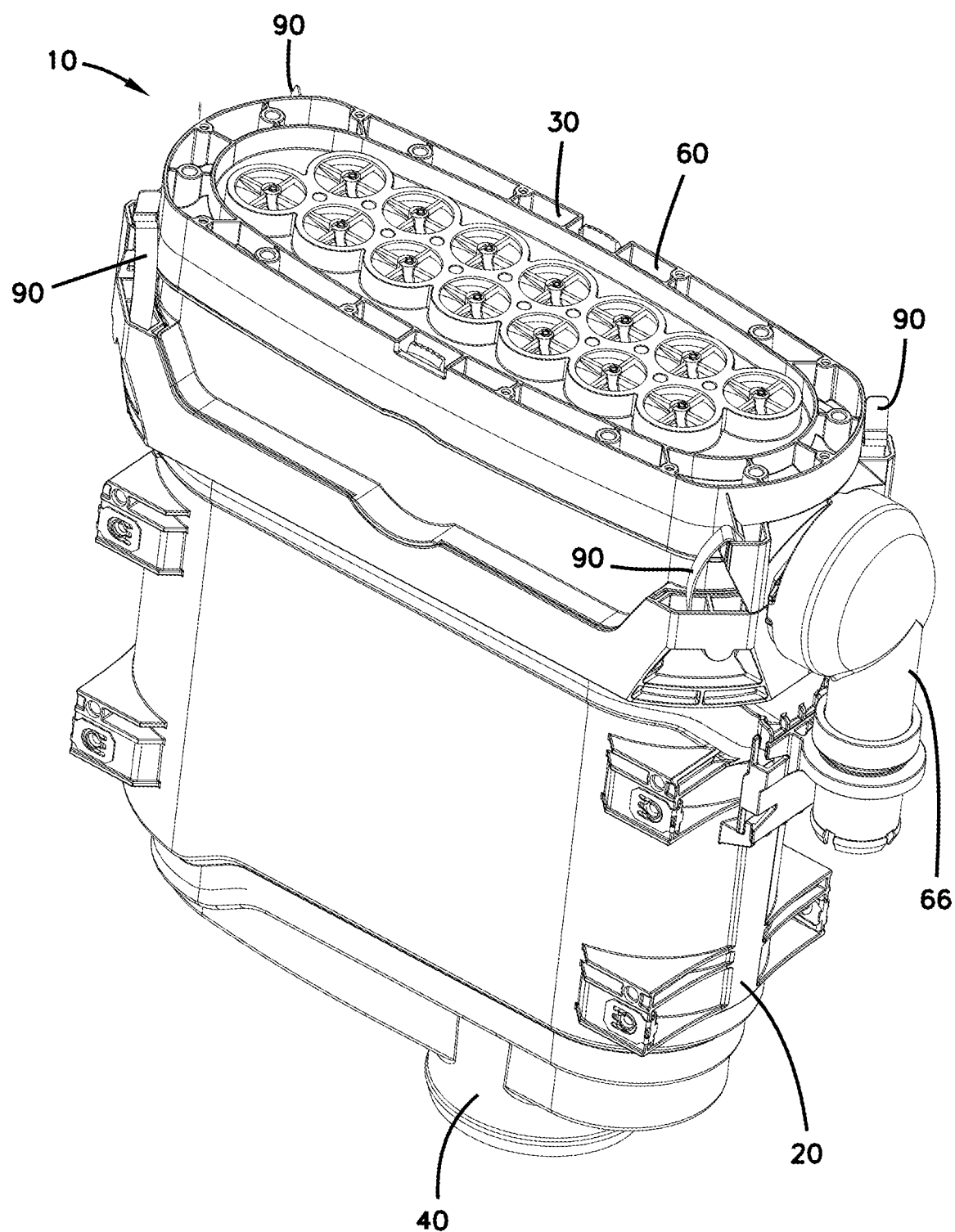
FIG. 82 is a perspective view that is a schematic representation of a fifth example of an air cleaner assembly having features in accordance with the present disclosure.
Figure 83:
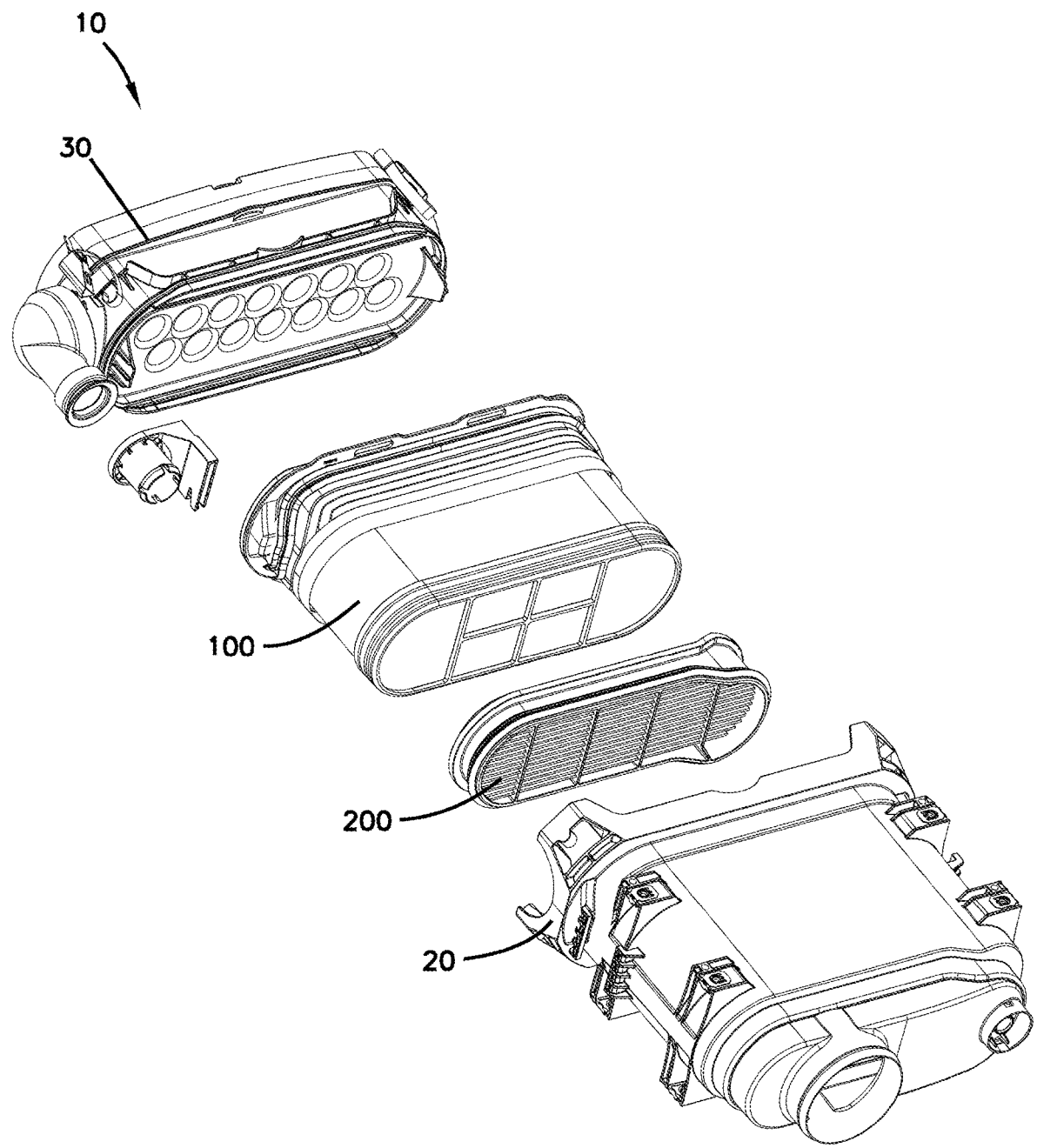
FIG. 83 is an exploded perspective view of the air cleaner assembly shown in FIG. 82.
Figure 84:
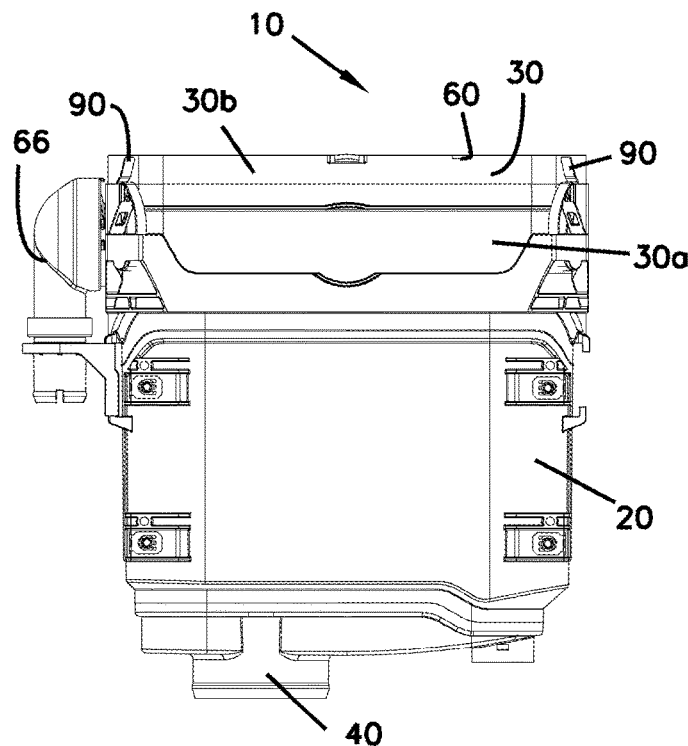
FIG. 84 is a first side view of the air cleaner assembly shown in FIG. 82.
Figure 85:
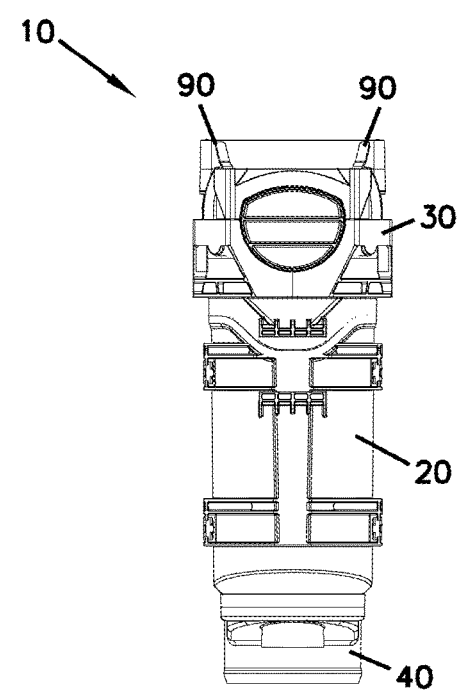
FIG. 85 is a second side view of the air cleaner assembly shown in FIG. 82.
Figure 86:
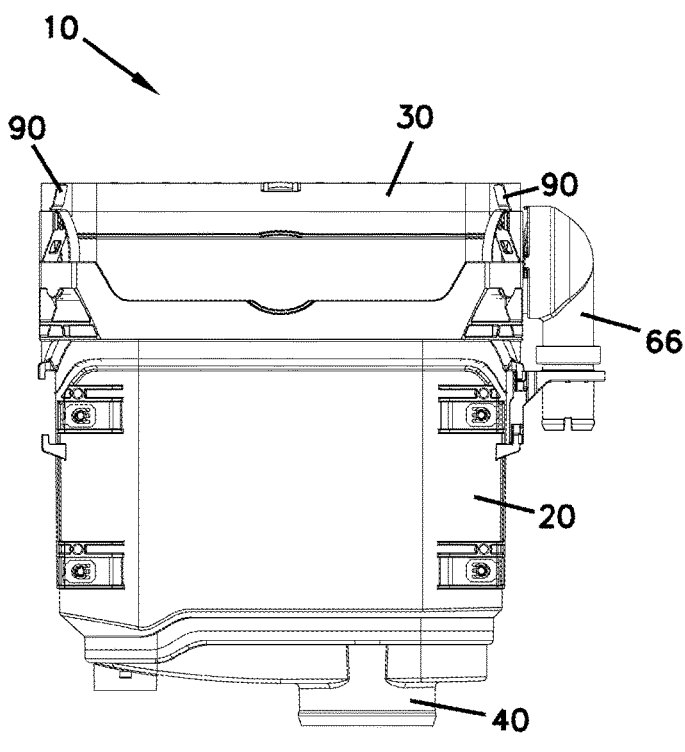
FIG. 86 is a third side view of the air cleaner assembly shown in FIG. 82.
Figure 87:
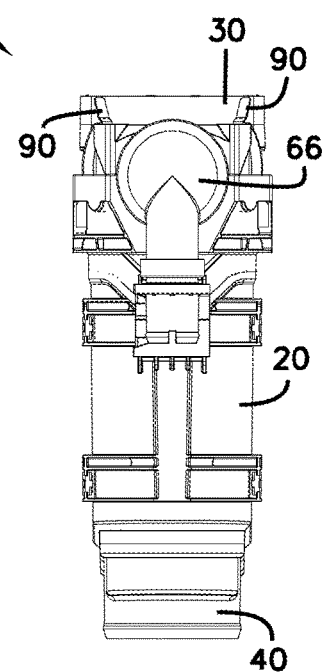
FIG. 87 is a fourth side view of the air cleaner assembly shown in FIG. 82.
Figure 88:
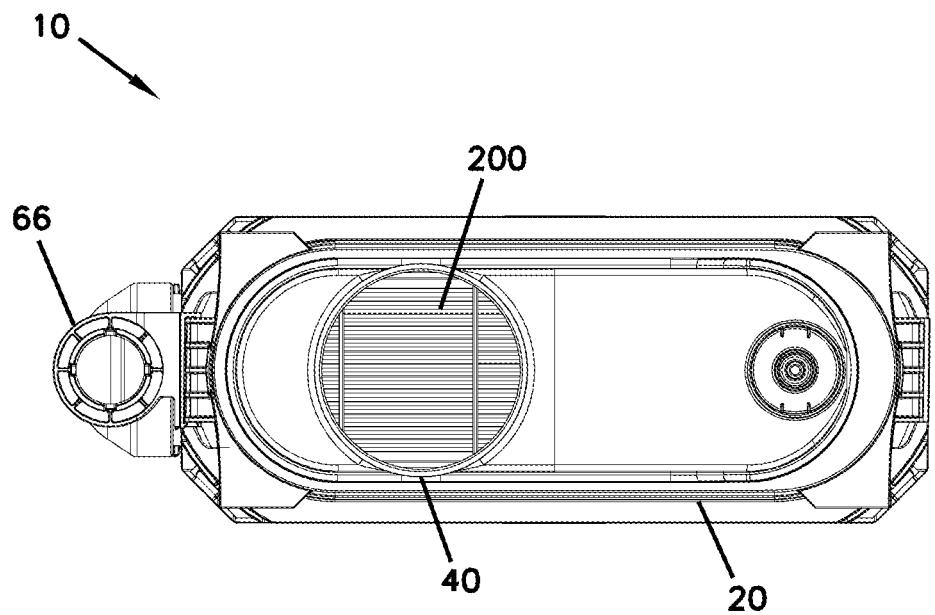
FIG. 88 is a bottom view of the air cleaner assembly shown in FIG. 82.
Figure 89:
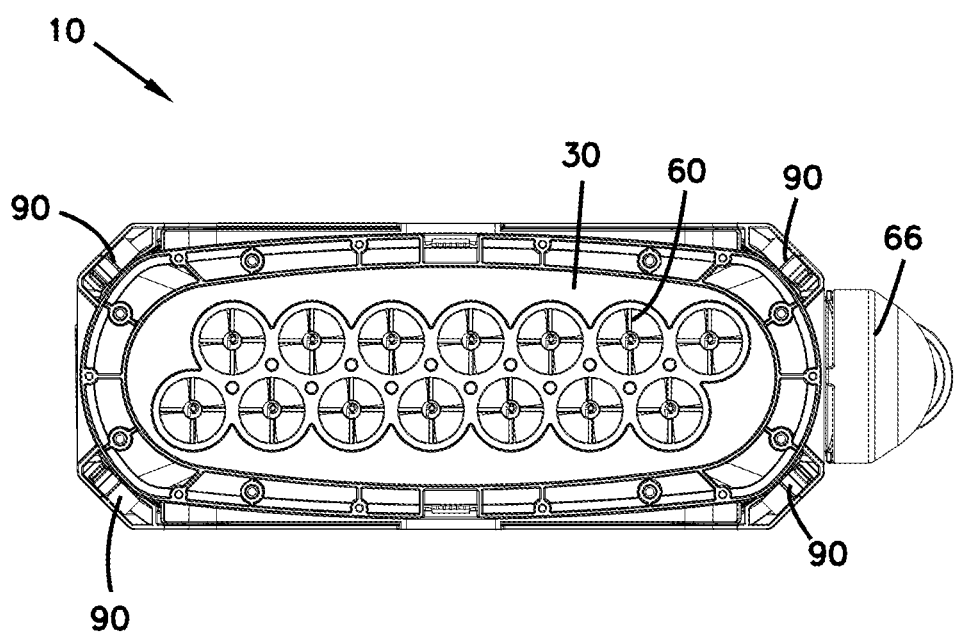
FIG. 89 is a top view of the air cleaner assembly shown in FIG. 82.
Figure 90:
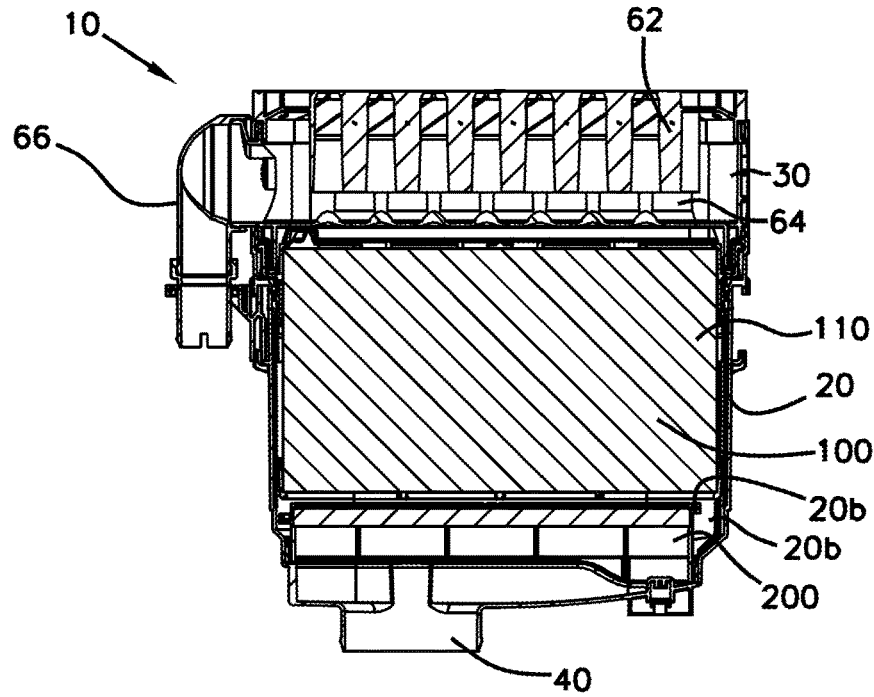
FIG. 90 is a first cross-sectional view of the air cleaner assembly shown in FIG. 82.
Figure 91:
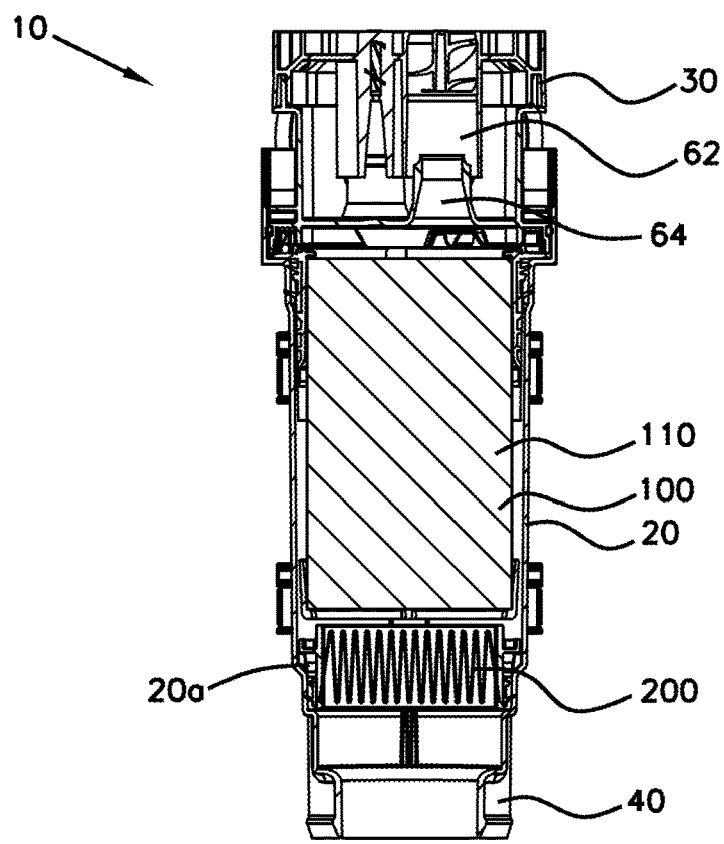
FIG. 91 is a second cross-sectional view of the air cleaner assembly shown in FIG. 82.
Figure 92:
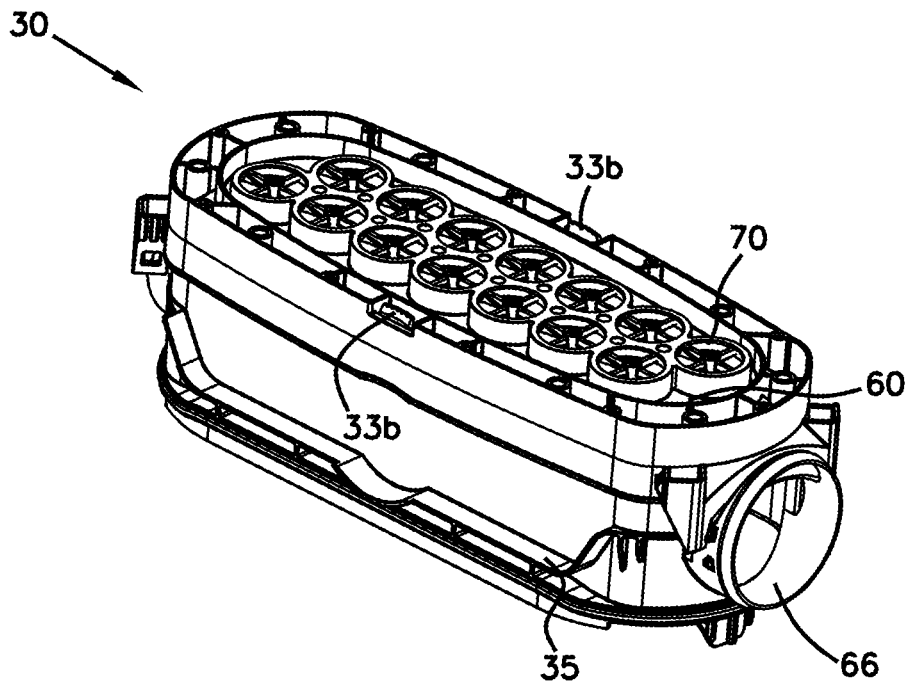
FIG. 92 is a top perspective view of a precleaner assembly of the air cleaner assembly shown in FIG. 82.
Figure 93:
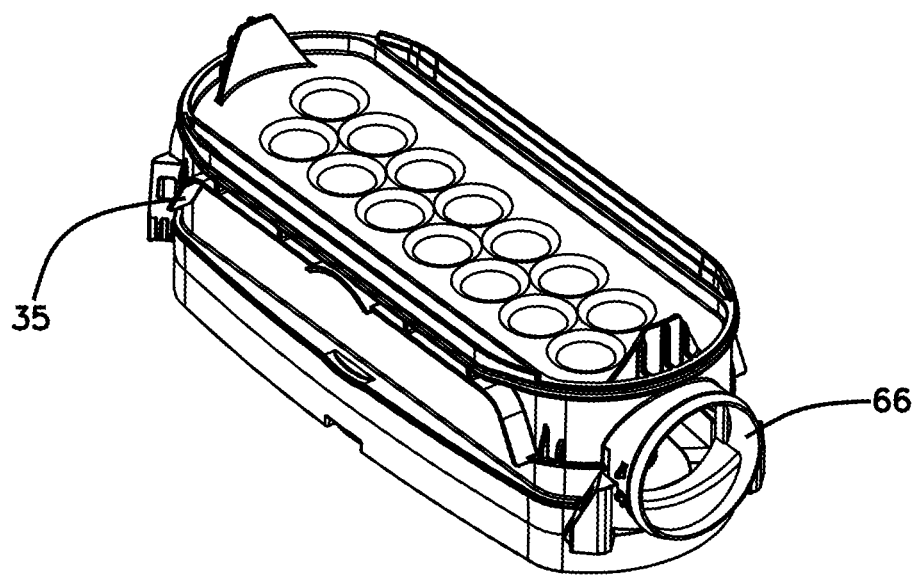
FIG. 93 is a bottom perspective view of the precleaner assembly shown in FIG. 92.
Figure 94:
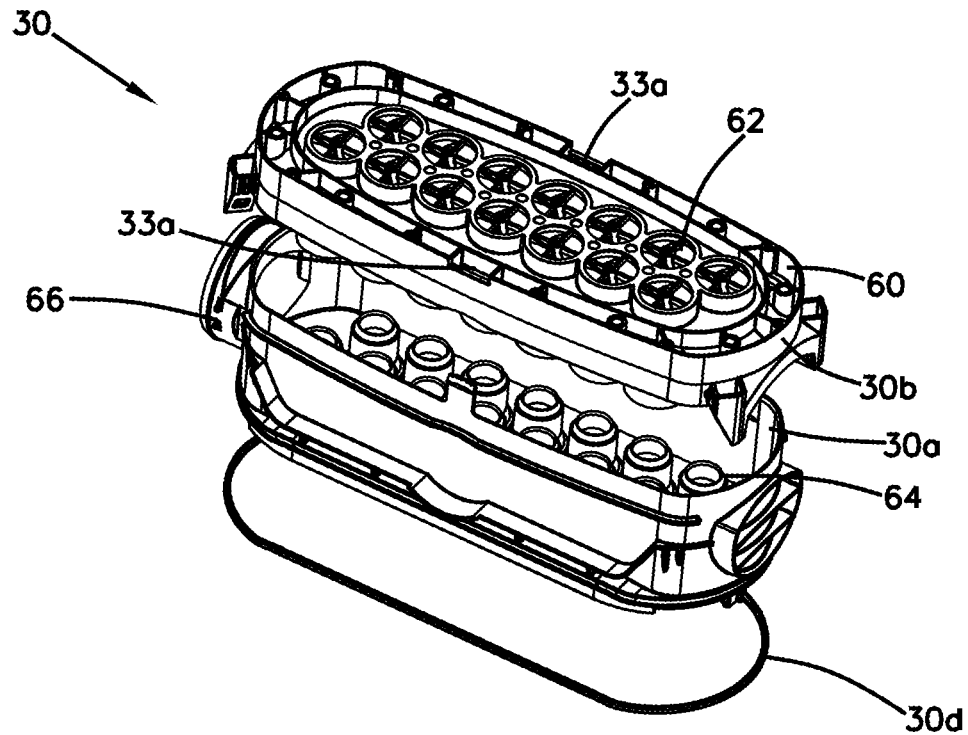
FIG. 94 is an exploded view of the precleaner assembly shown in FIG. 92.
Figure 95:
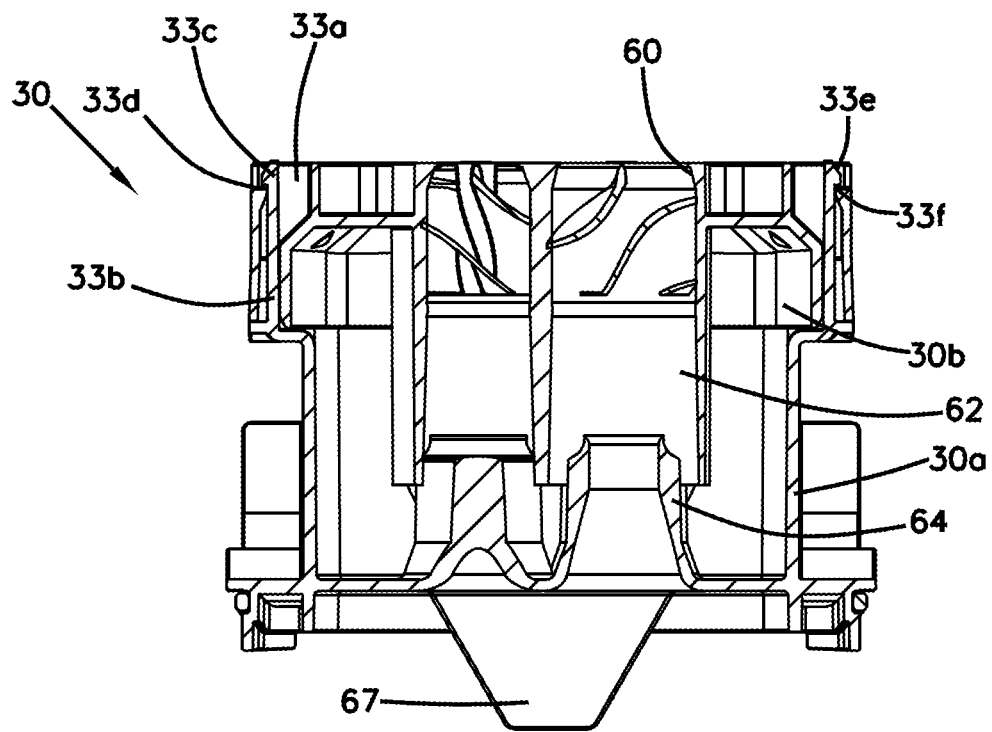
FIG. 95 is a cross-sectional view of the precleaner assembly shown in FIG. 92.
Figure 96:
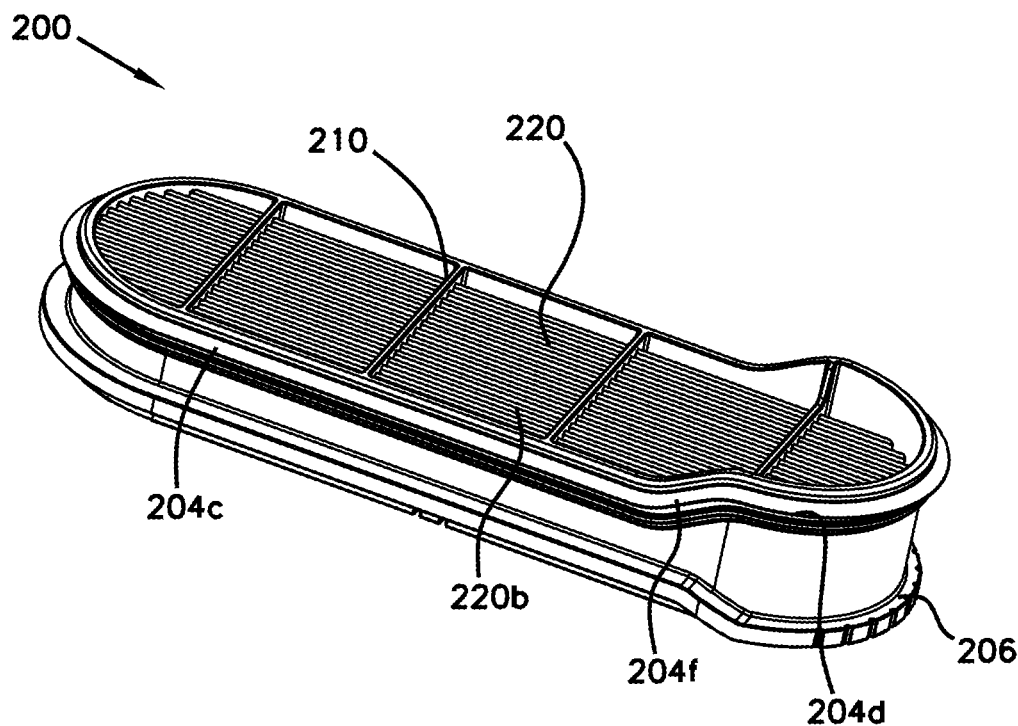
FIG. 96 is a bottom perspective view of a secondary filter cartridge of the air cleaner assembly shown in FIG. 92.
Figure 97:
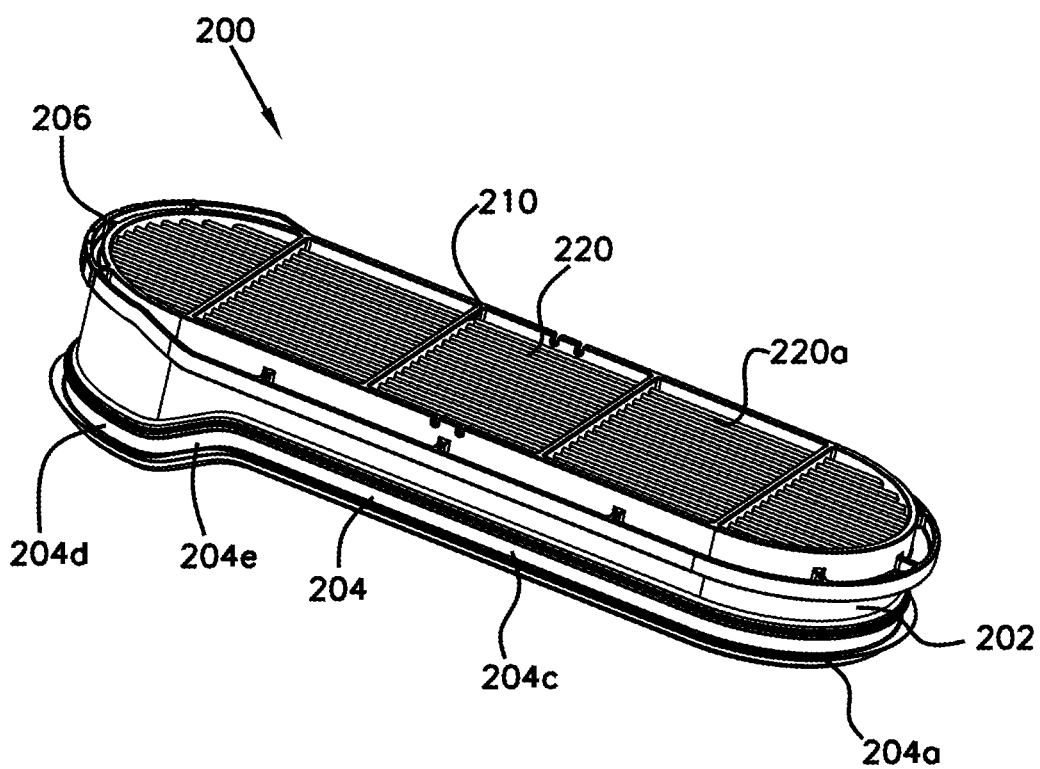
FIG. 97 is a top perspective view of the secondary filter cartridge shown in FIG. 96.
Figure 98:
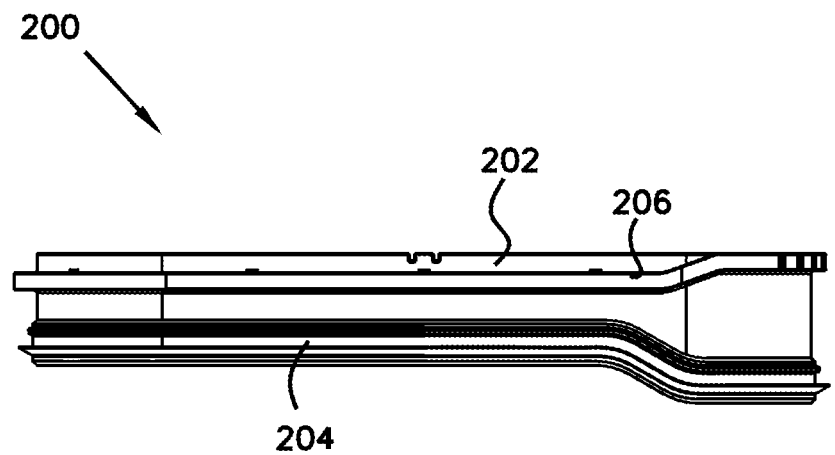
FIG. 98 is a side view of the secondary filter cartridge shown in FIG. 96.
Figure 99:
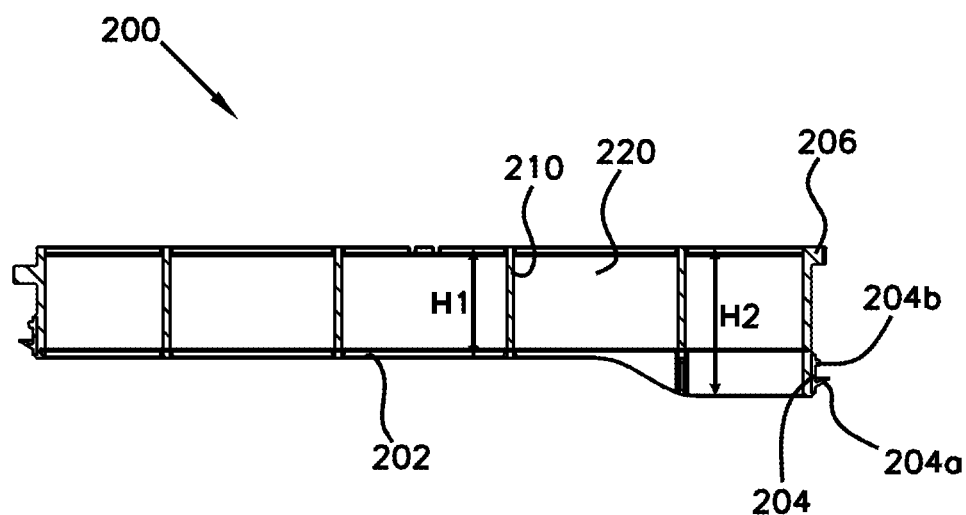
FIG. 99 is a cross-sectional view of the secondary filter cartridge shown in FIG. 96.
Figure 100:
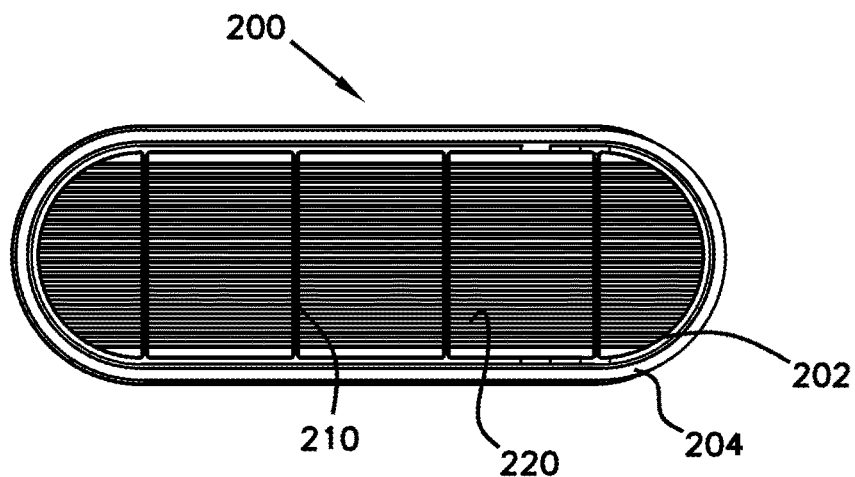
FIG. 100 is a bottom view of the secondary filter cartridge shown in FIG. 96.
Figure 101:
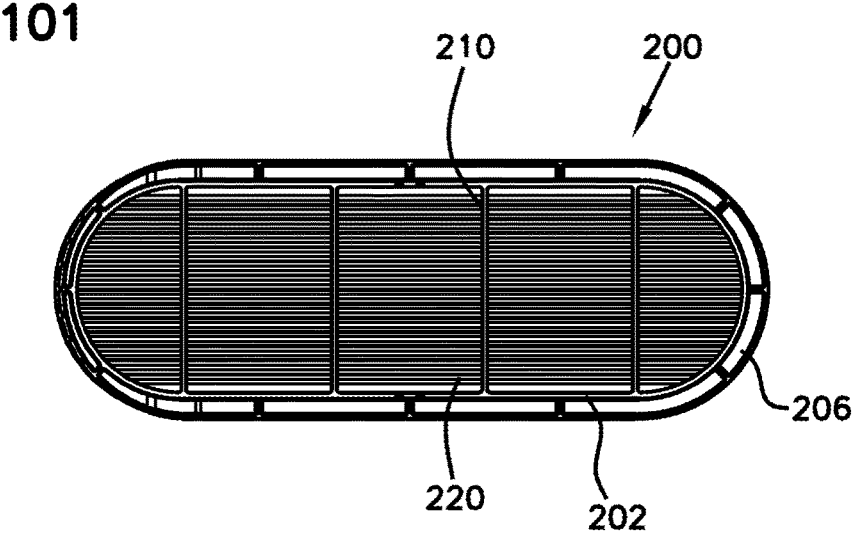
FIG. 101 is a top view of the secondary filter cartridge shown in FIG. 96.
Figure 102:
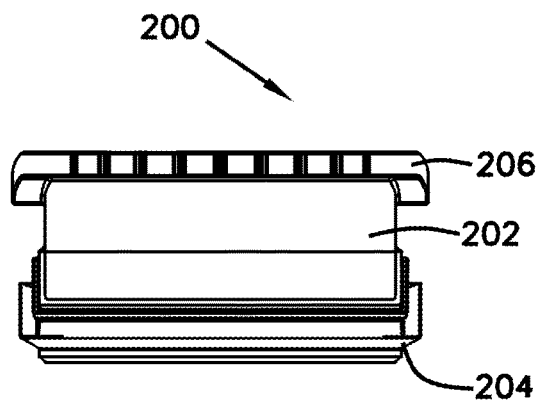
FIG. 102 is a first end view of the secondary filter cartridge shown in FIG. 96.
Figure 103:
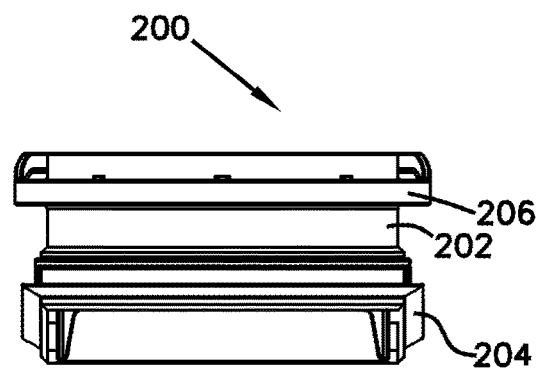
FIG. 103 is a second end view of the secondary filter cartridge shown in FIG. 96.
Figure 104:
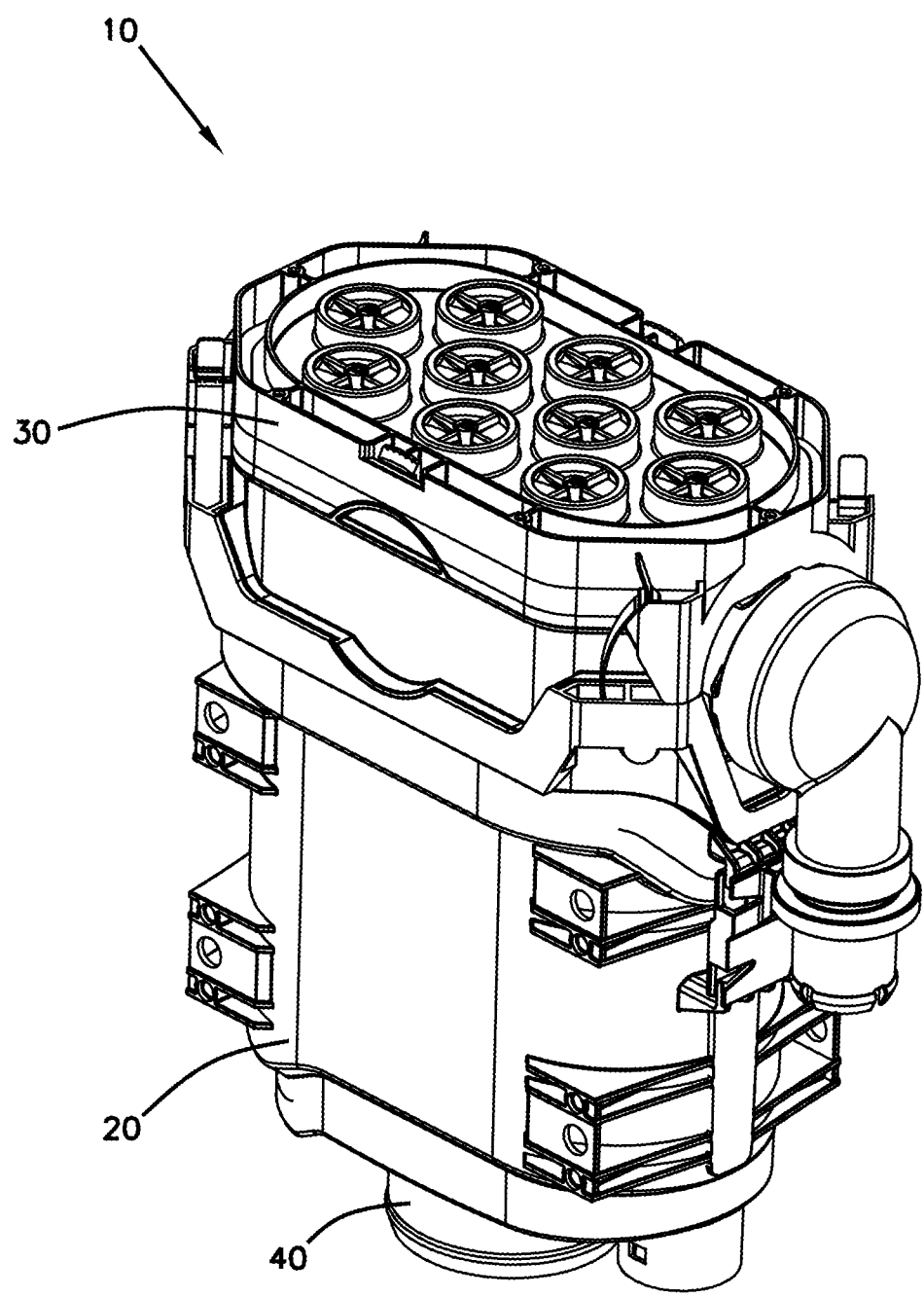
FIG. 104 is a perspective view that is a schematic representation of a sixth example of an air cleaner assembly having features in accordance with the present disclosure.
Figure 105:
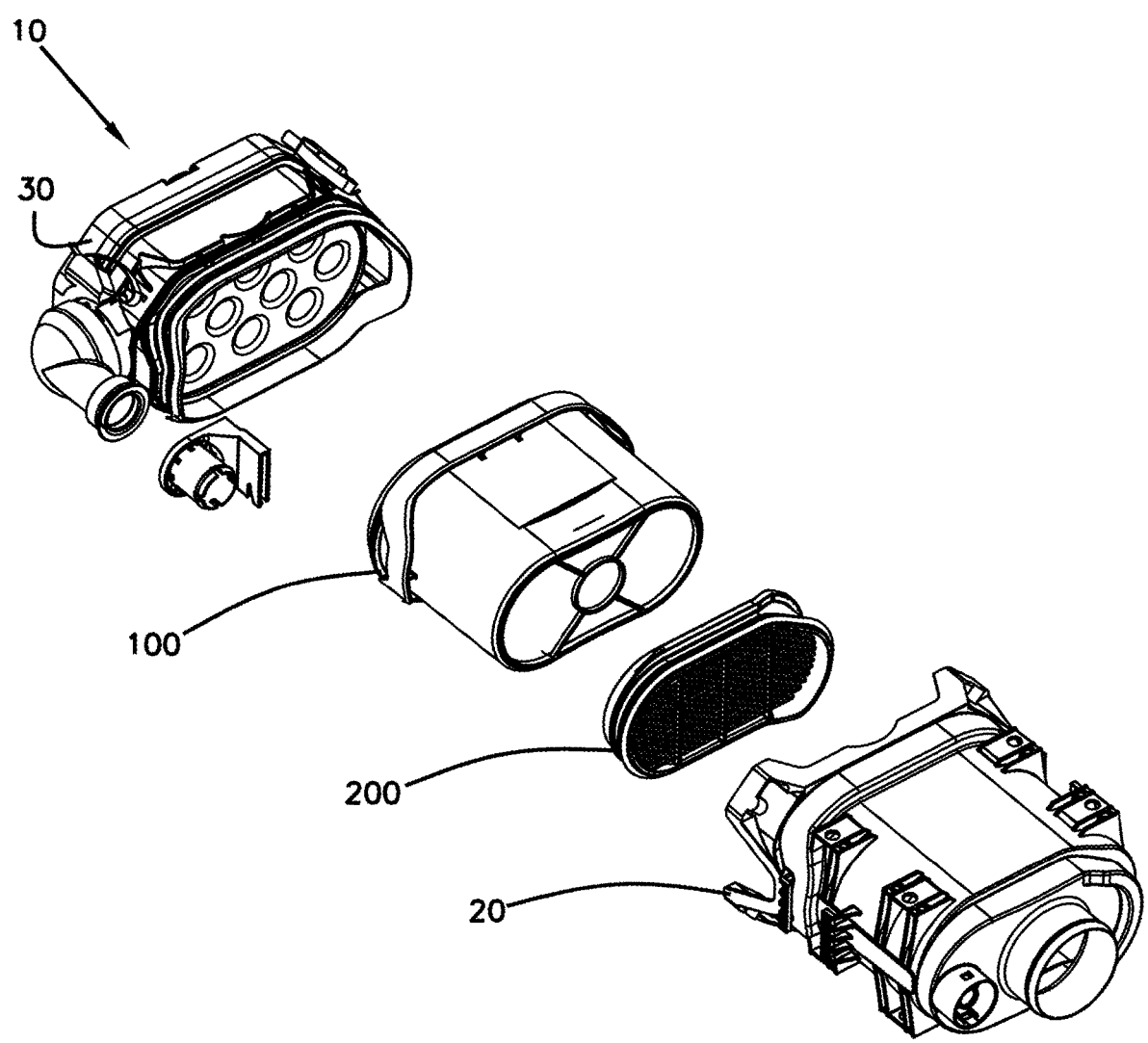
FIG. 105 is an exploded perspective view of the air cleaner assembly shown in FIG. 104.
Figure 106:
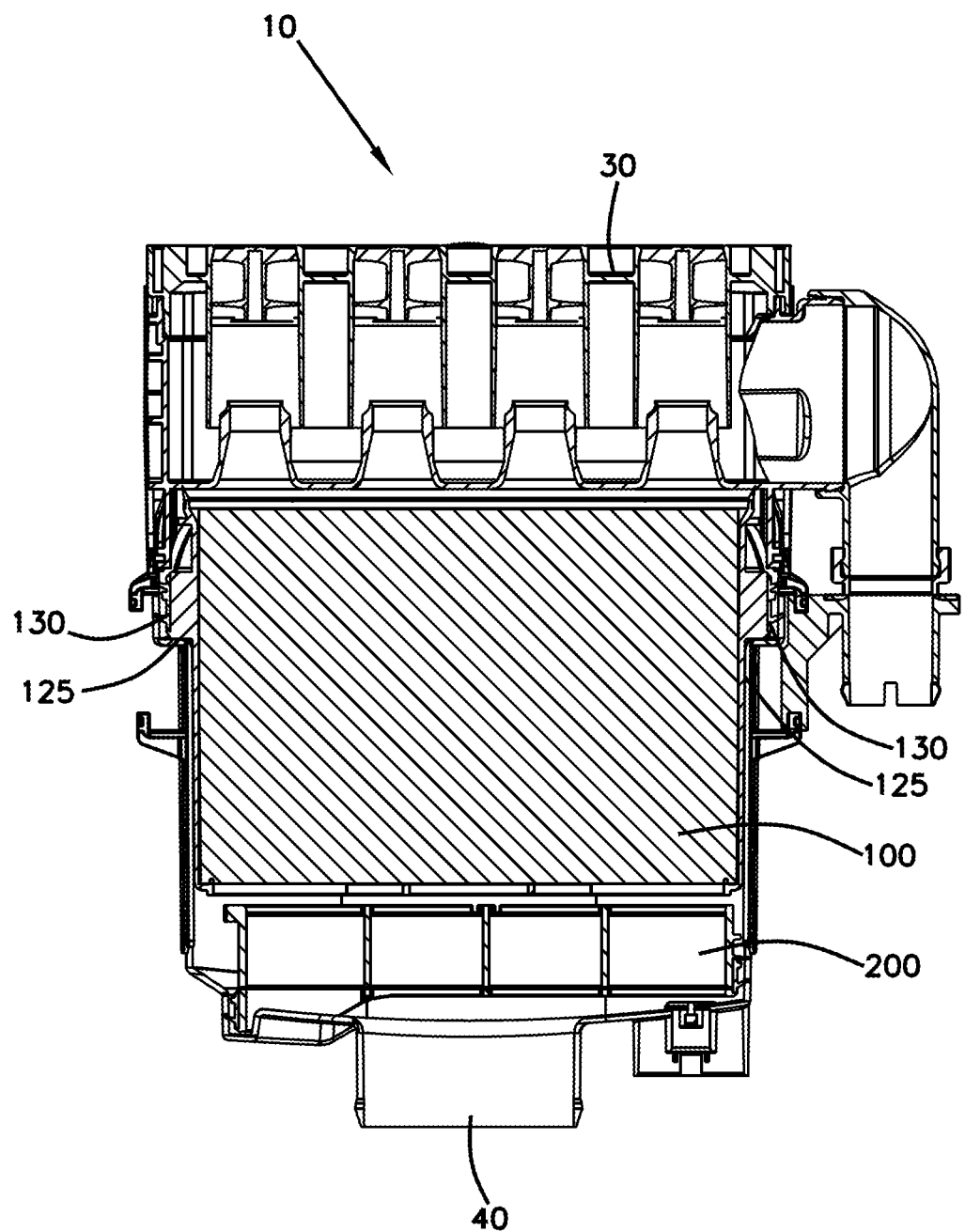
FIG. 106 is a first cross-sectional view of the air cleaner assembly shown in FIG. 104.
Figure 107:
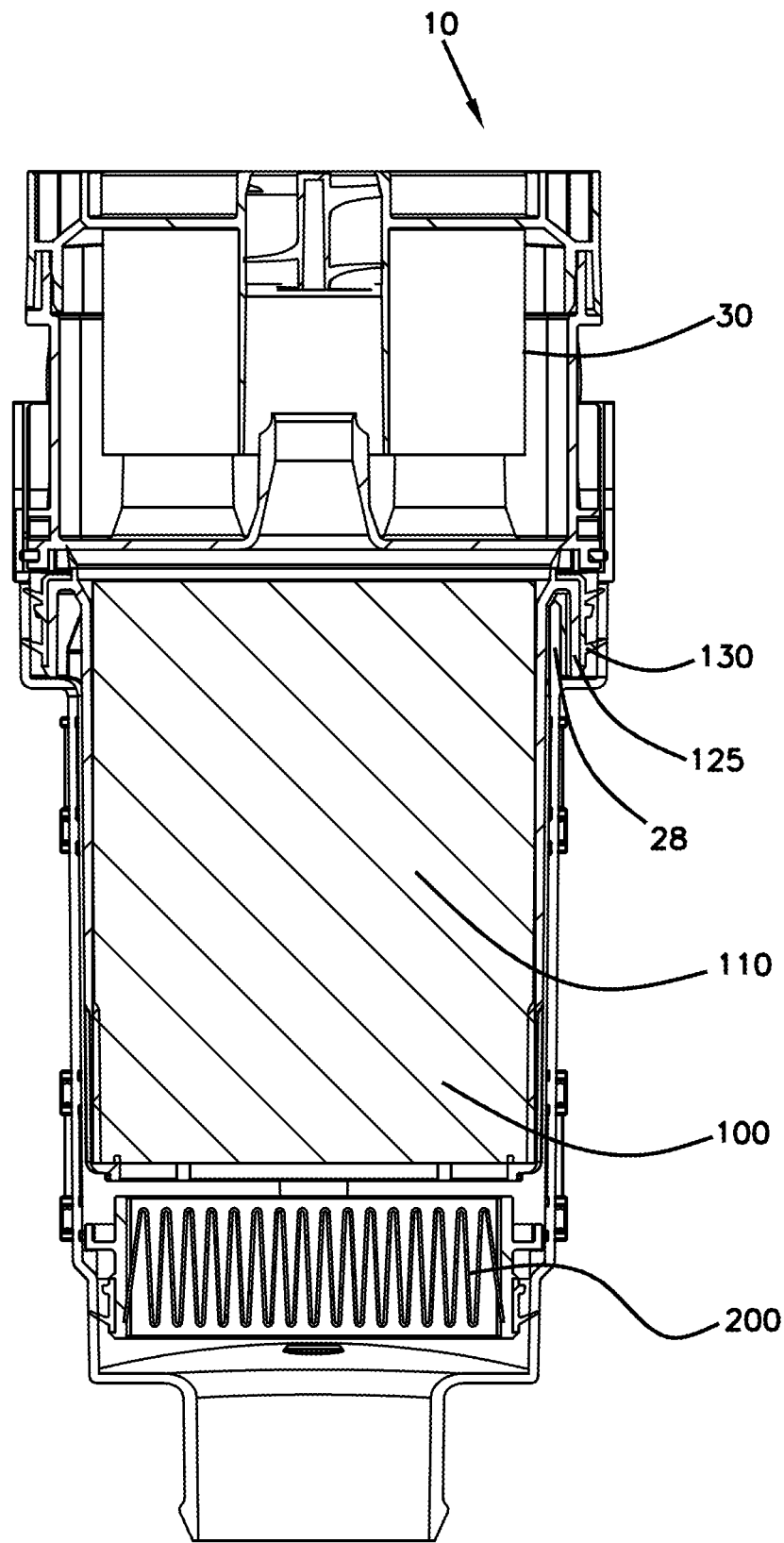
FIG. 107 is a second cross-sectional view of the air cleaner assembly shown in FIG. 104.
Figure 108:
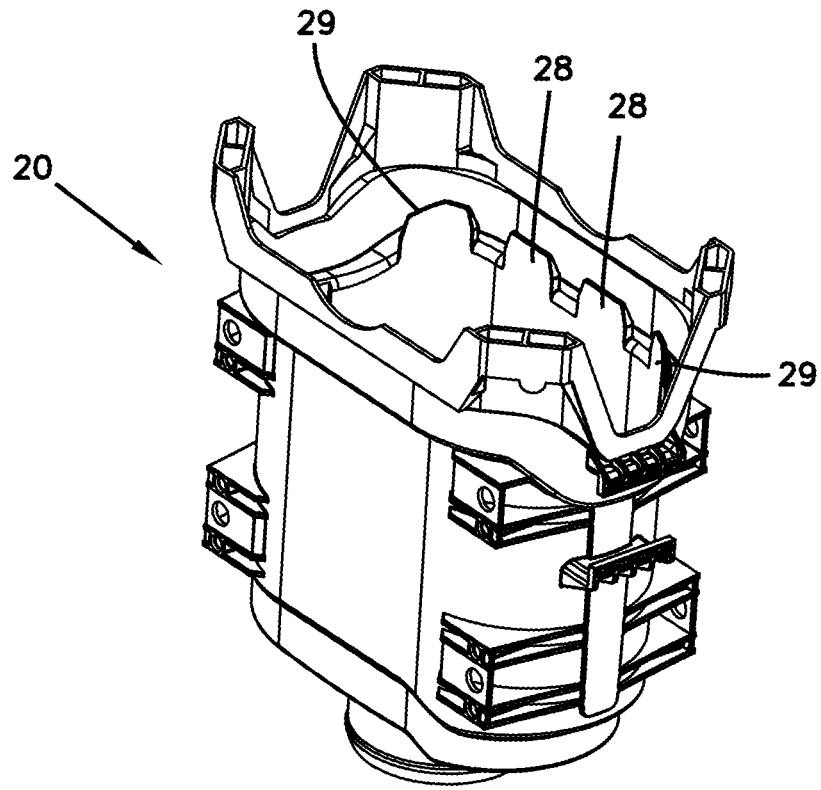
FIG. 108 is a perspective view of a housing of the air cleaner assembly shown in FIG. 104.
Figure 109:
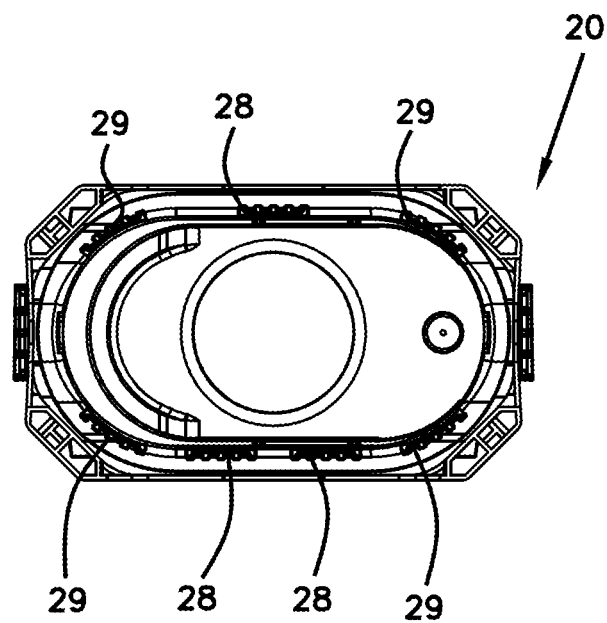
FIG. 109 is a top view of the housing shown in FIG. 108.
Figure 110:
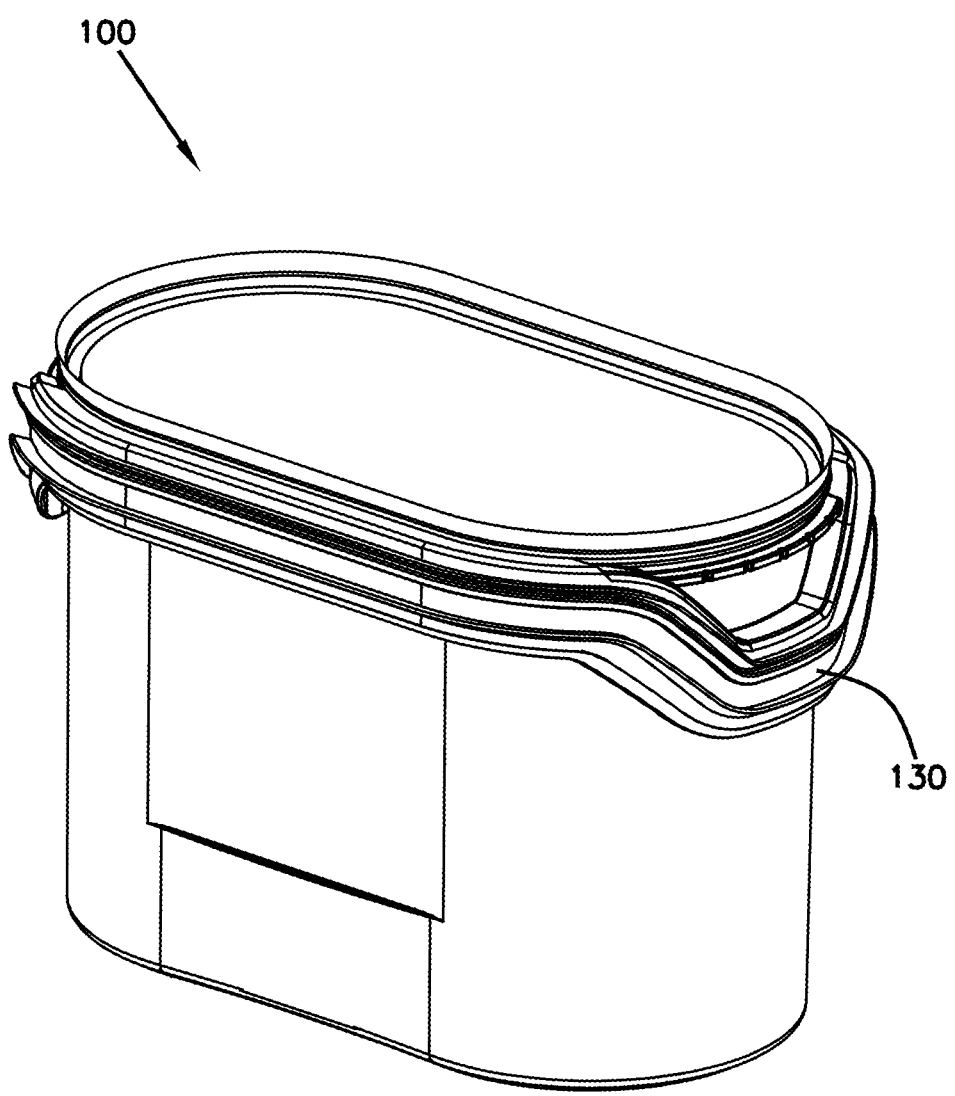
FIG. 110 is a perspective view of a main filter cartridge of the air cleaner assembly shown in FIG. 104.
Figure 111:
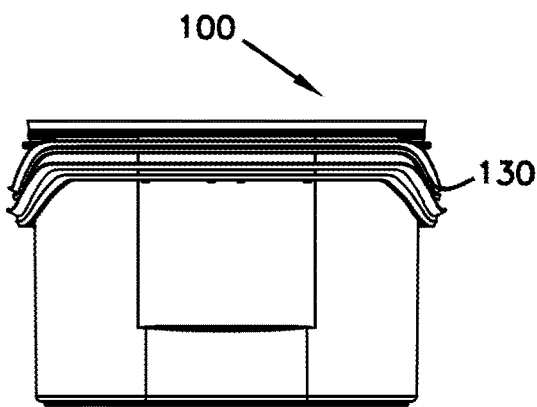
FIG. 111 is a first side view of the main filter cartridge shown in FIG. 110.
Figure 112:
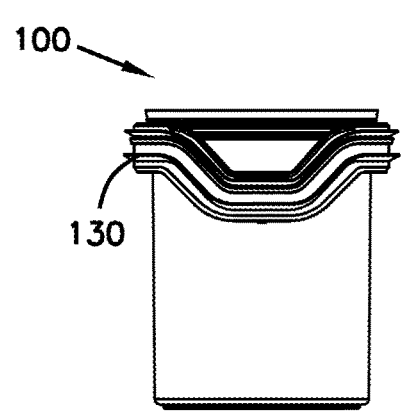
FIG. 112 is a second side view of the main filter cartridge shown in FIG. 110.
Figure 113:
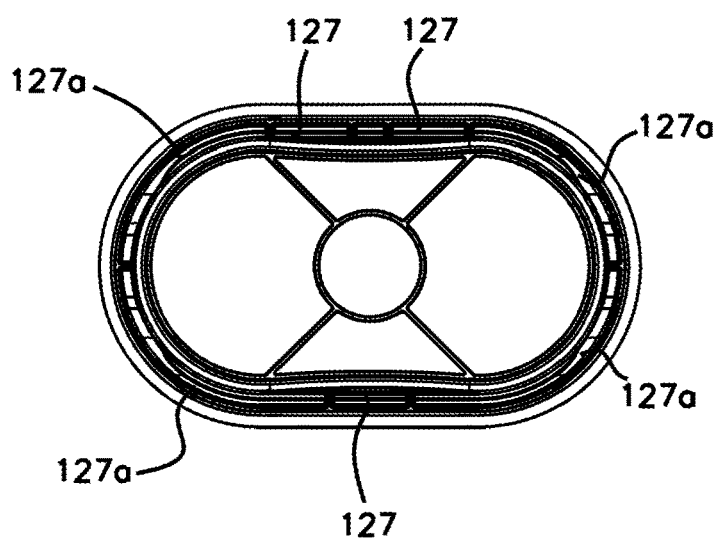
FIG. 113 is a bottom view of the main filter cartridge shown in FIG. 110.
Figure 114:
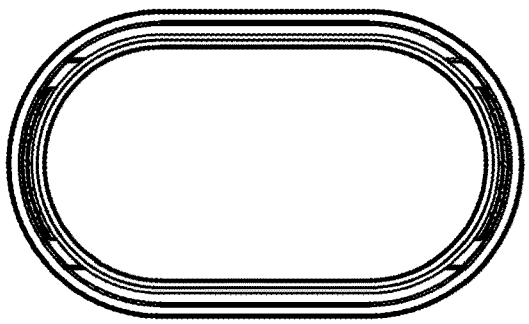
FIG. 114 is a top view of the main filter cartridge shown in FIG. 110.
Figure 115:
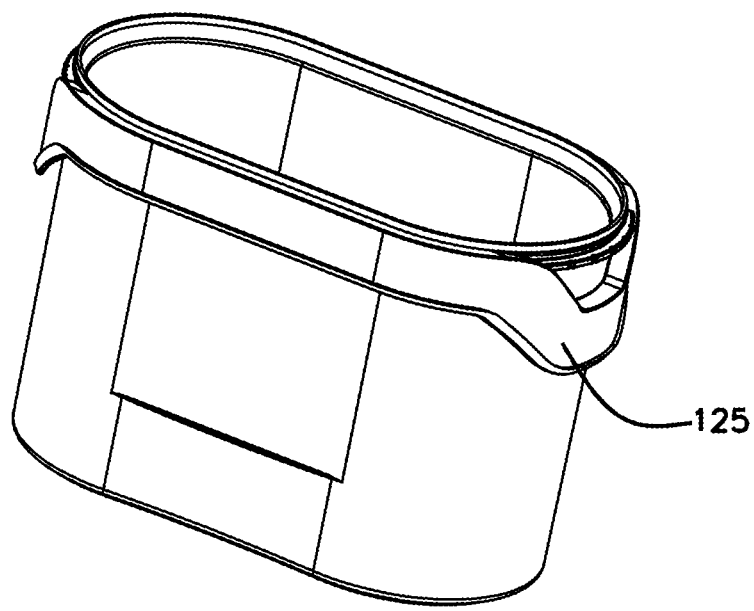
FIG. 115 is a first perspective view of an outer shell of the main filter cartridge shown in FIG. 110.
Figure 116:
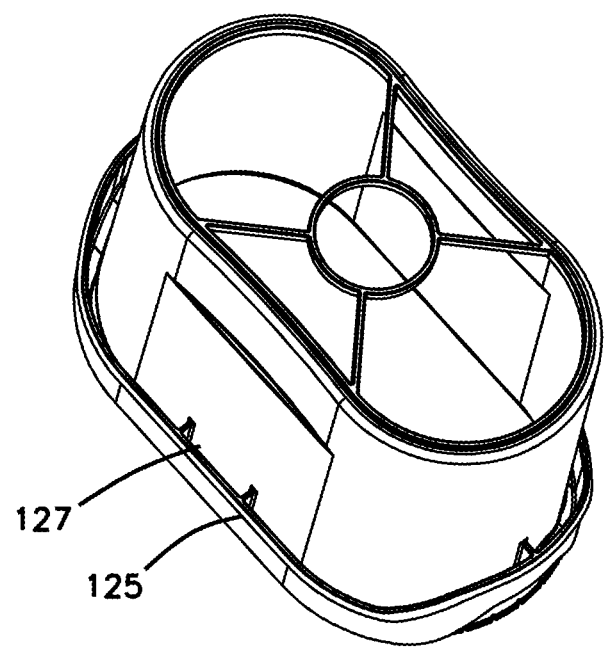
FIG. 116 is a second perspective view of the outer shell shown in FIG. 115.

Referring to FIGS. 82-81, a fifth example of an air cleaner 10 is presented. Air cleaner 10 is generally similar to the air cleaner 10 shown in FIGS. 67-81. For example, the air filter cartridge 100 is generally of the same design. Similarities also exist with respect to the air cleaner 10 shown in FIGS. 1-50. Thus, where such similarities exist, the previous description is applicable for this example. The air cleaner 10 of FIGS. 82-103 differs from the other examples in several aspects. For example, the air cleaner 10 is provided with a different safety filter cartridge 200 design and is also provided with a different cover assembly 30 design.

Referring to FIGS. 92-95, the cover assembly 30 is shown in isolation. The cover assembly 30 may be referred to as a precleaner assembly 30 which in turn houses a precleaner 60. In one aspect, a first component 30a is connected to a second component 30b to form the precleaner assembly 30 and precleaner 60. A seal member 30d may be provided between the first component 30a and housing body 20 to prevent air leakage. The precleaner 60 generally is used to clean selected material or contaminants carried by an air stream into the air cleaner assembly 10 before the air reaches the filter cartridge positioned therein. The precleaner 60 generally includes a plurality of separator tubes 62 or centrifugal separators that receive air and spin the air in order to remove large particulates, and then permit pre-cleaned air to exit the precleaner. As shown, the separator tubes 62 are formed on the second component 30b of the precleaner assembly 30. The pre-cleaned air from the separator tubes 62 exits into outlet tubes 64 of the precleaner 60 and then flows into the inlet flow face of the filter cartridge 100. As shown, the outlet tubes 64 are formed on the first component 30a of the precleaner assembly 30. A scavenge port or outlet 66 can be provided for removal of the separated large particulates. In the embodiment shown in FIG. 92, fourteen separator tubes 70 are provided. More or fewer separator tubes 62 and corresponding outlet tubes 64 may be provided. The air precleaner assembly 30 may also be provided with guide members 67 extending from the first component 30a towards the interior of the housing body 20 and filter cartridge 100. In one aspect, the guide members 67 are received into recesses 121a formed by the projections 121 in the filter cartridge 100. Such a configuration provides additional positioning a stabilization of the filter cartridge 100 within the housing body 20. This feature is also present in the example shown at FIG. 67-81, as most easily seen at FIGS. 70 and 72-75. The precleaner assembly 30 first component 30a may also be provided with radial flange portions 35 for closing off the radial gap between the first component 30a and the housing body 20 to prevent ingress of contaminants.

In contrast to the example shown at FIGS. 1-50, the first and second components 30a, 30b are secured together via a snap-fit type connection 33 independently of external fasteners (e.g. fasteners 30c). Thus, when the precleaner assembly 30 of FIGS. 92-95 is removed from the housing body 20, the first and second components 30a, 30b remain connected to each other. With the example shown at FIGS. 1-50, the first and second parts 30a, 30b are held together by the same fastener 30c that retains the components 30a, 30b onto the housing body 20. Thus, when the fasteners 30c are removed to access the filter cartridge 100, the components 30a, 30b become separated. Accordingly, the snap-fit connection 33 has an advantage that an operator need not handle two separated components when accessing the interior of the housing body 20 to service a filter cartridge 100 and/or 200. In one aspect, the snap-fit connection 33 is formed by a pair of recesses or apertures 33a formed in the first component 30a and a corresponding pair of deflectable latch arms 33b formed in the second component 30b. As most easily seen at FIG. 95, the deflectable latch arms 33b each include outwardly ramped latch portions 33c that engage with a catch surface 33d formed in the first component 30a adjacent the apertures 33a.

As the second component 30b is being installed onto the first component, the ramped surface 33e of the latch portions 33c guide and deflect the deflectable latch arms inwardly towards the apertures 33a. As the second component 30b is further installed onto the first component 30c, the ramped surfaces 33e move past the catch surfaces 33d on the first component and the deflectable latch arms 33b deflects outwardly towards their natural state until latch surfaces 33f of the latch portions 33c engage with the catch surfaces 33d. At this point, the first component 30a is secured to the second component 30b. As most easily seen at FIGS. 82 and 84-87, the assembled cover or precleaner assembly 30 can be secured to the housing body 20 via clips or latches 90. In the example shown, the clips or latches 90 engage with the second component 30b. Thus the latches 90 operate to further secure the first and second components 30a, 30b together. In the example shown, the clips or latches 90 are spring steel latches. Other types of latches formed from various materials are also usable without departing from the concepts presented herein.

Referring to FIGS. 96 to 103, the filter cartridge 200 is shown in further detail. In one aspect, the filter cartridge 200 includes an outer frame 202, a radial seal member 204, a circumferential flange structure 206, and a filtration media 220 extending between an inlet end 220a and an outlet end 220b. As shown, the filtration media is pleated media. However, other types of configurations are possible, such as fluted media. In the example shown, the circumferential flange structure 206 is proximate the inlet end 220a of the filtration media 220 and is integrally formed with the outer frame 202. The circumferential flange structure 206 extends radially outward from the outer frame 202 and functions to provide a handle surface for an operator during installation and removal of the filtration cartridge 200. The circumferential flange structure 206 also abuts a portion (e.g. ribs 20a) of the housing body 20 to ensure that the filtration cartridge 200 is not installed beyond a desired position within the housing body 20. Additionally, the flange structure 206 also operates to maintain a spacing between the (non-sealing) interior surfaces of the housing body 20 and the seal member 204 during insertion of the filter cartridge 200 such that the seal member 204 does not contact the housing body 20 until engagement with the designated sealing surface of the housing body 20. This function aids in preventing the seal member 204 from being exposed to contaminants that may be present on the interior surfaces of the housing body 20. The outer frame 202 is also shown as being formed with pleat management structures 210 for ensuring the pleats are properly spaced and retained.

In the example shown, the seal member 204 is an injection-molded thermoplastic elastomer (TPE). The seal member 204 may also be formed from other materials, such as polyurethane. In one example, the sealing member 204 is provided as an injection-molded gasket that is molded directly onto the outer frame 202. In the embodiment shown, the sealing member 202 is provided as an injection-molded gasket with a radially lip seal 204a and a bumper portion 204b. In one aspect, the seal member 204 includes a first segment 204c that circumscribes the filtration media 220 such that the segment 204c is located axially between planes defined by the inlet and outlet ends 220a, 220b of the filtration media 220. The seal member 204 is also shown as including a second segment 204d which is located beyond the plane defined by the outlet end 220b of the filtration media. To facilitate this configuration, the outer frame 202 is provided with an extended height H2 to support the second segment 204d which is greater than the height H1 of the support frame portion supporting the first segment 204c, as denoted at FIG. 99. Third and fourth segments 204e, 204f of the seal member 204 are provided which join the first and second segments 204c, 204d together. In one aspect, the first and second segments 204c, 204d are generally parallel to the planes defined by the inlet and outlet ends 220a, 220b of the filtration media 220 while the segments 204e, 204f extend at an oblique angle to the segments 204c, 204d and the planes defined by the inlet and outlet ends 220a, 220b. One advantage of the disclosed design for filter cartridge 200 is that more internal space is available for accessing and grasping the underside of the handle/flange structure 206 within the housing body 20, as designated by internal space 20b at FIG. 90.

Air Cleaner 10 (FIGS. 104-115)

Referring to FIGS. 104-115, a sixth example of an air cleaner 10 is presented. Air cleaner 10 is generally similar to the air cleaner 10 shown in FIGS. 82-103. For example, the safety filter cartridge 200 and precleaner assembly 60 incorporate the same general design concepts (although differently dimensioned). Similarities also exist with respect to the air cleaner 10 shown in FIGS. 1-50 and with respect to the air cleaner 10 shown in FIGS. 51-54. Thus, where such similarities exist, the previous description is applicable for this example. The air cleaner 10 of FIGS. 104-115 differs from the other examples in several aspects. For example, the air cleaner 10 is provided with a differently configured main filter cartridge 100 design and related configuration changes in the housing body 20.

The air cleaner 10 of FIGS. 104-115 is similar to that shown at FIGS. 51-54 in that the filter cartridge 100 constrains the perimeter wall 22 of the housing body 20 with pocket type structures. As such, in this example, the openings 127 are configured as pocket structures 127 defined by the radial flange structure 125 that receive protrusions 28 on the housing body 20. Once the pocket structures 127 contact the protrusions 28, the perimeter wall is drawn into the desired shape once the filter cartridge 100 is fully installed which ensures a seal is fully formed between the seal member 130 and the interior sealing surface 22f of the housing body 20. In this example, the housing body 20 is provided with additional protrusions 29 that are accepted by additional pocket structures or channels defined by the radial flange structure 125. As most easily seen at the cross-sectional views at FIGS. 106 and 107, this configuration results in the seal member 130 being located on the opposite side of the protrusions 28 of the housing body 20 such that the protrusions 28 and seal member 130 are radially aligned. Thus, the protrusions 28 can more directly act on the pocket structures 127 and seal member 130 to ensure a seal between the seal member 130 and the housing body interior sealing surfaces 22f.

Other Features and Advantages

In some examples of the disclosed filter cartridges 100 disclosed herein, the seal member 130 is formed from an injection molded material (e.g. TPE), as explained previously. In comparison to other types of seal materials (e.g. polyurethane), an injection molded seal with seal lips 132 has a reduced ability to compensate for under and over compression of the seal 130 against the housing. Thus, an injection molded seal member with seal lips is more likely to form a leak path between the housing seal surface 22f and the seal member 130 in states of over or under compression. As stated previously, the housing sidewall 22 is relatively flexible along the long sides 22a and is thus more generally prone to deflecting inwardly and outwardly with respect to the seal member. Furthermore, manufacturing tolerances of housings with relatively longer sides can result in irregularities that can compromise the seal between the seal member 130 and the seal surface 22f. With both of these conditions present, the use of an injection molded seal member with lip seals is especially prone to forming an undesirable leak path. However, the interaction between the openings 127 and the projections 28 that together form the projection-receiver arrangement provide a solution to these conditions and operate to constrain and stabilize the housing sidewall 22 in a fixed position such that the seal between the seal member 130 and seal surface 22f is adequately maintained. This seal is even further enhanced by configurations where the base member 130a of the seal member abuts the interior surface of the housing sidewall 22 to provide an inward constraint on the housing sidewall 22. Where such constraints are provided, the housing sidewall 22 is stabilized in both the inward and outward directions to beneficially maintain a seal between the seal member 130 and the seal surface 22f. The bumper projection 133 can also provide another means for constraining the housing sidewall 22 from excessive inward deflection. Notably, the seal member 130 is located axially between the projection-receiver arrangement 28/127 and the portion of the base member 130a contacting the housing 22 such that the full constraining effect is directed at the location where a seal is formed. The more proximate the seal member 130 is to the projection-receiver arrangement 28/127, the more easily a sufficient seal can be maintained. However, it should be understood that the location of the seal member 130 can be independent from the location of the projection-receiver arrangement 28/127 in certain arrangements.

Any of the air filter cartridges 100 disclosed herein may be provided with a seal member 130 that is proximate the openings 127 or that is remote from the openings 127. For example, the seal member 130 may be located proximate the filter cartridge second end 104 while the openings 127 may be located proximate the filter cartridge first end 102. Conversely, the seal member 130 may be located proximate the filter cartridge first end 102 while the openings 127 may be located proximate the filter cartridge second end 104. Additionally, either or both of the seal member 130 and openings 127 may be located at a midpoint or central location (e.g. middle quarter, middle third, etc. of cartridge between first and second ends 102, 104) of the filter cartridge 100. The shell 120 may be located at any point of the filter cartridge 100 corresponding to the location of the seal member 130.

Figure 61:
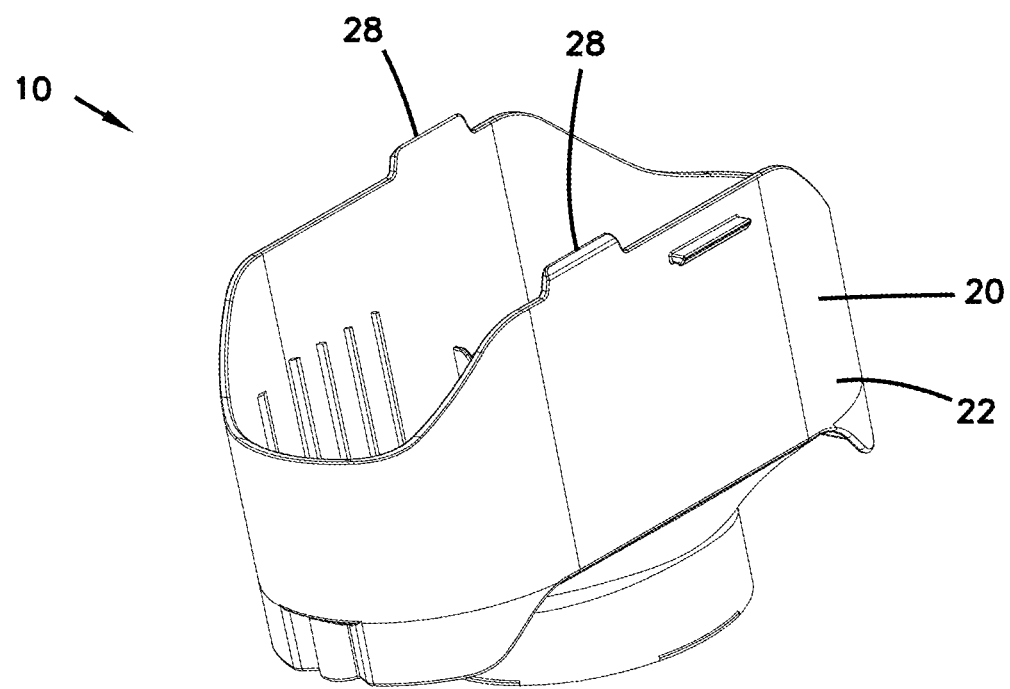
FIG. 61 is a perspective view of a housing of the air cleaner assembly shown in FIG. 55.

As stated previously, the filter cartridge 100 may be alternatively provided with projections 28 instead of the openings 127, wherein openings are provided on the housing body 20. An example of such a configuration is shown at FIGS. 61 and 62, wherein projections 28 extend from the flange 125 in a direction towards the second end 104 of the filter cartridge 100. Furthermore, the filter cartridge 100 may be provided with both openings 127 and projections 28 while the housing body 28 may likewise be provided with corresponding openings 127 and projections 28. In addition, the filter cartridge 100 and housing body 20 may be provided with any number of desired openings 127 and projections 28 along each long side, for example, one, two, three, four, or more.

From the forgoing detailed description, it will be evident that modifications and variations can be made in the aspects of the disclosure without departing from the spirit or scope of the aspects. While the best modes for carrying out the many aspects of the present teachings have been described in detail, those familiar with the art to which these teachings relate will recognize various alternative aspects for practicing the present teachings that are within the scope of the appended claims.

What is claimed is:

1. An air cleaner assembly comprising:
   a. an openable cleaner housing defining an interior region and an interior sealing surface;
   b. a filter cartridge including:
      i) a media pack extending along a longitudinal axis between opposite inlet and outlet flow ends, the media pack having a length and a width defining an outer perimeter, the length being greater than the width;
      ii) a radially directed seal member disposed about the media pack outer perimeter, the seal member forming a seal with the interior sealing surface; and
   c. a projection-receiver arrangement including a first member and a second member:
      i) the first member being located along the length of the media pack outer perimeter, the first member including a plurality of openings;
      ii) the second member being located on the housing, and including a plurality of projections;
   d. wherein a cover of the openable cleaner housing includes cavities for receiving at least a portion of the plurality of projections.

2. The air cleaner of claim 1, wherein the second member is provided with a taper.

3. The air cleaner of claim 1, wherein the radially directed seal member includes at least one lip seal extending from a base portion, the lip seal being for forming a seal against the interior sealing surface of the housing, the base portion abutting the housing to constrain deflection of the housing in a direction towards the media pack.

4. A filter cartridge for an air cleaner assembly, the filter cartridge comprising:
   a. a media pack configured for installation into an air cleaner housing, the media pack extending along a longitudinal axis between opposite inlet and outlet flow ends, the media pack defining an outer perimeter;
   b. a circumferential shell surrounding at least a portion of the media pack outer perimeter;
   c. a flange structure extending from the circumferential shell proximate the media pack inlet end;
   d. a plurality of open pocket areas defined by the flange structure, the plurality of open pocket areas being configured to receive protrusions on a housing body of the air cleaner assembly; and
   e. a seal arrangement supported on the flange structure.

5. The air filter cartridge of claim 4, wherein the seal arrangement is an outwardly directed radial seal.

6. The air filter cartridge of claim 4, wherein at least one of the plurality of open pocket areas is located radially between the circumferential shell and the seal arrangement.

7. The air filter cartridge of claim 4, wherein the seal arrangement includes at least one outwardly radially directed lip seal for forming a seal against an interior surface of the air cleaner housing.

\* \* \* \* \*